United States Patent
Vallribera et al.

(10) Patent No.: US 12,540,318 B2
(45) Date of Patent: *Feb. 3, 2026

(54) NUCLEIC ACIDS ENCODING CHIMERIC POLYPEPTIDES FOR LIBRARY SCREENING

(71) Applicant: ROCHE DIAGNOSTICS OPERATIONS, INC., Indianapolis, IN (US)

(72) Inventors: David Casagolda Vallribera, Penzberg (DE); Frank Kroner, Munich (DE); Michael Schraeml, Penzberg (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 847 days.

This patent is subject to a terminal disclaimer.

(21) Appl. No.: 16/074,128

(22) PCT Filed: Nov. 8, 2012

(86) PCT No.: PCT/EP2012/072178
§ 371 (c)(1),
(2) Date: Jul. 31, 2018

(87) PCT Pub. No.: WO2014/071978
PCT Pub. Date: May 15, 2014

(65) Prior Publication Data
US 2019/0292535 A1 Sep. 26, 2019

(51) Int. Cl.
*C12N 15/62* (2006.01)
*C12N 15/10* (2006.01)
*C40B 40/06* (2006.01)

(52) U.S. Cl.
CPC ..... *C12N 15/1037* (2013.01); *C12N 15/1034* (2013.01); *C12N 15/62* (2013.01); *C40B 40/06* (2013.01); *C07K 2319/00* (2013.01)

(58) Field of Classification Search
CPC ............ C12N 15/1037; C12N 15/1034; C12N 15/62; C40B 40/06; C07K 2319/00
See application file for complete search history.

(56) References Cited

U.S. PATENT DOCUMENTS

2003/0096352 A1* 5/2003 Scholz ............... A61P 37/02 435/320.1
2003/0206891 A1* 11/2003 Clackson ............ C07K 14/715 800/14

FOREIGN PATENT DOCUMENTS

| EP | 1025218 A1 | 8/2000 |
| EP | 1516928 A1 | 3/2005 |
| EP | 1621555 A1 | 2/2006 |
| WO | 2003000878 A2 | 1/2003 |
| WO | WO 2006/072773 A1 * | 7/2006 |
| WO | 2007077008 A1 | 7/2007 |
| WO | 2012150320 A1 | 11/2012 |

OTHER PUBLICATIONS

Knappe et al. "Insertion of a Chaperone Domain Converts FKBP12 into a Powerful Catalyst of Protein Folding" J. Mol. Biol., 368(5): 1458-1468, May 18, 2007 (Year: 2007).*
Rostam et al. "Peptidyl-prolyl isomerases: Functionality and potential therapeutic targets in cardiovascular disease" Clinical and Experimental Pharmacology and Physiology (2015, First published: Nov. 5, 2014) 42(2), 117-124; https://doi.org/10.1111/1440-1681.12335 (Year: 2014).*
Maruyama et al. "Archaeal peptidyl prolyl cis-trans isomerases (PPIases) update 2004" Front Biosci. May 1, 2004;9:1680-720; doi: 10.2741/1361 (Year: 2004).*
Furutani et al. "Biochemical and Genetic Characterization of an FK506-Sensitive Peptidyl Prolyl cis-trans Isomerase from a Thermophilic Archaeon, Methanococcus thermolithotrophicus" (1998) J. Bacteriol., vol. 180, No. 2, pp. 388-394; https://doi.org/10.1128/JB.180.2.388-394.1998 (Year: 1998).*
Henne et al (Nature Biotechnology 22:547-53) (Year: 2004).*
Abe et al., The changes in crosslink contents in tissues after formalin fixation; Analytical Biochemistry; vol. 318, 2003, pp. 118-123.
Binz et al., Engineering novel binding proteins from nonimmunoglobulin domains; Nat. Biotechnol, vol. 23, pp. 1257-1268, 2005.
Bird et al., Synthesis and Biophysical Characterization of Stabilized α-Helices of BCL-2 Domains; Methods in Enzymology, vol. 446, pp. 369-386, 2008.
Brecht et al., Changes in Peptidyl-Prolyl CIS/TRANS Isomerase Activity and FK506 Binding Protein Expression Following Neuroprotection by FK506 in the Ischemic Rat Brain; Neuroscience, vol. 120, 2003, pp. 1037-1048.
Decenzo et al., FK506-binding protein mutational analysis: defining the active-site residue contributions to catalysis and the stability of ligand complexes; Protein Engineering, vol. 0, No. 2, 1996, pp. 173-180.
Gumbart et al., Mechanisms of SecM-Mediated Stalling in the Ribosome; Biophysical Journal, vol. 103, 2012, pp. 331-341.
Hoffmann et al., New Binding Mode to TNF-Alpha Revealed by Ubiquitin-Based Artificial Binding Protein; PloS one; 2012, vol. 7, No. 2, pp. e31298.
Hosse et al., A new generation of protein display scaffolds for molecular recognition; Protein Science, 2006, pp. 14-27.
Ideno et al., Expression of foreign proteins in *Escherichia coli* by fusing with an archaeal FK506 binding protein; Appl Microbiol Biotechnol, 2004, vol. 64, pp. 99-105.

(Continued)

Primary Examiner — Christopher M Gross
(74) Attorney, Agent, or Firm — Taft Stettinius & Hollister LLP

(57) ABSTRACT

The present disclosure is directed to a library of chimeric polypeptides comprising one or more fragments from the peptidyl-prolyl cis/trans isomerase or FKBP family displaying one or more polypeptides on one or more FKBP members and its use in methods for the screening and selection of constrained peptide surrogates exhibiting binding activity versus predetermined target molecules.

15 Claims, 47 Drawing Sheets

Specification includes a Sequence Listing.

(56) References Cited

OTHER PUBLICATIONS

Knappe et al., Insertion of a Chaperone Domain Converts FKBP-12 into a Powerful Catalyst of Protein Folding; J. Mol. Biol, 2007, vol. 368, pp. 1458-1468.

Knappik et al., Fully Synthetic Human Combinatorial Antibody Libraries (HuCAL) Based on Modular Consensus Frameworks and CDRs Randomized with Trinucleotides; J. Mol. Biol., 2000, vol. 596, pp. 57-88.

Liu et al., Engineering a tRNA and aminoacyl-tRNA synthetase for the site-specific incorporation of unnatural amino acids into proteins in vivo; Proc. Natl. Acad. Sci., 1997, vol. 94, pp. 10095-10097.

London et al., The Structural Basis of Peptide-Protein Binding Strategies; Cell Press; Structure 18, pp. 188-199, (2010).

Low et al., Crystal Structure Determination and Functional Characterization of the Metallochaperone SlyD from Thermus thermophilus; J. Mol. Biol., 2010, vol. 398, pp. 375-390.

Mattheakis et al., An in vitro polysome display system for identifying ligands from very large peptide libraries; Proc. Natl. Acad., Sci., vol. 91, 1004, pp. 9022-9026.

Mcnamara et al., Peptides Constrained by an Aliphatic Linkage between Two Cα Sites: Design, Synthesis, and Unexpected Conformational Properties of an i,(i+4)-Linked Peptide; J. Org. Chem, 2001, vol. 66, pp. 4585-4594.

Nakatogawa et al., The Ribosomal Exit Tunnel Functions as a Discriminating Gate; Cell, vol. 1-08, 2002, pp. 629-636.

Pace et al., How to measure and predict the molar absorption coefficient of a protein; Protein Science, 1995, vol. 4, pp. 2411-2423.

Russo et al., Osmolyte Effects on Kinetics of FKBP12 C22A Folding Coupled with Prolyl Isomerization; 2003, J. Mol. Biol, vol. 330, pp. 851-866.

Scholz et al., Autocatalytic Folding of the Folding Catalyst FKBP12; The Journal of Biological Chemistry; 1996, vol. 271, No. 22, pp. 12703-12707.

Schories et al., Multimer Formation by FKBP-12: roles for cysteine 23 and phenylalanine 36; Journal of Peptide Science; 2007; vol. 13, pp. 475-480.

Skerra A., Corrigendum; Engineered protein scaffolds for molecular recognition; Journal of Molecular Recognition, 2000, vol. 13, pp. 167-187.

Standaert et al., Molecular cloning and overexpression of the human FK506-binding protein FKBP; Nature, 1990, vol. 346, pp. 671-674.

Steiner et al., Efficient selection of DARPins with sub-nanomolar affinities using SRP phage display; 2008, J. Mol. Biol., vol. 382, pp. 1211-1227.

Suzuki et al., Three-dimensional Solution Structure of an Archaeal FKBP with a Dual Function of Peptidyl Prolyl cis-trans Isomerase and Chaperone-like Activities; J. Mol. Biol., 2003, vol. 328, pp. 1149-1160.

Timerman et al., Characterization of an Exchange Reaction between Soluble FKBP-12 and the FKBP Ryanodine Receptor Complex; The Journal of Biological Chemistry; vol. 270, No. 6, 1995, pp. 2451-2459.

Lipovsek et al., In-vitro protein evolution by ribosome display and mRNA display; Journal of Immunological Methods, 2004, vol. 290, pp. 51-67.

Kohler G., Milstein C., Continuous cultures of fused cells secretign antibody of predfined specificity; Nature; vol. 256, 1975, pp. 495-497.

International Search Report, European Patent Office, International Patent Application No. PCT/EP2012/072178, Jul. 12, 2013, 5 pages.

Written Opinion of the International Searching Authority, European Patent Office, International Patent Application No. PCT/EP2012/072178, Jul. 12, 2013, 4 pages.

International Preliminary Report on Patentability, European Patent Office, International Patent Application No. PCT/EP2012/072178, May 12, 2015, 5 pages.

Fields et al., Synthetic Peptides: A User's Guide, 1992, W. H. Freeman & Co., 56 pages.

Skerra et al., Corrigendum, J. Mol. Recognit., vol. 13, 2000, p. 409.

Ueda et al., Ribosome Display with the PURE Technology, Methods Mol. Biol., vol. 607, 2010, pp. 219-225.

Rizo J.; Gierasch L.M., Constrained Peptides: Models of Bioactive Peptides and Protein Sustructures, Annu. Rev. Biochem., vol. 61, 1992, pp. 387-418.

Handschumacher, R.E. et al., Cyclophilbt:. A Specific Cytosolic Binding Protein for Cyclosporin A, Science, vol. 226, 1984, pp. 544-547.

Zemlin, M. et al., Expressed Murine and Human CDR-H3 Intervals of Equal Length Exhibit Distinct Repertoires that Differ in their Amino Acid Composition and Predicted Range of Structures, J Mol Biol, vol. 334, 2003, pp. 733-749.

Zoldak, G. et al., Consequences of Domain Insertion on the Stability and Folding Mechanism of a Protein, J. Mol. Biol., vol. 386, 2009, pp. 1138-1152.

Schaegger, H.; Jagow, G., Tricine-Sodium Dodecyl Sulfate-Polyacrylamide Gel Electrophoresis for the Separation of Proteins in the Range from 1 to 100 kDa, Anal. Biochem., vol. 166, 1987, pp. 368-379.

\* cited by examiner

Fig. 1

| Llb Nr. | Amino Acid | % |
|---|---|---|
| 1 | F | 10 |
| 2 | I | 10 |
| 3 | L | 9 |
| 4 | Y | 8 |
| 5 | W | 8 |
| 6 | S | 5 |
| 7 | D | 5 |
| 8 | G | 5 |
| 9 | P | 5 |
| 10 | R | 5 |
| 11 | E | 5 |
| 12 | V | 4 |
| 13 | A | 4 |
| 14 | H | 4 |
| 15 | N | 3 |
| 16 | K | 3 |
| 17 | T | 3 |
| 18 | Q | 3 |
| 19 | M | 1 |
| 20 | C | 0 |
| 21 | stop | 0 |

| Llb1 Nr. | Amino Acid | % |
|---|---|---|
| 1 | Y | 11 |
| 2 | L | 11 |
| 3 | F | 10 |
| 4 | S | 6 |
| 5 | D | 6 |
| 6 | G | 6 |
| 7 | R | 6 |
| 8 | E | 6 |
| 9 | V | 5 |
| 10 | A | 5 |
| 11 | H | 5 |
| 12 | K | 5 |
| 13 | P | 5 |
| 14 | N | 4 |
| 15 | T | 4 |
| 16 | Q | 4 |
| 17 | M | 1 |
| 18 | C | 0 |
| 19 | I | 0 |
| 20 | W | 0 |
| 21 | stop | 0 |

Fig. 2

| part no. | codon | MW | RF | Lib | AA | ratio | 1,5 ml CH₃CN mg | Lib1 | AA | ratio | 1,4 ml CH₃CN mg |
|---|---|---|---|---|---|---|---|---|---|---|---|
| 13-1032-90 | ATG | 1780.5 | 1.3 | 1 | M | 1 | 3.47 | 1 | M | 1 | 3.24 |
| 13-1001-90 | AAC | 1887.5 | 1 | 2 | N | 3 | 8.49 | 2 | N | 4 | 10.57 |
| 13-1233-90 | GTT | 1667.5 | 1.9 | 3 | V | 4 | 19.01 | 3 | V | 5 | 22.18 |
| 13-1301-90 | TAC | 1774.5 | 1.6 | 4 | Y | 8 | 34.07 | 4 | Y | 11 | 43.72 |
| 13-1213-90 | GCT | 1756.5 | 1.5 | 5 | A | 4 | 15.81 | 5 | A | 5 | 18.44 |
| 13-1313-90 | TCT | 1661.4 | 1.3 | 6 | S | 5 | 16.20 | 6 | S | 6 | 18.14 |
| 13-1201-90 | GAC | 1869.5 | 1.6 | 7 | D | 5 | 22.43 | 7 | D | 6 | 25.13 |
| 13-1331-90 | TTC | 1661.4 | 1.3 | 8 | F | 10 | 32.40 | 8 | F | 10 | 30.24 |
| 13-1223-90 | GGT | 1762.5 | 1.1 | 9 | G | 5 | 14.64 | 9 | G | 6 | 16.29 |
| 13-1103-90 | CAT | 1774.5 | 1.3 | 10 | H | 4 | 13.84 | 10 | H | 5 | 16.15 |
| 13-1000-90 | AAA | 1911.5 | 1.1 | 11 | K | 3 | 9.46 | 11 | K | 5 | 14.72 |
| 13-1132-90 | CTG | 1756.5 | 1.2 | 12 | L | 9 | 28.46 | 12 | L | 11 | 32.46 |
| 13-1031-90 | ATC | 1774.5 | 1.5 | 13 | I | 10 | 39.03 | 13 | I | 0 | 0.00 |
| 13-1112-90 | CCG | 1845.5 | 1.8 | 14 | P | 5 | 24.91 | 14 | P | 5 | 23.25 |
| 13-1013-90 | ACT | 1774.5 | 1.6 | 15 | T | 3 | 12.78 | 15 | T | 4 | 15.90 |
| 13-1123-90 | CGT | 1756.5 | 1.4 | 16 | R | 5 | 18.44 | 16 | R | 6 | 20.66 |
| 13-1200-90 | GAA | 1893.5 | 1.4 | 17 | E | 5 | 19.88 | 17 | E | 6 | 22.27 |
| 13-1322-90 | TGG | 1762.5 | 1.1 | 18 | W | 8 | 23.27 | 18 | W | 0 | 0.00 |
| 13-1102-90 | CAG | 1869.5 | 2 | 19 | Q | 3 | 16.83 | 19 | Q | 4 | 20.94 |
|  |  |  |  |  | % | 100 |  |  | % | 100 |  |

| Amino acid | Frequency abs. | Frequency [%]: |
|---|---|---|
| Y | 343640 | 9.76 |
| F | 329036 | 9.35 |
| L | 321791 | 9.14 |
| P | 246503 | 7 |
| D | 206214 | 5.86 |
| V | 204707 | 5.82 |
| R | 202973 | 5.77 |
| Q | 196459 | 5.58 |
| S | 187351 | 5.32 |
| I | 182147 | 5.18 |
| E | 165425 | 4.7 |
| G | 160763 | 4.57 |
| W | 154346 | 4.39 |
| A | 153703 | 4.37 |
| H | 142862 | 4.06 |
| T | 130579 | 3.71 |
| N | 81174 | 2.31 |
| K | 70070 | 1.99 |
| M | 38233 | 1.09 |
| C | 1215 | 0.03 |

Fig. 11

| clone | analyte TNFa [52kDa] | ka (1/Ms) | kd (1/s) | KD (M) | Chi2 |
|---|---|---|---|---|---|
| TT10F7 | +TWEEN® 20 | 1.04E+04 | 2.68E-03 | 2.58E-07 | 0.0755 |
| | −TWEEN® 20 | 3.96E+03 | 1.03E-03 | 2.62E-07 | 3.07E-01 |

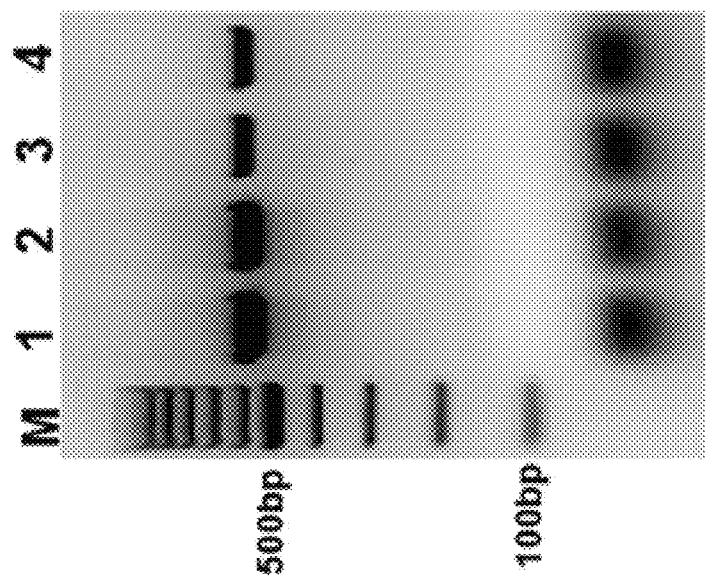
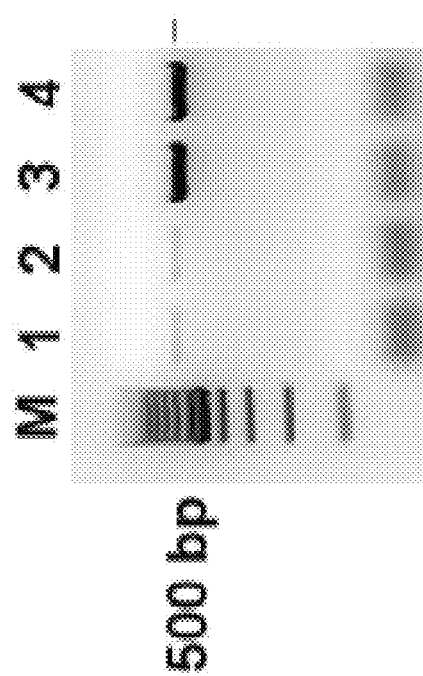
Fig. 13

FIG. 14

| # | library cassette | SEQ ID NO: |
|---|---|---|
| D110 | GAGS-LRSASPVNDTRQI-GSSG | SEQ ID NO:51 |
| EIZI | GAGS-GHTNWDQVRLFDY-GSSG | SEQ ID NO:52 |
| D3UZE | GAGS-FQPPYATQKYLAW-GSSG | SEQ ID NO:53 |
| EFAJG | GAGS-WPGYYLYPPLGFS-GSSG | SEQ ID NO:54 |
| ELU74 | GAGS-GGSLFYDMMYFYF-GSSG | SEQ ID NO:55 |
| EVSDJ | GAGS-WDGFQSLDSGWYA-GSSG | SEQ ID NO:56 |
| D9LB9 | GAGS-INYQTSQRGAGSR-GSSG | SEQ ID NO:57 |
| ES5P8 | GAGS-EFGLVVRVFLYLD-GSSG | SEQ ID NO:58 |
| EKACE | GAGS-YAFSWADQYFVWKK-GSSG | SEQ ID NO:59 |
| EVI0J | GAGS-WPGYYLYPPLGFS-GSSG | SEQ ID NO:60 |
| D2S01 | GAGS-PYRHADYLSLLQK-GSSG | SEQ ID NO:61 |
| EA180 | GAGS-EVLAFVYLPGVVV-GSSG | SEQ ID NO:62 |
| EDIJS | GAGS-AGRQAFVKPGLAI-GSSG | SEQ ID NO:63 |
| D4TTN | GAGS-GGSLFYDMMYFYF-GSSG | SEQ ID NO:64 |
| EGBQP | GAGS-FMGNLFHAHPSDD-GSSG | SEQ ID NO:65 |

Fig. 27 A

| Antibody | Analyte | Binding Late (RU) | Stability Late (RU) | kd (1/s) | t1/2 (min) |
|---|---|---|---|---|---|
| 5.001.015 | SlyD/FKBP12-ERCC1 | 48 | 49 | < 1E-05 | > 1155 |
|  | SlyD/FKBP12-crtl | 0 | 0 | - | - |
| 5.001.017 | SlyD/FKBP12-ERCC1 | 68 | 69 | 5.86E-05 | 197 |
|  | SlyD/FKBP12-crtl | 0 | -1 | - | - |
| 5.001.019 | SlyD/FKBP12-ERCC1 | 68 | 68 | 1.17E-04 | 99 |
|  | SlyD/FKBP12-crtl | -1 | -1 | - | - |
| 5.001.025 | SlyD/FKBP12-ERCC1 | 58 | 59 | 9.42E-05 | 123 |
|  | SlyD/FKBP12-crtl | 0 | 0 | - | - |
| 5.001.035 | SlyD/FKBP12-ERCC1 | 138.2 | 138.8 | 5.66E-05 | 204 |
|  | SlyD/FKBP12-crtl | -0.2 | -0.1 | - | - |
| 5.001.041 | SlyD/FKBP12-crtl | 0 | -1 | - | - |
|  | SlyD/FKBP12-ERCC1 | 0 | 0 | - | - |
| 5.001.060 | SlyD/FKBP12-ERCC1 | 51 | 52 | 8.19E-05 | 141 |
|  | SlyD/FKBP12-crtl | 0 | 0 | - | - |
| 5.001.062 | SlyD/FKBP12-ERCC1 | 70 | 71 | 6.98E-05 | 165 |
|  | SlyD/FKBP12-crtl | 0 | 1 | - | - |
| 5.002.015 | SlyD/FKBP12-ERCC1 | 64 | 65 | 3.90E-05 | 296 |
|  | SlyD/FKBP12-crtl | 0 | 0 | - | - |
| 5.002.017 | SlyD/FKBP12-ERCC1 | 69 | 70 | 6.43E-05 | 180 |
|  | SlyD/FKBP12-crtl | 0 | 0 | - | - |
| 5.002.019 | SlyD/FKBP12-ERCC1 | 67 | 68 | 7.02E-05 | 165 |
|  | SlyD/FKBP12-crtl | 0 | 0 | - | - |
| 5.002.025 | SlyD/FKBP12-ERCC1 | 51 | 52 | 1.22E-04 | 95 |
|  | SlyD/FKBP12-crtl | -1 | -1 | - | - |
| 5.002.035 | SlyD/FKBP12-ERCC1 | 159 | 160 | 5.66E-05 | 204 |
|  | SlyD/FKBP12-crtl | -1 | 0 | - | - |
| 5.002.041 | SlyD/FKBP12-crtl | 0 | 1 | - | - |
|  | SlyD/FKBP12-ERCC1 | 1 | 1 | - | - |
| 5.002.060 | SlyD/FKBP12-ERCC1 | 51 | 52 | 4.98E-05 | 232 |
|  | SlyD/FKBP12-crtl | 0 | 0 | - | - |
| 5.002.062 | SlyD/FKBP12-ERCC1 | 61 | 62 | 9.11E-05 | 127 |
|  | SlyD/FKBP12-crtl | -1 | -1 | - | - |
| 5.005.015 | SlyD/FKBP12-ERCC1 | 61 | 61 | 8.52E-05 | 136 |
|  | SlyD/FKBP12-crtl | -1 | 0 | - | - |
| 5.005.017 | SlyD/FKBP12-ERCC1 | 60 | 61 | 1.19E-04 | 97 |
|  | SlyD/FKBP12-crtl | -1 | 0 | - | - |
| 5.005.019 | SlyD/FKBP12-ERCC1 | 86 | 87 | 7.11E-05 | 163 |
|  | SlyD/FKBP12-crtl | 0 | 0 | - | - |
| 5.005.025 | SlyD/FKBP12-ERCC1 | 53 | 54 | 1.23E-04 | 94 |
|  | SlyD/FKBP12-crtl | 0 | 0 | - | - |
| 5.005.035 | SlyD/FKBP12-ERCC1 | 141 | 142 | 5.66E-05 | 204 |
|  | SlyD/FKBP12-crtl | -1 | 0 | - | - |
| 5.005.041 | SlyD/FKBP12-crtl | 0 | 0 | - | - |
|  | SlyD/FKBP12-ERCC1 | 4 | 4 | - | - |
| 5.005.062 | SlyD/FKBP12-ERCC1 | 55 | 55 | 1.20E-04 | 96 |
|  | SlyD/FKBP12-crtl | 0 | 0 | - | - |

Fig. 27 B

| Antibody | Analyte | Binding Late (RU) | Stability Late (RU) | kd (1/s) | t1/2 (min) |
|---|---|---|---|---|---|
| 5.003.015 | SlyD/FKBP12-ERCC1 | 74 | 75 | 6.70E-05 | 172 |
| | SlyD/FKBP12-crtl | 1 | 2 | - | - |
| 5.003.017 | SlyD/FKBP12-ERCC1 | 76 | 76 | 1.01E-04 | 115 |
| | SlyD/FKBP12-crtl | 0 | 0 | - | - |
| 5.003.019 | SlyD/FKBP12-ERCC1 | 77 | 79 | 2.93E-05 | 394 |
| | SlyD/FKBP12-crtl | 0 | 0 | - | - |
| 5.003.025 | SlyD/FKBP12-ERCC1 | 52 | 52 | 1.01E-04 | 114 |
| | SlyD/FKBP12-crtl | 0 | -1 | - | - |
| 5.003.035 | SlyD/FKBP12-ERCC1 | 167 | 167 | 5.66E-05 | 204 |
| | SlyD/FKBP12-crtl | 0 | -1 | - | - |
| 5.003.041 | SlyD/FKBP12-crtl | -1 | -1 | - | - |
| | SlyD/FKBP12-ERCC1 | 3 | 3 | - | - |
| 5.003.060 | SlyD/FKBP12-ERCC1 | 55 | 56 | 8.52E-05 | 136 |
| | SlyD/FKBP12-crtl | 0 | 0 | - | - |
| 5.003.062 | SlyD/FKBP12-ERCC1 | 60 | 61 | 1.04E-04 | 111 |
| | SlyD/FKBP12-crtl | -1 | -1 | - | - |
| 5.004.015 | SlyD/FKBP12-ERCC1 | 60 | 61 | 6.07E-05 | 190 |
| | SlyD/FKBP12-crtl | 0 | 0 | - | - |
| 5.004.017 | SlyD/FKBP12-ERCC1 | 69 | 70 | 7.52E-05 | 154 |
| | SlyD/FKBP12-crtl | 0 | 0 | - | - |
| 5.004.019 | SlyD/FKBP12-ERCC1 | 69 | 70 | 2.23E-05 | 517 |
| | SlyD/FKBP12-crtl | 0 | -1 | - | - |
| 5.004.025 | SlyD/FKBP12-ERCC1 | 53 | 54 | 1.52E-04 | 76 |
| | SlyD/FKBP12-crtl | -1 | -1 | - | - |
| 5.004.035 | SlyD/FKBP12-ERCC1 | 159.7 | 160.6 | 5.66E-05 | 204 |
| | SlyD/FKBP12-crtl | -0.8 | 0 | - | - |
| 5.004.041 | SlyD/FKBP12-crtl | 1 | 1 | - | - |
| | SlyD/FKBP12-ERCC1 | 5 | 5 | - | - |
| 5.004.060 | SlyD/FKBP12-ERCC1 | 52 | 52 | 7.89E-05 | 146 |
| | SlyD/FKBP12-crtl | 0 | 0 | - | - |
| 5.004.062 | SlyD/FKBP12-ERCC1 | 61 | 62 | 1.03E-04 | 112 |
| | SlyD/FKBP12-crtl | -1 | -1 | - | - |
| 5.006.015 | SlyD/FKBP12-ERCC1 | 65 | 65 | 8.99E-05 | 128 |
| | SlyD/FKBP12-crtl | -1 | 0 | - | - |
| 5.006.017 | SlyD/FKBP12-ERCC1 | 55 | 57 | 8.14E-05 | 142 |
| | SlyD/FKBP12-crtl | -1 | 0 | - | - |
| 5.006.035 | SlyD/FKBP12-ERCC1 | 125 | 126 | 5.66E-05 | 204 |
| | SlyD/FKBP12-crtl | 0 | 0 | - | - |
| 5.006.041 | SlyD/FKBP12-crtl | 1 | 2 | - | - |
| | SlyD/FKBP12-ERCC1 | 4 | 5 | - | - |
| 5.006.060 | SlyD/FKBP12-ERCC1 | 63 | 64 | 2.02E-05 | 573 |
| | SlyD/FKBP12-crtl | 0 | -1 | - | - |
| 5.006.062 | SlyD/FKBP12-ERCC1 | 64 | 65 | 1.14E-04 | 101 |
| | SlyD/FKBP12-crtl | 0 | 0 | - | - |

Fig. 34

| mice no. | mice IC50 serum titer IC50 [mE] | |
|---|---|---|
| | IGF-1 | T.thermophilus SlyD-IGF-1(74-90) |
| K1643M1 | 800 | 10000 |
| K1643M2 | 1000 | 15000 |
| K1643M3 | 4700 | 50000 |
| K1643M4 | 500 | 7000 |
| K1643M5 | 2500 | 26000 |
| K1644M1 | 2800 | 32000 |
| K1644M2 | 280 | - |
| K1644M3 | 250 | 300 |
| K1644M4 | 150 | 800 |
| K1644M5 | 150 | - |

Fig. 35

| clone culture | IGF-1 | reactivity [mE] T.thermophilus StyO-IGF-1(74-90) | T.thermophilus StyO |
|---|---|---|---|
| 10.1.3 | 2748 | 2116 | 37 |
| 10.2.3 | 2768 | 2112 | 40 |
| 10.3.7 | 2712 | 2091 | 32 |
| 10.4.7 | 2700 | 2109 | 35 |
| 10.5.8 | 2501 | 1993 | 35 |
| 10.6.8 | 2410 | 1955 | 36 |
| 10.7.9 | 2111 | 1899 | 36 |
| 10.8.9 | 2145 | 1911 | 38 |
| 11.9.15 | 2578 | 2389 | 32 |
| 11.10.15 | 2585 | 2396 | 33 |
| 11.11.17 | 2427 | 2154 | 32 |
| 11.12.17 | 2372 | 2142 | 32 |

Fig. 36

| mAb | RU | Antigen | kDa | °C | $k_a$ 1/Ms | $k_d$ 1/s | $t_{½}$-diss min | $K_D$ nM | $R_{max}$ RU | MR | Chi² RU² |
|---|---|---|---|---|---|---|---|---|---|---|---|
| M-11.11.17 | 457 | IGF-I (native) | 8 |  | 2,0E+06 | 2,1E-05 | 560 | 0,01 | 46 | 2,0 | 0,0 |
|  | 439 | IGF-II (native) | 8 |  | n.d. | n.d. | n.d. | n.d. | n.d. | n.d. | n.d. |
|  | 432 | TtSlyD-IGF-1(74-90) | 14 | 25 | 7,1E+05 | 1,0E-05 | 1113 | 0,01 | 83 | 2,0 | 0,0 |
|  | 427 | TgSlyD-IGF-2(53-65) | 14 |  | n.d. | n.d. | n.d. | n.d. | n.d. | n.d. | n.d. |
|  | 421 | TtSlyD-wt | 18 |  | n.d. | n.d. | n.d. | n.d. | n.d. | n.d. | n.d. |
|  | 419 | TgSlyD-wt | 18 |  | n.d. | n.d. | n.d. | n.d. | n.d. | n.d. | n.d. |
|  | 418 | TgSlyD-dIF-wt | 15 |  | n.d. | n.d. | n.d. | n.d. | n.d. | n.d. | n.d. |
| M-10.7.9 | 512 | hIGF-I (native) | 8 |  | 9,2E+05 | 1,5E-03 | 8 | 1,6 | 44 | 1,7 | 0,0 |
|  | 494 | hIGF-II (native) | 8 |  | n.d. | n.d. | n.d. | n.d. | n.d. | n.d. | n.d. |
|  | 485 | TtSlyD-IGF-1(74-90) | 14 | 25 | 2,9E+05 | 6,9E-04 | 17 | 2,4 | 84 | 1,8 | 0,0 |
|  | 479 | TgSlyD-IGF-2(53-65) | 14 |  | n.d. | n.d. | n.d. | n.d. | n.d. | n.d. | n.d. |
|  | 470 | TtSlyD-wt | 18 |  | n.d. | n.d. | n.d. | n.d. | n.d. | n.d. | n.d. |
|  | 468 | TgSlyD-wt | 18 |  | n.d. | n.d. | n.d. | n.d. | n.d. | n.d. | n.d. |
|  | 465 | TgSlyD-dIF-wt | 15 |  | n.d. | n.d. | n.d. | n.d. | n.d. | n.d. | n.d. |
| M-2.28.44 | 731 | hIGF-I (native) | 8 |  | 3,9E+06 | 1,3E-04 | 92 | 0,03 | 68 | 1,8 | 0,0 |
|  | 717 | hIGF-II (native) | 8 |  | 4,9E+06 | 2,4E-03 | 5 | 0,5 | 67 | 1,8 | 0,3 |
|  | 704 | TtSlyD-IGF-1(74-90) | 14 | 25 | n.d. | n.d. | n.d. | n.d. | n.d. | n.d. | n.d. |
|  | 693 | TgSlyD-IGF-2(53-65) | 14 |  | n.d. | n.d. | n.d. | n.d. | n.d. | n.d. | n.d. |
|  | 673 | TtSlyD-wt | 18 |  | n.d. | n.d. | n.d. | n.d. | n.d. | n.d. | n.d. |
|  | 664 | TgSlyD-wt | 18 |  | n.d. | n.d. | n.d. | n.d. | n.d. | n.d. | n.d. |
|  | 655 | TgSlyD-dIF-wt | 15 |  | n.d. | n.d. | n.d. | n.d. | n.d. | n.d. | n.d. |

Fig. 42 A

| Ligand | Analyte | BL [RU] | SL [RU] | kd [1/s] | t/2 diss [min] |
|---|---|---|---|---|---|
| 10.0.15 | IGF1 | 22 | 22 | 4.08E-05 | 283 |
| 10.0.15 | thermoSlyD-IGF-1 | 43 | 43 | 3.66E-05 | 315 |
| 10.0.15 | thermoSlyD (wildtyp) | 1 | -1 | n.d. | n.d. |
| 10.0.15 | IGF2 | 2 | 0 | n.d. | n.d. |
| 10.0.17 | IGF1 | 9 | 8 | 1.33E-04 | 87 |
| 10.0.17 | thermoSlyD-IGF-1 | 18 | 17 | 1.25E-04 | 92 |
| 10.0.17 | thermoSlyD (wildtyp) | 2 | -1 | n.d. | n.d. |
| 10.0.17 | IGF2 | 2 | 0 | n.d. | n.d. |
| 10.0.01 | IGF1 | 4 | 2 | 1.43E-03 | 8 |
| 10.0.01 | thermoSlyD-IGF-1 | 18 | 16 | 4.21E-04 | 27 |
| 10.0.01 | thermoSlyD (wildtyp) | 13 | 12 | 1.39E-04 | 83 |
| 10.0.01 | IGF2 | 1 | 0 | n.d. | n.d. |
| 10.0.03 | IGF1 | 16 | 12 | 7.43E-04 | 16 |
| 10.0.03 | thermoSlyD-IGF-1 | 35 | 31 | 3.86E-04 | 30 |
| 10.0.03 | thermoSlyD (wildtyp) | 3 | 1 | n.d. | n.d. |
| 10.0.03 | IGF2 | 3 | 1 | n.d. | n.d. |
| 10.0.04 | IGF1 | 6 | 5 | 2.93E-04 | 39 |
| 10.0.04 | thermoSlyD-IGF-1 | 23 | 16 | 6.58E-04 | 18 |
| 10.0.04 | thermoSlyD (wildtyp) | 16 | 4 | 2.40E-03 | 5 |
| 10.0.04 | IGF2 | 2 | 0 | n.d. | n.d. |
| 10.0.05 | IGF1 | 7 | 6 | 8.04E-04 | 14 |
| 10.0.05 | thermoSlyD-IGF-1 | 38 | 35 | 3.02E-04 | 38 |
| 10.0.05 | thermoSlyD (wildtyp) | 31 | 28 | 1.96E-04 | 59 |
| 10.0.05 | IGF2 | 2 | 0 | n.d. | n.d. |
| 10.0.07 | IGF1 | 18 | 13 | 9.26E-04 | 12 |
| 10.0.07 | thermoSlyD-IGF-1 | 37 | 31 | 5.08E-04 | 23 |
| 10.0.07 | thermoSlyD (wildtyp) | 0 | -2 | n.d. | n.d. |
| 10.0.07 | IGF2 | 1 | -1 | n.d. | n.d. |
| 10.0.08 | IGF1 | 17 | 11 | 1.31E-03 | 9 |
| 10.0.08 | thermoSlyD-IGF-1 | 35 | 29 | 6.40E-04 | 18 |
| 10.0.08 | thermoSlyD (wildtyp) | 2 | 1 | n.d. | n.d. |
| 10.0.08 | IGF2 | 2 | 1 | n.d. | n.d. |

Fig. 42 B

| 3 | 2 | 1 | M* | °C | kd 1/s | t/s-diss |
|---|---|---|---|---|---|---|
| | | 10.1.3 | IGF1 | 37 | 3.25E-04 | 35 |
| | | 10.1.3 | IGF2 | 37 | | |
| | | 10.1.3 | Cl/D-GF1 | 37 | 1.00E-05 | 1155 |
| | | 10.1.3 | Ctrl-wt | 37 | | |
| | | 10.2.3 | IGF1 | 37 | 8.90E-04 | 13 |
| | | 10.2.3 | IGF2 | 37 | | |
| | | 10.2.3 | Cl/D-GF1 | 37 | 1.00E-05 | 1155 |
| | | 10.2.3 | Ctrl-wt | 37 | | |
| | | 10.3.7 | IGF1 | 37 | 1.15E-03 | 10 |
| | | 10.3.7 | IGF2 | 37 | | |
| | | 10.3.7 | Cl/D-GF1 | 37 | 1.00E-05 | 1155 |
| | | 10.3.7 | Ctrl-wt | 37 | | |
| | | 10.4.7 | IGF1 | 37 | 1.00E-05 | 1155 |
| | | 10.4.7 | IGF2 | 37 | | |
| | | 10.4.7 | Cl/D-GF1 | 37 | 1.00E-05 | 1155 |
| | | 10.4.7 | Ctrl-wt | 37 | | |
| | | 10.5.8 | IGF1 | 37 | 1.00E-05 | 1155 |
| | | 10.5.8 | IGF2 | 37 | | |
| | | 10.5.8 | Cl/D-GF1 | 37 | 1.00E-05 | 1155 |
| | | 10.5.8 | Ctrl-wt | 37 | | |
| | | 10.6.8 | IGF1 | 37 | 1.25E-04 | 90 |
| | | 10.6.8 | IGF2 | 37 | | |
| | | 10.6.8 | Cl/D-GF1 | 37 | 1.00E-05 | 1155 |
| | | 10.6.8 | Ctrl-wt | 37 | | |
| | | 10.7.9 | IGF1 | 37 | 1.00E-05 | 1155 |
| | | 10.7.9 | IGF2 | 37 | | |
| | | 10.7.9 | Cl/D-GF1 | 37 | 1.00E-05 | 1155 |
| | | 10.7.9 | Ctrl-wt | 37 | | |
| | | 10.8.9 | IGF1 | 37 | 1.00E-05 | 1155 |
| | | 10.8.9 | IGF2 | 37 | | |
| | | 10.8.9 | Cl/D-GF1 | 37 | 1.00E-05 | 1155 |
| | | 10.8.9 | Ctrl-wt | 37 | | |
| | | 11.9.15 | IGF1 | 37 | 1.00E-05 | 1155 |
| | | 11.9.15 | IGF2 | 37 | | |
| | | 11.9.15 | Cl/D-GF1 | 37 | 1.00E-05 | 1155 |
| | | 11.9.15 | Ctrl-wt | 37 | | |
| | | 11.10.16 | IGF1 | 37 | 1.00E-05 | 1155 |
| | | 11.10.16 | IGF2 | 37 | | |
| | | 11.10.16 | Cl/D-GF1 | 37 | 1.00E-05 | 1155 |
| | | 11.10.16 | Ctrl-wt | 37 | | |
| | | 11.11.17 | IGF1 | 37 | 1.00E-05 | 1155 |
| | | 11.11.17 | IGF2 | 37 | | |
| | | 11.11.17 | Cl/D-GF1 | 37 | 1.00E-05 | 1155 |
| | | 11.11.17 | Ctrl-wt | 37 | | |
| | | 11.12.17 | IGF1 | 37 | 1.00E-05 | 1155 |
| | | 11.12.17 | IGF2 | 37 | | |
| | | 11.12.17 | Cl/D-GF1 | 37 | 1.00E-05 | 1155 |
| | | 11.12.17 | Ctrl-wt | 37 | | |

Fig. 43

| pAb | Ag | °C | ka 1/Ms | kd 1/s | t½-diss min | KA 1/mol | KD M | KD nM |
|---|---|---|---|---|---|---|---|---|
| 10.1.3 | IGF1 | 37 | 1.8E+08 | 6.0E-03 | 2 | 3.1E+08 | 3.3E-09 | 3.3 |
| 10.2.3 | IGF1 | 37 | 1.2E+08 | 5.9E-03 | 2 | 2.0E+08 | 5.1E-09 | 5.1 |
| 10.3.7 | IGF1 | 37 | 1.6E+08 | 6.0E-03 | 2 | 2.6E+08 | 3.8E-09 | 3.8 |
| 10.4.7 | IGF1 | 37 | 1.5E+08 | 6.2E-03 | 2 | 2.3E+08 | 4.3E-09 | 4.3 |
| 10.5.8 | IGF1 | 37 | 1.7E+08 | 6.7E-03 | 2 | 2.6E+08 | 3.9E-09 | 3.9 |
| 10.6.8 | IGF1 | 37 | 1.5E+08 | 6.2E-03 | 2 | 2.4E+08 | 4.2E-09 | 4.2 |
| 10.7.9 | IGF1 | 37 | 1.3E+08 | 6.0E-03 | 2 | 2.2E+08 | 4.5E-09 | 4.5 |
| 10.8.9 | IGF1 | 37 | 1.7E+08 | 6.8E-03 | 2 | 2.4E+08 | 4.1E-09 | 4.1 |
| 11.9.15 | IGF1 | 37 | 3.0E+08 | 2.8E-04 | 41 | 1.1E+10 | 9.4E-11 | 0.1 |
| 11.10.15 | IGF1 | 37 | 2.2E+08 | 1.7E-04 | 68 | 1.3E+10 | 7.7E-11 | 0.1 |
| 11.11.17 | IGF1 | 37 | 3.1E+08 | 1.4E-04 | 81 | 2.2E+10 | 4.6E-11 | 0.0 |
| 11.12.17 | IGF1 | 37 | 2.9E+08 | 1.8E-04 | 64 | 1.6E+10 | 6.2E-11 | 0.1 |

SEQUENCE LISTING

<160> NUMBER OF SEQ ID NOS: 67

<210> SEQ ID NO 1
<211> LENGTH: 4
<212> TYPE: PRT
<213> ORGANISM: Artificial Sequence
<220> FEATURE:
<223> OTHER INFORMATION: Synthetic

<400> SEQUENCE: 1

Gly Ala Gly Ser
1

<210> SEQ ID NO 2
<211> LENGTH: 4
<212> TYPE: PRT
<213> ORGANISM: Artificial Sequence
<220> FEATURE:
<223> OTHER INFORMATION: Synthetic

<400> SEQUENCE: 2

Gly Ser Ser Gly
1

<210> SEQ ID NO 3
<211> LENGTH: 3
<212> TYPE: PRT
<213> ORGANISM: Artificial Sequence
<220> FEATURE:
<223> OTHER INFORMATION: Synthetic

<400> SEQUENCE: 3

Gly Ser Ser
1

<210> SEQ ID NO 4
<211> LENGTH: 90
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (64)..(64)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 4

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Xaa
    50                  55                  60

Gly Lys Asp Leu Asp Phe Gln Val Glu Val Val Lys Val Arg Glu Ala
65                  70                  75                  80

Thr Pro Glu Glu Leu Leu His Gly His Ala
                85                  90

<210> SEQ ID NO 5
<211> LENGTH: 152
<212> TYPE: PRT

<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (64)..(64)
<223> OTHER INFORMATION: Xaa can be any naturally occurring amino acid;
    Xaa represents an amino acid sequence comprising a variable
    sequence to be displayed by the chimeric polypeptide

<400> SEQUENCE: 5

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Xaa
    50                  55                  60

Gly Lys Asp Leu Asp Phe Gln Val Glu Val Val Lys Val Arg Glu Ala
65                  70                  75                  80

Thr Pro Glu Glu Leu Leu His Gly His Ala Gly Ala Gly Ser Gly Ala
            85                  90                  95

Gly Ala Gly Ser Gly Ala Gly Ala Gly Ser Pro Ala Ala Val Pro Ala
            100                 105                 110

Ala Val Pro Ala Ala Val Gly Glu Gly Glu Gly Glu Phe Ser Thr Pro
        115                 120                 125

Val Trp Ile Ser Gln Ala Gln Gly Ile Arg Ala Gly Pro Gln Arg Leu
    130                 135                 140

Ser Asn Pro Gln Pro Met Arg Gly
145                 150

<210> SEQ ID NO 6
<211> LENGTH: 165
<212> TYPE: PRT
<213> ORGANISM: Escherichia coli

<400> SEQUENCE: 6

Met Lys Val Ala Lys Asp Leu Val Val Ser Leu Ala Tyr Gln Val Arg
1               5                   10                  15

Thr Glu Asp Gly Val Leu Val Asp Glu Ser Pro Val Ser Ala Pro Leu
            20                  25                  30

Asp Tyr Leu His Gly His Gly Ser Leu Ile Ser Gly Leu Glu Thr Ala
        35                  40                  45

Leu Glu Gly His Glu Val Gly Asp Lys Phe Asp Val Ala Val Gly Ala
    50                  55                  60

Asn Asp Ala Tyr Gly Gln Tyr Asp Glu Asn Leu Val Gln Arg Val Pro
65                  70                  75                  80

Lys Asp Val Phe Met Gly Val Asp Glu Leu Gln Val Gly Met Arg Phe
            85                  90                  95

Leu Ala Glu Thr Asp Gln Gly Pro Val Pro Val Glu Ile Thr Ala Val
            100                 105                 110

Glu Asp Asp His Val Val Asp Gly Asn His Met Leu Ala Gly Gln
        115                 120                 125

Asn Leu Lys Phe Asn Val Glu Val Val Ala Ile Arg Glu Ala Thr Glu
    130                 135                 140

Glu Glu Leu Ala His Gly His Val His Gly Ala His Asp His His
145                 150                 155                 160

-continued

```
Asp His Asp His Asp
                165

<210> SEQ ID NO 7
<211> LENGTH: 149
<212> TYPE: PRT
<213> ORGANISM: Thermus thermophilus

<400> SEQUENCE: 7

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Gly
    50                  55                  60

Pro His Asp Pro Glu Gly Val Gln Val Val Pro Leu Ser Ala Phe Pro
65                  70                  75                  80

Glu Asp Ala Glu Val Val Pro Gly Ala Gln Phe Tyr Ala Gln Asp Met
                85                  90                  95

Glu Gly Asn Pro Met Pro Leu Thr Val Val Ala Val Glu Gly Glu Glu
            100                 105                 110

Val Thr Val Asp Phe Asn His Pro Leu Ala Gly Lys Asp Leu Asp Phe
        115                 120                 125

Gln Val Glu Val Val Lys Val Arg Glu Ala Thr Pro Glu Glu Leu Leu
    130                 135                 140

His Gly His Ala His
145

<210> SEQ ID NO 8
<211> LENGTH: 156
<212> TYPE: PRT
<213> ORGANISM: Unknown
<220> FEATURE:
<223> OTHER INFORMATION: Thermococcus gammatolerans

<400> SEQUENCE: 8

Met Lys Val Glu Arg Gly Asp Phe Val Leu Phe Asn Tyr Val Gly Arg
1               5                   10                  15

Tyr Glu Asn Gly Glu Val Phe Asp Thr Ser Tyr Glu Ser Val Ala Arg
            20                  25                  30

Glu Gln Gly Ile Phe Val Glu Arg Glu Tyr Ser Pro Ile Gly Val
        35                  40                  45

Thr Val Gly Ala Gly Glu Ile Ile Pro Gly Ile Glu Glu Ala Leu Leu
    50                  55                  60

Gly Met Glu Leu Gly Glu Lys Lys Glu Val Val Pro Pro Glu Lys
65                  70                  75                  80

Gly Tyr Gly Met Pro Arg Glu Asp Leu Ile Val Pro Val Pro Ile Glu
                85                  90                  95

Gln Phe Thr Ser Ala Gly Leu Glu Pro Val Glu Gly Met Tyr Val Met
            100                 105                 110

Thr Asp Ala Gly Ile Ala Lys Ile Leu Lys Val Glu Glu Lys Thr Val
        115                 120                 125

Arg Leu Asp Phe Asn His Pro Leu Ala Gly Lys Thr Ala Ile Phe Glu
    130                 135                 140
```

```
Ile Glu Val Val Glu Ile Lys Lys Ala Gly Glu Ala
145                 150                 155
```

```
<210> SEQ ID NO 9
<211> LENGTH: 108
<212> TYPE: PRT
<213> ORGANISM: Homo sapiens

<400> SEQUENCE: 9
```

```
Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
            20                  25                  30

Asp Gly Lys Lys Phe Asp Ser Ser Arg Asp Arg Asn Lys Pro Phe Lys
        35                  40                  45

Phe Met Leu Gly Lys Gln Glu Val Ile Arg Gly Trp Glu Glu Gly Val
    50                  55                  60

Ala Gln Met Ser Val Gly Gln Arg Ala Lys Leu Thr Ile Ser Pro Asp
65                  70                  75                  80

Tyr Ala Tyr Gly Ala Thr Gly His Pro Gly Ile Ile Pro Pro His Ala
                85                  90                  95

Thr Leu Val Phe Asp Val Glu Leu Leu Lys Leu Glu
            100                 105
```

```
<210> SEQ ID NO 10
<211> LENGTH: 129
<212> TYPE: PRT
<213> ORGANISM: Arabidopsis thaliana

<400> SEQUENCE: 10
```

```
Glu Thr Thr Ser Cys Glu Phe Ser Val Ser Pro Ser Gly Leu Ala Phe
1               5                   10                  15

Cys Asp Lys Val Val Gly Tyr Gly Pro Glu Ala Val Lys Gly Gln Leu
            20                  25                  30

Ile Lys Ala His Tyr Val Gly Lys Leu Glu Asn Gly Lys Val Phe Asp
        35                  40                  45

Ser Ser Tyr Asn Arg Gly Lys Pro Leu Thr Phe Arg Ile Gly Val Gly
    50                  55                  60

Glu Val Ile Lys Gly Trp Asp Gln Gly Ile Leu Gly Ser Asp Gly Ile
65                  70                  75                  80

Pro Pro Met Leu Thr Gly Gly Lys Arg Thr Leu Arg Ile Pro Pro Glu
                85                  90                  95

Leu Ala Tyr Gly Asp Arg Gly Ala Gly Cys Lys Gly Gly Ser Cys Leu
                100                 105                 110

Ile Pro Pro Ala Ser Val Leu Leu Phe Asp Ile Glu Tyr Ile Gly Lys
            115                 120                 125

Ala
```

```
<210> SEQ ID NO 11
<211> LENGTH: 99
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (87)..(87)
<223> OTHER INFORMATION: Xaa can be any naturally occurring amino acid;
      Xaa represents an amino acid sequence comprising a variable
      sequence to be displayed by the chimeric polypeptide
```

<400> SEQUENCE: 11

```
Met Arg Ser Gly Val Gln Val Glu Thr Ile Ser Pro Gly Asp Gly Arg
1               5                   10                  15

Thr Phe Pro Lys Arg Gly Gln Thr Ala Val Val His Tyr Thr Gly Met
            20                  25                  30

Leu Glu Asp Gly Lys Lys Phe Asp Ser Ser Arg Asp Arg Asn Lys Pro
        35                  40                  45

Phe Lys Phe Met Leu Gly Lys Gln Glu Val Ile Arg Gly Trp Glu Glu
    50                  55                  60

Gly Val Ala Gln Met Ser Val Gly Gln Arg Ala Lys Leu Thr Ile Ser
65                  70                  75                  80

Pro Asp Tyr Ala Tyr Gly Xaa Thr Leu Val Phe Asp Val Glu Leu Leu
                85                  90                  95

Lys Leu Glu
```

<210> SEQ ID NO 12
<211> LENGTH: 93
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (66)..(66)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 12

```
Met Arg Ser Lys Val Gly Gln Asp Lys Val Val Thr Ile Arg Tyr Thr
1               5                   10                  15

Leu Gln Val Glu Gly Glu Val Leu Asp Gln Gly Glu Leu Ser Tyr Leu
            20                  25                  30

His Gly His Arg Asn Leu Ile Pro Gly Leu Glu Glu Ala Leu Glu Gly
        35                  40                  45

Arg Glu Glu Gly Glu Ala Phe Gln Ala His Val Pro Ala Glu Lys Ala
    50                  55                  60

Tyr Xaa Gly Lys Asp Leu Asp Phe Gln Val Val Val Lys Val Arg
65                  70                  75                  80

Glu Ala Thr Pro Glu Glu Leu Leu His Gly His Ala His
                85                  90
```

<210> SEQ ID NO 13
<211> LENGTH: 106
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (86)..(86)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 13

```
Met Lys Val Glu Arg Gly Asp Phe Val Leu Phe Asn Tyr Val Gly Arg
1               5                   10                  15

Tyr Glu Asn Gly Glu Val Phe Asp Thr Ser Tyr Glu Ser Val Ala Arg
            20                  25                  30
```

Glu Gln Gly Ile Phe Val Glu Glu Arg Glu Tyr Ser Pro Ile Gly Val
            35                  40                  45

Thr Val Gly Ala Gly Glu Ile Ile Pro Gly Ile Glu Glu Ala Leu Leu
 50                  55                  60

Gly Met Glu Leu Gly Glu Lys Lys Glu Val Val Pro Pro Glu Lys
65                  70                  75                  80

Gly Tyr Gly Met Pro Xaa Ala Gly Lys Thr Ala Ile Phe Glu Ile Glu
                    85                  90                  95

Val Val Glu Ile Lys Lys Ala Gly Glu Ala
                100                 105

<210> SEQ ID NO 14
<211> LENGTH: 45
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (10)..(10)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 14

Gly Asp Arg Gly Ala Gly Cys Gly Ser Xaa Gly Ser Ser Cys Leu Ile
1               5                   10                  15

Pro Pro Ala Ser Val Leu Asp Phe Gln Val Glu Val Val Lys Val Arg
                20                  25                  30

Glu Ala Thr Pro Glu Glu Leu Leu His Gly His Ala His
            35                  40                  45

<210> SEQ ID NO 15
<211> LENGTH: 131
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (109)..(109)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 15

Glu Thr Thr Ser Cys Glu Phe Ser Val Ser Pro Ser Gly Leu Ala Phe
1               5                   10                  15

Cys Asp Lys Val Val Gly Tyr Gly Pro Glu Ala Val Lys Gly Gln Leu
                20                  25                  30

Ile Lys Ala His Tyr Val Gly Lys Leu Glu Asn Gly Lys Val Phe Asp
            35                  40                  45

Ser Ser Tyr Asn Arg Gly Lys Pro Leu Thr Phe Arg Ile Gly Val Gly
        50                  55                  60

Glu Val Ile Lys Gly Trp Asp Gln Gly Ile Leu Gly Ser Asp Gly Ile
65                  70                  75                  80

Pro Pro Met Leu Thr Gly Gly Lys Arg Thr Leu Arg Ile Pro Pro Glu
                85                  90                  95

Leu Ala Tyr Gly Asp Arg Gly Ala Gly Cys Gly Ser Xaa Gly Ser Ser
                100                 105                 110

Cys Leu Ile Pro Pro Ala Ser Val Leu Leu Phe Asp Ile Glu Tyr Ile
            115                 120                 125

Gly Lys Ala
    130

<210> SEQ ID NO 16
<211> LENGTH: 90
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (64)..(64)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 16

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Xaa
    50                  55                  60

Gly Lys Asp Leu Asp Phe Gln Val Glu Val Lys Val Arg Glu Ala
65                  70                  75                  80

Thr Pro Glu Glu Leu Leu His Gly His Ala
                85                  90

<210> SEQ ID NO 17
<211> LENGTH: 152
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (64)..(64)
<223> OTHER INFORMATION: Xaa can be any naturally occurring amino acid;
      Xaa represents an amino acid sequence comprising a variable
      sequence to be displayed by the chimeric polypeptide

<400> SEQUENCE: 17

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Xaa
    50                  55                  60

Gly Lys Asp Leu Asp Phe Gln Val Glu Val Lys Val Arg Glu Ala
65                  70                  75                  80

Thr Pro Glu Glu Leu Leu His Gly His Ala Gly Ala Gly Ser Gly Ala
                85                  90                  95

Gly Ala Gly Ser Gly Ala Gly Ala Gly Ser Pro Ala Ala Val Pro Ala
            100                 105                 110

Ala Val Pro Ala Ala Val Gly Glu Gly Glu Gly Glu Phe Ser Thr Pro
        115                 120                 125

Val Trp Ile Ser Gln Ala Gln Gly Ile Arg Ala Gly Pro Gln Arg Leu

Ser Asn Pro Gln Pro Met Arg Gly
145                 150

<210> SEQ ID NO 18
<211> LENGTH: 21
<212> TYPE: DNA
<213> ORGANISM: Artificial Sequence
<220> FEATURE:
<223> OTHER INFORMATION: Synthetic

<400> SEQUENCE: 18
cgacagtgtg gcgcaggatc c                                             21

<210> SEQ ID NO 19
<211> LENGTH: 21
<212> TYPE: DNA
<213> ORGANISM: Artificial Sequence
<220> FEATURE:
<223> OTHER INFORMATION: Synthetic

<400> SEQUENCE: 19
gggagctcgc aggagacgta g                                             21

<210> SEQ ID NO 20
<211> LENGTH: 719
<212> TYPE: DNA
<213> ORGANISM: Artificial Sequence
<220> FEATURE:
<223> OTHER INFORMATION: Synthetic

<400> SEQUENCE: 20
ggtgatgtcg gcgatatagg cgccagcaac cgcacctgtg gcgccggtga tgccggccac    60
gatgcgtccg gcgtagagga tcgtgatctc gatcccgcga aattaatacg actcactata   120
gggagaccac aacggtttcc ctctagaaat aattttgttt aactttaaga aggagatata   180
catatgaaag tgggccagga taaagttgtc accattcgct ataccctgca ggttgaaggt   240
gaagtgctgg atcagggcga actcagctat ttacatggtc accgcaacct gattccgggc   300
ctggaggaag cgctggaagg tcgcgaggaa ggcgaagcat tcaggcgca tgtgccggca    360
gagaaagcgt atggcgccgg atccccgcag cctctggtgt ataacaaatt aacctttcag   420
ctggaaccga accctcatac caaagggagc tccggcaaag atttagattt caggtggaa    480
gtggttaaag tgcgcgaagc aaccccggag gaactgttac atggccacgc gggcgctggc   540
tctggagctg gtgcaggctc tggtgctggc gcaggttctc agcagcggt gccggcagca    600
gttcctgctg cggtgggcga aggcgaggga gagttcagta cgccagtttg atctcgcag    660
gcacagggca tccgtgctgg tcctcagagg ctttccaacc cccagcctat gcgggggtt    719

<210> SEQ ID NO 21
<211> LENGTH: 178
<212> TYPE: PRT
<213> ORGANISM: Artificial Sequence
<220> FEATURE:
<223> OTHER INFORMATION: Synthetic

<400> SEQUENCE: 21

Met Lys Val Gly Gln Asp Lys Val Val Thr Ile Arg Tyr Thr Leu Gln
1               5                   10                  15
Val Glu Gly Glu Val Leu Asp Gln Gly Glu Leu Ser Tyr Leu His Gly
            20                  25                  30

```
His Arg Asn Leu Ile Pro Gly Leu Glu Glu Ala Leu Glu Gly Arg Glu
            35                  40                  45

Glu Gly Glu Ala Phe Gln Ala His Val Pro Ala Glu Lys Ala Tyr Gly
 50                  55                  60

Ala Gly Ser Pro Gln Pro Leu Val Tyr Asn Lys Leu Thr Phe Gln Leu
 65                  70                  75                  80

Glu Pro Asn Pro His Thr Lys Gly Ser Ser Gly Lys Asp Leu Asp Phe
                 85                  90                  95

Gln Val Glu Val Val Lys Val Arg Glu Ala Thr Pro Glu Glu Leu Leu
                100                 105                 110

His Gly His Ala Gly Ala Gly Ser Gly Ala Gly Ser Gly Ala
            115                 120                 125

Gly Ala Gly Ser Pro Ala Ala Val Pro Ala Ala Val Pro Ala Ala Val
        130                 135                 140

Gly Glu Gly Glu Gly Glu Phe Ser Thr Pro Val Trp Ile Ser Gln Ala
145                 150                 155                 160

Gln Gly Ile Arg Ala Gly Pro Gln Arg Leu Ser Asn Pro Gln Pro Met
                165                 170                 175

Arg Gly

<210> SEQ ID NO 22
<211> LENGTH: 20
<212> TYPE: PRT
<213> ORGANISM: Artificial Sequence
<220> FEATURE:
<223> OTHER INFORMATION: Synthetic

<400> SEQUENCE: 22

Pro Gln Pro Leu Val Tyr Asn Lys Leu Thr Phe Gln Leu Glu Pro Asn
 1               5                  10                  15

Pro His Thr Lys
            20

<210> SEQ ID NO 23
<211> LENGTH: 20
<212> TYPE: DNA
<213> ORGANISM: Artificial Sequence
<220> FEATURE:
<223> OTHER INFORMATION: Synthetic

<400> SEQUENCE: 23 aaccccgca taggctgggg                                             20

<210> SEQ ID NO 24
<211> LENGTH: 23
<212> TYPE: DNA
<213> ORGANISM: Artificial Sequence
<220> FEATURE:
<223> OTHER INFORMATION: Synthetic

<400> SEQUENCE: 24
ggtgatgtcg gcgatatagg cgc                                        23

<210> SEQ ID NO 25
<211> LENGTH: 44
<212> TYPE: DNA
<213> ORGANISM: Artificial Sequence
<220> FEATURE:
<223> OTHER INFORMATION: Synthetic

<400> SEQUENCE: 25
```
cgaaattaat acgactcact atagggagac cacaacggtt tccc        44

<210> SEQ ID NO 26
<211> LENGTH: 66
<212> TYPE: DNA
<213> ORGANISM: Artificial Sequence
<220> FEATURE:
<223> OTHER INFORMATION: Synthetic

<400> SEQUENCE: 26
gggagaccac aacggtttcc ctctagaaat aattttgttt aactttaaga aggagatata        60
catatg        66

<210> SEQ ID NO 27
<211> LENGTH: 47
<212> TYPE: DNA
<213> ORGANISM: Artificial Sequence
<220> FEATURE:
<223> OTHER INFORMATION: Synthetic

<400> SEQUENCE: 27 aaccccccgca taggctgggg gttggaaagc ctctgaggac cagcacg        47

<210> SEQ ID NO 28
<211> LENGTH: 36
<212> TYPE: DNA
<213> ORGANISM: Artificial Sequence
<220> FEATURE:
<223> OTHER INFORMATION: Synthetic

<400> SEQUENCE: 28
ggaaagcctc tgaggaccag cacggatgcc ctgtgc        36

<210> SEQ ID NO 29
<211> LENGTH: 28
<212> TYPE: DNA
<213> ORGANISM: Artificial Sequence
<220> FEATURE:
<223> OTHER INFORMATION: Synthetic

<400> SEQUENCE: 29
cgtcacacga cagtgtggcg caggatcc        28

<210> SEQ ID NO 30
<211> LENGTH: 30
<212> TYPE: DNA
<213> ORGANISM: Artificial Sequence
<220> FEATURE:
<223> OTHER INFORMATION: Synthetic

<400> SEQUENCE: 30
cgtcacaagc tacgtctcct gcgagctccc        30

<210> SEQ ID NO 31
<211> LENGTH: 82
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (22)..(60)
<223> OTHER INFORMATION: n is a, c, g, or t

<400> SEQUENCE: 31
cgacagtgtg gcgcaggatc cnnnnnnnnn nnnnnnnnnn nnnnnnnnnn nnnnnnnnn        60

-continued

```
gggagctcgc aggagacgta gc                                              82
```

<210> SEQ ID NO 32
<211> LENGTH: 23
<212> TYPE: DNA
<213> ORGANISM: Artificial Sequence
<220> FEATURE:
<223> OTHER INFORMATION: Synthetic

<400> SEQUENCE: 32

```
ggtgatgtcg gcgatatagg cgc                                             23
```

<210> SEQ ID NO 33
<211> LENGTH: 20
<212> TYPE: DNA
<213> ORGANISM: Artificial Sequence
<220> FEATURE:
<223> OTHER INFORMATION: Synthetic

<400> SEQUENCE: 33

```
ccccagccta tgcgggggtt                                                 20
```

<210> SEQ ID NO 34
<211> LENGTH: 698
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (385)..(423)
<223> OTHER INFORMATION: n is a, c, g, or t

<400> SEQUENCE: 34

```
ggtgatgtcg gcgatatagg cgccagcaac cgcacctgtg cgccggtga tgccggccac        60
gatgcgtccg gcgtagagga tcgtgatctc gatcccgcga aattaatacg actcactata      120
gggagaccac aacggtttcc ctctagaaat aattttgttt aactttaaga aggagatata      180
catatgaaag tgggccagga taaagttgtc accattcgct ataccctgca ggttgaaggt      240
gaagtgctgg atcagggcga actcagctat ttacatggtc accgcaacct gattccgggc      300
ctggaggaag cgctggaagg tcgcgaggaa ggcgaagcat ttcaggcgca tgtgccggca      360
gagaaagcgt atggcgccgg atccnnnnnn nnnnnnnnnn nnnnnnnnnn nnnnnnnnnn      420
nnngggagct ccggcaaaga tttagatttt caggtggaag tggttaaagt gcgcgaagca      480
accccggagg aactgttaca tggccacgcg ggcgctggct ctggagctgg tgcaggctct      540
ggtgctggcg caggttctcc agcagcggtg ccggcagcag ttcctgctgc ggtgggcgaa      600
ggcgagggag agttcagtac gccagtttgg atctcgcagg cacagggcat ccgtgctggt      660
cctcagaggc tttccaaccc ccagcctatg cgggggtt                              698
```

<210> SEQ ID NO 35
<211> LENGTH: 142
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (70)..(82)
<223> OTHER INFORMATION: Xaa can be any naturally occurring amino acid;
      Xaa represent a variable amino acid sequence to be displayed by
      the chimeric polypeptide -continued

<400> SEQUENCE: 35

Met Arg Ser Lys Val Gly Gln Asp Lys Val Val Thr Ile Arg Tyr Thr
1               5                   10                  15

Leu Gln Val Glu Gly Glu Val Leu Asp Gln Gly Glu Leu Ser Tyr Leu
            20                  25                  30

His Gly His Arg Asn Leu Ile Pro Gly Leu Glu Ala Leu Glu Gly
        35                  40                  45

Arg Glu Glu Gly Glu Ala Phe Gln Ala His Val Pro Ala Glu Lys Ala
    50                  55                  60

Tyr Gly Ala Gly Ser Xaa Xaa Xaa Xaa Xaa Xaa Xaa Xaa Xaa
65                  70                  75                  80

Xaa Xaa Gly Ser Ser Gly Lys Asp Leu Asp Phe Gln Val Glu Val Val
                85                  90                  95

Lys Val Arg Glu Ala Thr Pro Glu Glu Leu Leu His Gly His Gly Gly
            100                 105                 110

Ala Ala Ala Gly Leu Asn Asp Ile Phe Glu Ala Gln Lys Ile Glu Trp
        115                 120                 125

His Glu Gly Ser Arg Lys His His His His His His
    130                 135                 140

<210> SEQ ID NO 36
<211> LENGTH: 144
<212> TYPE: PRT
<213> ORGANISM: Artificial Sequence
<220> FEATURE:
<223> OTHER INFORMATION: Synthetic

<400> SEQUENCE: 36

Met Arg Ser Lys Val Gly Gln Asp Lys Val Val Thr Ile Arg Tyr Thr
1               5                   10                  15

Leu Gln Val Glu Gly Glu Val Leu Asp Gln Gly Glu Leu Ser Tyr Leu
            20                  25                  30

His Gly His Arg Asn Leu Ile Pro Gly Leu Glu Ala Leu Glu Gly
        35                  40                  45

Arg Glu Glu Gly Glu Ala Phe Gln Ala His Val Pro Ala Glu Lys Ala
    50                  55                  60

Tyr Gly Ala Gly Ser Trp Lys Pro His Phe Asn Leu His Leu Leu Tyr
65                  70                  75                  80

Leu Ile Gly Ser Ser Gly Lys Asp Leu Asp Phe Gln Val Glu Val Val
                85                  90                  95

Lys Val Arg Glu Ala Thr Pro Glu Glu Leu Leu His Gly His Ala His
            100                 105                 110

Gly Gly Ala Ala Ala Gly Leu Asn Asp Ile Phe Glu Ala Gln Lys Ile
        115                 120                 125

Glu Trp His Glu Gly Ser Arg Lys His His His His His His
    130                 135                 140

<210> SEQ ID NO 37
<211> LENGTH: 21
<212> TYPE: PRT
<213> ORGANISM: Artificial Sequence
<220> FEATURE:
<223> OTHER INFORMATION: Synthetic

<400> SEQUENCE: 37

Gly Ala Gly Ser Trp Lys Pro His Phe Asn Leu His Leu Leu Tyr Leu
1               5                   10                  15

```
Ile Gly Ser Ser Gly
            20

<210> SEQ ID NO 38
<211> LENGTH: 21
<212> TYPE: PRT
<213> ORGANISM: Artificial Sequence
<220> FEATURE:
<223> OTHER INFORMATION: Synthetic

<400> SEQUENCE: 38

Gly Ala Gly Ser Trp Lys Pro His Phe Asn Leu His Leu Leu Tyr Leu
1               5                   10                  15

Ile Gly Ser Ser Gly
            20

<210> SEQ ID NO 39
<211> LENGTH: 21
<212> TYPE: PRT
<213> ORGANISM: Artificial Sequence
<220> FEATURE:
<223> OTHER INFORMATION: Synthetic

<400> SEQUENCE: 39

Gly Ala Gly Ser Thr Tyr Tyr Lys Ile His Val Leu Trp Leu Ile Tyr
1               5                   10                  15

Val Gly Ser Ser Gly
            20

<210> SEQ ID NO 40
<211> LENGTH: 21
<212> TYPE: PRT
<213> ORGANISM: Artificial Sequence
<220> FEATURE:
<223> OTHER INFORMATION: Synthetic

<400> SEQUENCE: 40

Gly Ala Gly Ser Trp Lys Pro His Phe Asn Leu His Leu Leu Tyr Leu
1               5                   10                  15

Ile Gly Ser Ser Gly
            20

<210> SEQ ID NO 41
<211> LENGTH: 21
<212> TYPE: PRT
<213> ORGANISM: Artificial Sequence
<220> FEATURE:
<223> OTHER INFORMATION: Synthetic

<400> SEQUENCE: 41

Gly Ala Gly Ser Tyr Tyr Val Leu Ile Thr Asp Asn Leu Val Tyr Phe
1               5                   10                  15

Gly Gly Ser Ser Gly
            20

<210> SEQ ID NO 42
<211> LENGTH: 4
<212> TYPE: PRT
<213> ORGANISM: Artificial Sequence
<220> FEATURE:
<223> OTHER INFORMATION: Synthetic

<400> SEQUENCE: 42

Gly Gly Gly Ser
1
```

<210> SEQ ID NO 43
<211> LENGTH: 17
<212> TYPE: PRT
<213> ORGANISM: Artificial Sequence
<220> FEATURE:
<223> OTHER INFORMATION: Synthetic

<400> SEQUENCE: 43

Asn Lys Pro Thr Gly Tyr Gly Ser Ser Ser Arg Arg Ala Pro Gln Thr
1               5                   10                  15

Gly

<210> SEQ ID NO 44
<211> LENGTH: 130
<212> TYPE: PRT
<213> ORGANISM: Artificial Sequence
<220> FEATURE:
<223> OTHER INFORMATION: Synthetic

<400> SEQUENCE: 44

Met Arg Gly Ser Lys Val Gly Gln Asp Lys Val Val Thr Ile Arg Tyr
1               5                   10                  15

Thr Leu Gln Val Glu Gly Glu Val Leu Asp Gln Gly Glu Leu Ser Tyr
            20                  25                  30

Leu His Gly His Arg Asn Leu Ile Pro Gly Leu Glu Glu Ala Leu Glu
        35                  40                  45

Gly Arg Glu Glu Gly Glu Ala Phe Gln Ala His Val Pro Ala Glu Lys
    50                  55                  60

Ala Tyr Gly Pro His Gly Asn Lys Pro Thr Gly Tyr Gly Ser Ser Ser
65                  70                  75                  80

Arg Arg Ala Pro Gln Thr Gly Gly Ala Gly Lys Asp Leu Asp Phe Gln
                85                  90                  95

Val Glu Val Val Lys Val Arg Glu Ala Thr Pro Glu Glu Leu Leu His
            100                 105                 110

Gly His Ala His Gly Gly Gly Ser Arg Lys His His His His His His
        115                 120                 125

His His
    130

<210> SEQ ID NO 45
<211> LENGTH: 161
<212> TYPE: PRT
<213> ORGANISM: Artificial Sequence
<220> FEATURE:
<223> OTHER INFORMATION: Synthetic

<400> SEQUENCE: 45

Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
            20                  25                  30

His Arg Asn Leu Ile Pro Gly Leu Glu Glu Ala Leu Glu Gly Arg Glu
        35                  40                  45

Glu Gly Glu Ala Phe Gln Ala His Val Pro Ala Glu Lys Ala Tyr Gly
    50                  55                  60

Pro His Asp Pro Glu Gly Val Gln Val Pro Leu Ser Ala Phe Pro
65                  70                  75                  80

Glu Asp Ala Glu Val Val Pro Gly Ala Gln Phe Tyr Ala Gln Asp Met

```
                     85                  90                  95
Glu Gly Asn Pro Met Pro Leu Thr Val Val Ala Val Glu Gly Glu Glu
                100                 105                 110
Val Thr Val Asp Phe Asn His Pro Leu Ala Gly Lys Asp Leu Asp Phe
            115                 120                 125
Gln Val Glu Val Lys Val Arg Glu Ala Thr Pro Glu Glu Leu Leu
        130                 135                 140
His Gly His Ala His Gly Gly Ser Arg Lys His His His His
145                 150                 155                 160
His

<210> SEQ ID NO 46
<211> LENGTH: 119
<212> TYPE: PRT
<213> ORGANISM: Artificial Sequence
<220> FEATURE:
<223> OTHER INFORMATION: Synthetic

<400> SEQUENCE: 46

Met Arg Gly Ser Lys Val Gly Gln Asp Lys Val Val Thr Ile Arg Tyr
1               5                   10                  15
Thr Leu Gln Val Glu Gly Glu Val Leu Asp Gln Gly Glu Leu Ser Tyr
                20                  25                  30
Leu His Gly His Arg Asn Leu Ile Pro Gly Leu Glu Glu Ala Leu Glu
            35                  40                  45
Gly Arg Glu Glu Gly Glu Ala Phe Gln Ala His Val Pro Ala Glu Lys
        50                  55                  60
Ala Tyr Gly Pro His Gly Ala Gly Ser Gly Ser Ser Gly Ala Gly Lys
65                  70                  75                  80
Asp Leu Asp Phe Gln Val Glu Val Lys Val Arg Glu Ala Thr Pro
                85                  90                  95
Glu Glu Leu Leu His Gly His Ala His Gly Gly Gly Ser Arg Lys His
                100                 105                 110
His His His His His His
        115

<210> SEQ ID NO 47
<211> LENGTH: 168
<212> TYPE: PRT
<213> ORGANISM: Artificial Sequence
<220> FEATURE:
<223> OTHER INFORMATION: Synthetic

<400> SEQUENCE: 47

Met Lys Val Glu Arg Gly Asp Phe Val Leu Phe Asn Tyr Val Gly Arg
1               5                   10                  15
Tyr Glu Asn Gly Glu Val Phe Asp Thr Ser Tyr Glu Ser Val Ala Arg
                20                  25                  30
Glu Gln Gly Ile Phe Val Glu Glu Arg Glu Tyr Ser Pro Ile Gly Val
            35                  40                  45
Thr Val Gly Ala Gly Glu Ile Ile Pro Gly Ile Glu Glu Ala Leu Leu
        50                  55                  60
Gly Met Glu Leu Gly Glu Lys Lys Glu Val Val Pro Pro Glu Lys
65                  70                  75                  80
Gly Tyr Gly Met Pro Arg Glu Asp Leu Ile Val Pro Val Pro Ile Glu
                85                  90                  95
Gln Phe Thr Ser Ala Gly Leu Glu Pro Val Glu Gly Met Tyr Val Met
```

```
                    100                 105                 110
Thr Asp Ala Gly Ile Ala Lys Ile Leu Lys Val Glu Glu Lys Thr Val
                115                 120                 125

Arg Leu Asp Phe Asn His Pro Leu Ala Gly Lys Thr Ala Ile Phe Glu
            130                 135                 140

Ile Glu Val Val Glu Ile Lys Lys Ala Gly Glu Ala Gly Gly Gly Ser
145                 150                 155                 160

Arg Lys His His His His His His
                165
```

<210> SEQ ID NO 48
<211> LENGTH: 128
<212> TYPE: PRT
<213> ORGANISM: Artificial Sequence
<220> FEATURE:
<223> OTHER INFORMATION: Synthetic

<400> SEQUENCE: 48

```
Met Lys Val Glu Arg Gly Asp Phe Val Leu Phe Asn Tyr Val Gly Arg
1               5                   10                  15

Tyr Glu Asn Gly Glu Val Phe Asp Thr Ser Tyr Glu Ser Val Ala Arg
                20                  25                  30

Glu Gln Gly Ile Phe Val Glu Arg Glu Tyr Ser Pro Ile Gly Val
            35                  40                  45

Thr Val Gly Ala Gly Glu Ile Ile Pro Gly Ile Glu Ala Leu Leu
        50                  55                  60

Gly Met Glu Leu Gly Lys Lys Glu Val Val Pro Pro Glu Lys
65                  70                  75                  80

Gly Tyr Gly Met Pro Gly Ser Arg Val Ser Arg Arg Ser Arg Gly Gly
                85                  90                  95

Ala Gly Lys Thr Ala Ile Phe Glu Ile Glu Val Val Glu Ile Lys Lys
            100                 105                 110

Ala Gly Glu Ala Gly Gly Gly Ser Arg Lys His His His His His
        115                 120                 125
```

<210> SEQ ID NO 49
<211> LENGTH: 122
<212> TYPE: PRT
<213> ORGANISM: Artificial Sequence
<220> FEATURE:
<223> OTHER INFORMATION: Synthetic

<400> SEQUENCE: 49

```
Met Lys Val Gly Gln Asp Lys Val Val Thr Ile Arg Tyr Thr Leu Gln
1               5                   10                  15

Val Glu Gly Glu Val Leu Asp Gln Gly Glu Leu Ser Tyr Leu His Gly
                20                  25                  30

His Arg Asn Leu Ile Pro Gly Leu Glu Glu Ala Leu Glu Gly Arg Glu
            35                  40                  45

Glu Gly Glu Ala Phe Gln Ala His Val Pro Ala Glu Lys Ala Tyr Gly
        50                  55                  60

Pro His Gly Asn Lys Pro Thr Gly Tyr Gly Ser Ser Ser Arg Arg Ala
65                  70                  75                  80

Pro Gln Thr Gly Gly Ala Gly Lys Asp Leu Asp Phe Gln Val Glu Val
                85                  90                  95

Val Lys Val Arg Glu Ala Thr Pro Glu Glu Leu Leu His Gly His Ala
            100                 105                 110
```

His Pro Ser Gly His His His His His
        115                 120

<210> SEQ ID NO 50
<211> LENGTH: 166
<212> TYPE: PRT
<213> ORGANISM: Artificial Sequence
<220> FEATURE:
<223> OTHER INFORMATION: Synthetic

<400> SEQUENCE: 50

Met Arg Gly Ser Lys Val Gly Gln Asp Lys Val Val Thr Ile Arg Tyr
1               5                   10                  15

Thr Leu Gln Val Glu Gly Glu Val Leu Asp Gln Gly Glu Leu Ser Tyr
            20                  25                  30

Leu His Gly His Arg Asn Leu Ile Pro Gly Leu Glu Glu Ala Leu Glu
        35                  40                  45

Gly Arg Glu Glu Gly Glu Ala Phe Gln Ala His Val Pro Ala Glu Lys
    50                  55                  60

Ala Tyr Gly Pro His Asp Pro Glu Gly Val Gln Val Pro Leu Ser
65                  70                  75                  80

Ala Phe Pro Glu Asp Ala Glu Val Val Pro Gly Ala Gln Phe Tyr Ala
                85                  90                  95

Gln Asp Met Glu Gly Asn Pro Met Pro Leu Thr Val Val Ala Val Glu
            100                 105                 110

Gly Glu Glu Val Thr Val Asp Phe Asn His Pro Leu Ala Gly Lys Asp
        115                 120                 125

Leu Asp Phe Gln Val Glu Val Lys Val Arg Glu Ala Thr Pro Glu
    130                 135                 140

Glu Leu Leu His Gly His Ala His Gly Gly Ser Arg Lys His His
145                 150                 155                 160

His His His His His His
            165

<210> SEQ ID NO 51
<211> LENGTH: 12
<212> TYPE: PRT
<213> ORGANISM: Artificial Sequence
<220> FEATURE:
<223> OTHER INFORMATION: Synthetic

<400> SEQUENCE: 51

Gly Ser Arg Lys His His His His His His His
1               5                   10

<210> SEQ ID NO 52
<211> LENGTH: 21
<212> TYPE: PRT
<213> ORGANISM: Artificial Sequence
<220> FEATURE:
<223> OTHER INFORMATION: Synthetic

<400> SEQUENCE: 52

Gly Ala Gly Ser Leu Arg Ser Ala Ser Pro Val Asn Asp Thr Arg Gln
1               5                   10                  15

Ile Gly Ser Ser Gly
            20

<210> SEQ ID NO 53
<211> LENGTH: 21
<212> TYPE: PRT

```
<213> ORGANISM: Artificial Sequence
<220> FEATURE:
<223> OTHER INFORMATION: Synthetic

<400> SEQUENCE: 53

Gly Ala Gly Ser Gly His Thr Asn Trp Asp Gln Val Arg Leu Phe Asp
1               5                   10                  15

Tyr Gly Ser Ser Gly
            20

<210> SEQ ID NO 54
<211> LENGTH: 21
<212> TYPE: PRT
<213> ORGANISM: Artificial Sequence
<220> FEATURE:
<223> OTHER INFORMATION: Synthetic

<400> SEQUENCE: 54

Gly Ala Gly Ser Phe Gln Pro Pro Tyr Ala Thr Gln Lys Tyr Leu Ala
1               5                   10                  15

Trp Gly Ser Ser Gly
            20

<210> SEQ ID NO 55
<211> LENGTH: 21
<212> TYPE: PRT
<213> ORGANISM: Artificial Sequence
<220> FEATURE:
<223> OTHER INFORMATION: Synthetic

<400> SEQUENCE: 55

Gly Ala Gly Ser Trp Pro Gly Tyr Tyr Leu Tyr Pro Pro Leu Gly Phe
1               5                   10                  15

Ser Gly Ser Ser Gly
            20

<210> SEQ ID NO 56
<211> LENGTH: 21
<212> TYPE: PRT
<213> ORGANISM: Artificial Sequence
<220> FEATURE:
<223> OTHER INFORMATION: Synthetic

<400> SEQUENCE: 56

Gly Ala Gly Ser Gly Gly Ser Leu Phe Tyr Asp Met Met Tyr Phe Tyr
1               5                   10                  15

Phe Gly Ser Ser Gly
            20

<210> SEQ ID NO 57
<211> LENGTH: 21
<212> TYPE: PRT
<213> ORGANISM: Artificial Sequence
<220> FEATURE:
<223> OTHER INFORMATION: Synthetic

<400> SEQUENCE: 57

Gly Ala Gly Ser Trp Asp Gly Phe Gln Ser Leu Asp Ser Gly Trp Tyr
1               5                   10                  15

Ala Gly Ser Ser Gly
            20

<210> SEQ ID NO 58
<211> LENGTH: 21
```

```
<212> TYPE: PRT
<213> ORGANISM: Artificial Sequence
<220> FEATURE:
<223> OTHER INFORMATION: Synthetic

<400> SEQUENCE: 58

Gly Ala Gly Ser Ile Asn Tyr Gln Thr Ser Gln Arg Gly Ala Gly Ser
1               5                   10                  15

Arg Gly Ser Ser Gly
            20

<210> SEQ ID NO 59
<211> LENGTH: 21
<212> TYPE: PRT
<213> ORGANISM: Artificial Sequence
<220> FEATURE:
<223> OTHER INFORMATION: Synthetic

<400> SEQUENCE: 59

Gly Ala Gly Ser Glu Phe Gly Leu Val Val Arg Val Phe Leu Tyr Leu
1               5                   10                  15

Asp Gly Ser Ser Gly
            20

<210> SEQ ID NO 60
<211> LENGTH: 22
<212> TYPE: PRT
<213> ORGANISM: Artificial Sequence
<220> FEATURE:
<223> OTHER INFORMATION: Synthetic

<400> SEQUENCE: 60

Gly Ala Gly Ser Tyr Ala Phe Ser Trp Ala Asp Gln Tyr Phe Val Trp
1               5                   10                  15

Lys Lys Gly Ser Ser Gly
            20

<210> SEQ ID NO 61
<211> LENGTH: 21
<212> TYPE: PRT
<213> ORGANISM: Artificial Sequence
<220> FEATURE:
<223> OTHER INFORMATION: Synthetic

<400> SEQUENCE: 61

Gly Ala Gly Ser Trp Pro Gly Tyr Tyr Leu Tyr Pro Pro Leu Gly Phe
1               5                   10                  15

Ser Gly Ser Ser Gly
            20

<210> SEQ ID NO 62
<211> LENGTH: 21
<212> TYPE: PRT
<213> ORGANISM: Artificial Sequence
<220> FEATURE:
<223> OTHER INFORMATION: Synthetic

<400> SEQUENCE: 62

Gly Ala Gly Ser Pro Tyr Arg His Ala Asp Tyr Leu Ser Leu Leu Gln
1               5                   10                  15

Lys Gly Ser Ser Gly
            20

<210> SEQ ID NO 63
```

```
<211> LENGTH: 21
<212> TYPE: PRT
<213> ORGANISM: Artificial Sequence
<220> FEATURE:
<223> OTHER INFORMATION: Synthetic

<400> SEQUENCE: 63

Gly Ala Gly Ser Glu Val Leu Ala Phe Val Tyr Leu Pro Gly Val Val
1               5                   10                  15

Val Gly Ser Ser Gly
            20

<210> SEQ ID NO 64
<211> LENGTH: 21
<212> TYPE: PRT
<213> ORGANISM: Artificial Sequence
<220> FEATURE:
<223> OTHER INFORMATION: Synthetic

<400> SEQUENCE: 64

Gly Ala Gly Ser Ala Gly Arg Gln Ala Phe Val Lys Pro Gly Leu Ala
1               5                   10                  15

Ile Gly Ser Ser Gly
            20

<210> SEQ ID NO 65
<211> LENGTH: 21
<212> TYPE: PRT
<213> ORGANISM: Artificial Sequence
<220> FEATURE:
<223> OTHER INFORMATION: Synthetic

<400> SEQUENCE: 65

Gly Ala Gly Ser Gly Gly Ser Leu Phe Tyr Asp Met Met Tyr Phe Tyr
1               5                   10                  15

Phe Gly Ser Ser Gly
            20

<210> SEQ ID NO 66
<211> LENGTH: 21
<212> TYPE: PRT
<213> ORGANISM: Artificial Sequence
<220> FEATURE:
<223> OTHER INFORMATION: Synthetic

<400> SEQUENCE: 66

Gly Ala Gly Ser Phe Met Gly Asn Leu Phe His Ala His Pro Ser Asp
1               5                   10                  15

Asp Gly Ser Ser Gly
            20

<210> SEQ ID NO 67
<211> LENGTH: 21
<212> TYPE: PRT
<213> ORGANISM: Artificial Sequence
<220> FEATURE:
<223> OTHER INFORMATION: Synthetic

<400> SEQUENCE: 67

Gly Ala Gly Ser Val Val Pro Tyr Ser Arg Leu Gly Pro Arg Trp Glu
1               5                   10                  15

Trp Gly Ser Ser Gly
            20
```

NUCLEIC ACIDS ENCODING CHIMERIC POLYPEPTIDES FOR LIBRARY SCREENING

This application claims priority to International Publication Number WO 2014/071978, filed on Nov. 8, 2012, which is hereby incorporated by reference in its entirety.

INCORPORATION OF SEQUENCE LISTING

A computer readable form of the Sequence Listing containing the file named "P31322-US_Substitute_Sequence_Listing.txt," which is 43,870 bytes in size (as measured in MICROSOFT WINDOWS® EXPLORER) and was created on Nov. 1, 2023, is provided herein and is herein incorporated by reference. This Sequence Listing consists of SEQ ID NOs: 1-67.

FIELD OF THE INVENTION

The present disclosure is directed to a library of chimeric polypeptides comprising one or more fragments from the peptidyl-prolyl cis/trans isomerase or FKBP family displaying one or more polypeptides on one or more FKBP members and its use in methods for the screening and selection of constrained peptide surrogates exhibiting binding activity versus predetermined target molecules.

BACKGROUND OF THE INVENTION

In addition to target-specific antibodies there is a need in the life sciences and in related applied fields for polypeptide molecules capable of performing specific protein-protein interactions. Particularly, there is the desire to circumvent antibody generations in animals and to focus discovery on identifying polypeptide domains that bind to a predetermined target. However, a major obstacle of polypeptides is their intrinsic flexibility. This is particularly the case for short linear polypeptides, e.g. amino acid sequences comprising about 5 to about 50 amino acids. In solution short linear polypeptides are usually transitioning a large number of structural states that are almost equivalent energetically. Although slightly preferred conformations may be more frequent in some cases, they are generally highly dependent on the environment.

The technique of using a protein scaffold for engineering polypeptide domains displayed by the scaffold is known in the field of antibodies and antibody fragments. Thus, domains such as variable loops of antigen binding regions of antibodies have been extensively engineered to produce amino acid sequence segments having improved binding (e.g. affinity and/or specificity) to known targets (e.g. disclosed in Knappik, A. & Pluckthun A. J. Mol. Biol. 296 (2000) 57-86; EP 1025218). Engineering of non-antibody frameworks has been reviewed e.g. by Hosse, R. J. et al. Protein Sci., 15 (2006) 14-27. Non-antibody or alternative protein scaffolds have considerable advantages over traditional antibodies due to their small size, high stability, and ability to be expressed in prokaryotic hosts. Novel methods of purification are readily applied; they are easily conjugated to drugs/toxins, penetrate efficiently into tissues and are readily formatted into mono- or multi-specific binders (Skerra, A, et al. J. Mol. Recognit. 13 (2000) 409-410; Binz, H. K. et al. Nature Biotechnol. 23 (2005) 1257-1268).

It is a technical challenge to establish a robust platform technique specifically for evolving constrained polypeptides capable of target binding in a more efficient way as compared with linear polypeptides. For the identification and selection of desired (lead) structures evolutionary display methods are known including phage display, ribosome display, mRNA display and cell surface display. Such methods can be applied to select and optimize target-binding polypeptides from libraries with a large number of candidate amino acid sequences.

Knappe, T. A., et al. (J. Mol. Biol. 368 (2007) 1458-1468) reported that the Flap-region of FKBP12 can be replaced by the IF domain of the structurally related E. coli chaperone SlyD. The chimeric FKBP12-SlyD chimeric polypeptide has a 200-times increase peptidyl-prolyl-cis/trans isomerase activity compared to the isolated polypeptide.

The E. coli SlyD and FKBP12 (wild type and mutants C23A and C23S) can be recombinantly produced in E. coli in high yield in soluble form (Standaert, R. F., et al., Nature 346 (1990) 671-674).

FKBP derived from thermophilic organisms and E. coli SlyD can be used as chaperones in the recombinant expression of chimeric polypeptides in E. coli (Ideno, A., et al., Appl. Microbiol. Biotechnol. 64 (2004) 99-105). The E. coli SlyD and FKBP12 polypeptides are reversibly folding polypeptides (Scholz, C., et al., J. Biol. Chem. 271 (1996) 12703-12707).

Löw C., et al. J. Mol. Biol. 398 (2010) 375-390 report the crystal structure and functional characterization of the metallochaperone SlyD from Thermus thermophilus.

The amino acid sequence of the FKBP12 polypeptide comprises a single tryptophan residue at position 60. Thus, FKBP12 mutants can be analyzed for structural integrity simply by analyzing the tryptophan fluorescence (DeCenzo, M. T., et al., Protein Eng. 9 (1996) 173-180). A test for remaining catalytic activity of the FKBP12 mutant can be performed by determining the remaining rotamase activity (Brecht, S., et al., Neuroscience 120 (2003) 1037-1048; Schories, B., et al., J. Pept. Sci. 13 (2007) 475-480; Timerman, A. P., et al., J. Biol. Chem. 270 (1995) 2451-2459). It is also possible to determine the structural integrity of FKBP12 mutants by determining the FK506- or Rapamycin binding (DeCenzo, M. T., et al., Protein Eng. 9 (1996) 173-180).

McNamara, A., et al. (J. Org. Chem. 66 (2001) 4585-4594) report peptides constrained by an aliphatic linkage between two C(alpha) sites: design, synthesis, and unexpected conformational properties of an i,(i+4)-linked peptide.

Suzuki, et al. (Suzuki, R., et al., J. Mol. Biol. 328 (2003) 1149-1160) report the three-dimensional solution structure of an archaic FKBP with a dual function of peptidyl-prolyl-cis-trans isomerase and chaperone-like activities. Expression vector, host, fused polypeptide, process for producing fused polypeptide and process for producing protein are reported in EP 1 516 928. Knappe, T. A., et al., reports that the insertion of a chaperone domain converts FKBP12 into a powerful catalyst of protein folding (J. Mol. Biol. 368 (2007) 1458-1468). A chimeric chimeric polypeptide with superior chaperone and folding activities is reported in WO 2007/077008. In WO 03/000878 the use of FKBP chaperones as expression tool is reported. In EP 1 621 555 an immunogen, composition for immunological use, and method of producing antibody using the same are reported. Rebuzzini, G. (PhD work at the University of Milano-Bicocca (Italy) (2009)) reports a study of the hepatitis C virus NS3 helicase domain for application in a chemiluminescent immunoassay.

In WO 2007/077008 chimeric fusion proteins with superior chaperone and folding activities are reported. The conversion of FKBP12 into a powerful catalyst of protein folding by insertion of a chaperone domain is reported by Knappe et al. (Knappe, T. A., et al., J. Mol. Biol. 368 (2007) 1458-1468).

SUMMARY

The composition as reported herein is a composition of nucleic acid (DNA and/or RNA) molecules encoding a population of chimeric polypeptide species, wherein each nucleic acid molecule encodes a chimeric polypeptide species that comprises a polypeptide according to formula I

NH$_2$—S$_2$—X—S$_1$—COOH (formula I), wherein

X is an amino acid sequence comprising a variable sequence,

S$_2$ and S$_1$ are non-variable and non-overlapping amino acid sequences derived (i) from a polypeptide with peptidyl-prolyl cis/trans-isomerase activity (PPIase activity) or (ii) from a polypeptide from the FKBP-fold domain family, — between two amino acids denotes a peptide bond, and X is inserted in place of the insert-in-flap-domain (IF-domain) of the polypeptide of (i) or the polypeptide of (ii).

In one embodiment of all aspects as reported herein X comprises an amino acid sequence of 5 to 500 residues.

In one embodiment of all aspects as reported herein X comprises an amino acid sequence of 10 to 250 residues.

In one embodiment of all aspects as reported herein X comprises an amino acid sequence of 50 to 150 residues.

In one embodiment of all aspects as reported herein X comprises an amino acid sequence of 5 to 75 residues, specifically 10 to 70 residues, more specifically 10 to 30 residues, more specifically 10 to 20 residues, more specifically 12, 13, 14, 15 or 16 residues.

In one embodiment of all aspects as reported herein X is composed according to formula II

U—O—Z (formula II), wherein

O is an amino acid sequence comprising a variable sequence,

U and Z are selected independently of each other, wherein either is present or absent and, if present, each of U and/or Z is a non-variable amino acid sequence comprising 1 to 10 residues, and U, if present, is linked with a peptide bond to S$_2$, and Z, if present, is linked with a peptide bond to S$_1$.

In one embodiment of all aspects as reported herein each of U and/or Z is an amino acid sequence of 1 to 5 residues, and particularly 4 residues.

In one embodiment of all aspects as reported herein U, if present, is the amino acid sequence GAGS (SEQ ID NO:1), 001 GAGS and Z, if present is the amino acid sequence GSSG (SEQ ID NO:2) or the amino acid sequence GSS (SEQ ID NO:3).

In one embodiment of all aspects as reported herein the amino acid sequence of O is composed of a subset of the naturally occurring amino acid residues.

In one embodiment of all aspects as reported herein each residue of the amino acid sequence of O is independently selected from the list of amino acid residues consisting of Y, F, L, P, D, V, R, Q, S, I, E, G, W, A, H, T, N, K. and M.

In one embodiment of all aspects as reported herein in the population of encoded chimeric polypeptide species the average relative frequency of occurrence of a particular amino acid residue in the amino acid sequence of O is 8.5% to 11.5% for Y, 8.5% to 11.5% for F, 8.5% to 11.5% for L, 5% to 8% for P, 4.5% to 7.5% for D, for 4.5% to 7.5% V, for 4.5% to 7.5% R, for 4% to 7% for Q, 4% to 7% for S, 3.5% to 6.5% for I, 3% to 6% for E, 3% to 6% for G, 3% to 6% for W, 3% to 6% for A, 2.5% to 5.5% for H, 2% to 5% for T, 1% to 4% for N, 0.5% to 3.5% for K, and 0.5% to 2.5% for M.

In one embodiment of all aspects as reported herein the encoded amino acid sequences of S$_2$ and S$_1$ are fragments of a naturally occurring polypeptide, wherein in the naturally occurring polypeptide an IF-domain is located between S$_2$ and S$_1$.

In one embodiment of all aspects as reported herein the encoded amino acid sequences of S$_2$ and S$_1$ are fragments of a naturally occurring polypeptide which is (i) a polypeptide with peptidyl-prolyl cis/trans-isomerase activity (PPIase activity) or (ii) a polypeptide from the FKBP-fold domain family.

In one embodiment of all aspects as reported herein the encoded amino acid sequences of S$_2$ and S$_1$ are fragments of a SlyD polypeptide.

In one embodiment of all aspects as reported herein the encoded amino acid sequences of S$_2$ and S$_1$ are fragments of a polypeptide derived from a thermophile.

In one embodiment of all aspects as reported herein the encoded amino acid sequences of S$_2$ and S$_1$ are fragments of a polypeptide derived from a thermophile bacterium or a thermophile Archaea.

In one embodiment of all aspects as reported herein the encoded amino acid sequences of S$_2$ and S$_1$ are fragments of a polypeptide derived from a thermophile from the family of Thermaceae.

In one embodiment of all aspects as reported herein the encoded amino acid sequences of S$_2$ and S$_1$ are fragments of a polypeptide derived from *Thermus thermophilus*.

In one embodiment of all aspects as reported herein the encoded amino acid sequences of S$_2$ and S$_1$ are fragments of a polypeptide derived from a hyperthermophilic Archaea.

In one embodiment of all aspects as reported herein the encoded amino acid sequences of S$_2$ and S$_1$ are fragments of a polypeptide derived from a thermophile from the class of Thermococci.

In one embodiment of all aspects as reported herein the encoded amino acid sequences of S$_2$ and S$_1$ are fragments of a polypeptide derived from *Thermococcus gammatolerans*.

In one embodiment of all aspects as reported herein, the encoded chimeric polypeptide species comprises a polypeptide is a *Thermus thermophilus* SlyD FKBP chimeric polypeptide, specifically a polypeptide of the sequence of MKVGQDKVVTIRYTLQVEGEVLDQGELSYLHG-HRNLIPGLEEALEGREEG EAFQAHVPAEKAY-X-GKDLDFQVEVVKVREATPEELLHGHA (SEQ ID NO:4) is comprised, wherein X is an amino acid sequence comprising a variable sequence to be displayed by the *Thermus thermophilus* SlyD chimeric polypeptide.

In one embodiment of all aspects as reported herein, the encoded chimeric polypeptide species comprises a polypeptide is a *Thermus thermophilus* SlyD FKBP chimeric polypeptide, specifically a polypeptide of the sequence of MKVGQDKVVTIRYTLQVEGEVLDQGELSYLHGHR-NLIPGLEEALEGREEG EAFQAHVPAEKAY-X-GKD-LDFQVEVVKVREATPEELLHGHAGAGSGAGAGS-GAGAGSPAAVPAA VPAAVGEGEGEFSTPVWISQAQ-GIRAGPQRLSNPQPMRG (SEQ ID NO: 5) is comprised, wherein X is an amino acid sequence comprising a variable sequence to be displayed by the *Thermus thermophilus* SlyD chimeric polypeptide. This polypeptide comprises further a spacer region encoded as a C-terminal fusion.

Further disclosed herein is the use, in an in vitro translation system, of a composition of RNA molecules encoding a population of chimeric polypeptide species, the composition being specified according to any of the embodiments of all aspects as reported herein, for displaying members or nascent members of the encoded population of chimeric polypeptide species in ternary complexes, wherein each ternary complex comprises an RNA molecule of the composition of RNA molecules as mRNA, and a functional ribosome.

Further disclosed herein is the use, in an in vitro transcription/translation system, of a composition of DNA and RNA molecules encoding a population of chimeric polypeptide species, the composition being specified according to any of the embodiments of all aspects as reported herein, for displaying members or nascent members of the encoded population of chimeric polypeptide species in ternary complexes, wherein each ternary complex comprises an RNA molecule of the composition of RNA molecules as mRNA, and a functional ribosome.

Further disclosed herein is a composition comprising a population of ternary complexes, each ternary complex comprising an mRNA and a functional ribosome, the mRNAs of the population of ternary complexes comprising a composition of RNA molecules encoding a population of chimeric polypeptide species according to any of the embodiments of all aspects as reported herein, wherein each ternary complex displays a member or nascent member of an encoded chimeric polypeptide species.

In one embodiment of all aspects as reported herein in a nascent member of an encoded chimeric polypeptide species the distance between the C-terminal peptide bond of $S_2$ and the N-terminal peptide bond of $S_1$ mimics the distance of the corresponding peptide bonds of $S_2$ and $S_1$ connected by an IF domain in a polypeptide derived (i) from a polypeptide with peptidyl-prolyl cis/trans-isomerase activity (PPIase activity) or (ii) from a polypeptide from the FKBP-fold domain family.

In one embodiment of all aspects as reported herein in a nascent member of an encoded chimeric polypeptide species $S_2$ and at least the translated N-terminal part of $S_1$ are folded as in the corresponding full length member of the chimeric polypeptide species, the member having an intact FKBP domain.

Further disclosed herein is a method for identifying an amino acid sequence of a domain X that binds to a predetermined target, the method comprising the steps of
(1) providing as mRNAs a composition of RNA molecules encoding a population of chimeric polypeptide species according to any of the embodiments of all aspects as reported herein;
(2) contacting mRNAs of step (1) with an in vitro translation system and translating the mRNAs, and forming a composition comprising a population of ternary complexes, each ternary complex comprising an mRNA and a functional ribosome, wherein each ternary complex displays a nascent member of an encoded chimeric polypeptide species;
(3) contacting ternary complexes obtained in step (2) with the predetermined target under aqueous binding conditions capable of maintaining intact ternary complexes and suitable for specific non-covalent binding of nascent members to the target, thereby forming a mixture of unbound and bound ternary complexes, wherein the bound ternary complexes comprise nascent members of chimeric polypeptide species, the nascent members being bound to the target;
(4) separating intact ternary complexes bound to the target from unbound ternary complexes by washing the intact bound ternary complexes with a wash solution and removing unbound ternary complexes;
(5) dissociating target-bound ternary complexes obtained in step (4), and synthesizing cDNAs from mRNA of the dissociated ternary complexes;
(6) determining in a cDNA obtained in step (5) the nucleic acid sequence encoding the domain X, and deducing therefrom the amino acid sequence of X,
thereby identifying the amino acid sequence of a domain X that binds to the predetermined target.

In a specific embodiment, after step (5) performed for the first time and prior to performing step (6), the steps (5a) and (5b) are performed consecutively a desired number of times, wherein
(5a) comprises synthesizing mRNAs from cDNAs obtained in the latest performed step (5), thereby providing newly synthesized mRNAs comprising a further composition of RNA molecules encoding a population of chimeric polypeptide species according to any of the embodiments of all aspects as reported herein, followed by
(5b) comprises performing steps 2 to 5 with newly synthesized mRNAs, and step (6) is performed with the cDNA obtained in the latest performed step (5).

In a further specific embodiment, the number of times the steps (5a) and (5b) are consecutively performed is 1 to 12, more specifically the number of times is selected from 1, 2, 3, 4, 5, and 6.

In a further specific embodiment, step (6) is performed for a plurality of cDNAs obtained in step (5) or the latest performed step (5), thereby identifying amino acid sequences of a plurality of species of domain X (domain X species), wherein each of the domain X species is derived from a chimeric polypeptide species, and wherein each domain X species binds to the predetermined target.

In a further specific embodiment, in step (6) nucleic acid sequences of cDNAs are determined in parallel by way of high-throughput sequencing.

In a further specific embodiment, the amino acid sequences deduced for the domain X species are grouped according to consensus sequences,
thereby providing one or more groups with members, each member being derived from the amino acid sequence encoded by a separately determined cDNA,
wherein the members within the same group are characterized by a common consensus amino acid sequence, and the consensus amino acid sequence is a contiguous subsequence of the amino acid sequences of the domain X species within the group.

In a further specific embodiment, an amino acid sequence of the domain X in the group with the largest number of members is selected, thereby identifying the amino acid sequence of a domain X that binds to the predetermined target.

In a further specific embodiment, the amino acid sequences deduced for the domain X species are grouped according to sequence identity,
thereby providing one or more groups with members, each member being derived from the amino acid sequence encoded by a separately determined cDNA,
wherein the members within the same group are characterized by an identical amino acid sequence.

In a further specific embodiment, the amino acid sequence of the domain X of the group with the largest number of members is selected, thereby identifying the amino acid sequence of a domain X that binds to the predetermined target.

Further disclosed herein is a method for producing a constrained polypeptide, the constrained polypeptide being a specific binder of a predetermined target, the method comprising the steps of
(1) identifying, according to a method according to any of the embodiments of all aspects as reported herein, an amino acid sequence of a domain X that binds to the predetermined target, wherein the domain X is identified as a domain replacing the IF-domain in (i) a polypeptide with peptidyl-prolyl cis/trans-isomerase activity (PPIase activity) or (ii) a polypeptide from the FKBP-fold domain family;
(2) providing a linear polypeptide comprising the amino acid sequence of the domain X identified in step (1);
(3) connecting the N-terminus and C-terminus of the polypeptide of step (2), wherein the distance of the connected N-terminus and C-terminus of the polypeptide mimics the distance of the connected N-terminus and C-terminus of the IF-domain, of (i) the polypeptide with peptidyl-prolyl cis/trans-isomerase activity (PPIase activity) or (ii) the polypeptide from the FKBP-fold domain family;
thereby producing the constrained polypeptide, the constrained polypeptide being a specific binder of the predetermined target.

In a specific embodiment, in the constrained polypeptide the distance between the connected N-terminus and C-terminus of the polypeptide is $4 \times 10^{-10}$ m to $6 \times 10^{-10}$ m.

In a further specific embodiment, in step (3) the N-terminus and the C-terminus of the polypeptide are connected covalently with a linking group.

In a further specific embodiment, the amino acid sequence of the polypeptide is free of cysteine residues.

In a further specific embodiment, either in step (2) or in step (3) a cysteine residue is added to each of the N-terminus and the C-terminus of the polypeptide, and a disulfide bond is formed between the two added cysteine residues, thereby producing the constrained polypeptide, the constrained polypeptide being a specific binder of the predetermined target.

In a further specific embodiment, a further amino acid residue is added to an added cysteine residue.

Further disclosed herein is a method of assaying a predetermined target (target) in a sample suspected of containing the target, the method comprising the steps of
(1) identifying, according to a method according to any of the embodiments of all aspects as reported herein, an amino acid sequence of a domain X that binds to the predetermined target, wherein the domain X is identified as a domain replacing the IF-domain in (i) a polypeptide with peptidyl-prolyl cis/trans-isomerase activity (PPIase activity) or (ii) a polypeptide from the FKBP-fold domain family;
(2) providing a chimeric polypeptide that comprises a polypeptide according to formula I

wherein
X is the amino acid sequence identified in step (1),
$S_2$ and $S_1$ are non-variable and non-overlapping amino acid sequences derived (i) from a polypeptide with peptidyl-prolyl cis/trans-isomerase activity (PPIase activity) or (ii) from a polypeptide from the FKBP-fold domain family,
— between two amino acids denotes a peptide bond, and
X is inserted in place of the insert-in-flap-domain (IF-domain) of the polypeptide of (i) or the polypeptide of (ii);
(3) contacting the sample with the chimeric polypeptide of step (2) under conditions permitting specific binding of the chimeric polypeptide to the target, thereby forming a mixture of unbound and, if target is present, bound chimeric polypeptide, the bound chimeric polypeptide being bound to the target, thereby providing a treated sample;
(4) removing, under conditions permitting specific binding, unbound chimeric polypeptide from the treated sample of step 3, thereby providing a probed sample;
(5) detecting the chimeric polypeptide in the probed sample of step (4), wherein presence of chimeric polypeptide in the probed sample is indicative of target being present in the sample;
thereby assaying the predetermined target in the sample suspected of containing the predetermined target.

In a specific embodiment, in step (5) the chimeric polypeptide is detected quantitatively in the probed sample of step (4).

Further disclosed herein is a method of assaying a predetermined target (target) in a sample suspected of containing the target, the method comprising the steps of
(1) providing a constrained polypeptide being a specific binder of the predetermined target, the constrained polypeptide being produced by a method according to any of the embodiments of all aspects as reported herein;
(2) contacting the sample with the constrained polypeptide of step (1) under conditions permitting specific binding of the constrained polypeptide to the target, thereby forming a mixture of unbound and, if target is present, bound constrained polypeptide, the bound constrained polypeptide being bound to the target, thereby providing a treated sample;
(3) removing, under conditions permitting specific binding, unbound constrained polypeptide from the treated sample of step 3, thereby providing a probed sample;
(4) detecting the constrained polypeptide in the probed sample of step (4), wherein presence of constrained polypeptide in the probed sample is indicative of target being present in the sample;
thereby assaying the predetermined target in the sample suspected of containing the predetermined target.

In a specific embodiment, in step (4) the constrained polypeptide is detected quantitatively in the probed sample of step (3).

DETAILED DESCRIPTION

Definition Section

The number of conformational possibilities in a polypeptide can be reduced by introducing a "constraint" to reduce the flexibility of the polypeptide chain. One non-limiting example for constraining of naturally occurring polypeptides includes formation of macrocycles through disulfide bonds. Without constrainment in place, the intramolecular interactions that maintain a polypeptide chain in a specific folded structure are weak. Only a large number of weak interactions can compensate for the conformational entropy lost when the polypeptide adopts a single major conformation. Generally, a particular conformation of a polypeptide is stabilized by reducing the conformational entropy that is lost upon folding into such a conformation. Such loss of entropy is also referred to as "entropy cost". Where binding to a predetermined target is the object, a constraint that locks-in the active conformation of a target-binding polypeptide results in an increased affinity to the target, as there is little conformational entropy loss upon binding to the target. Several approaches to stabilize a polypeptide by way of constraining are known to the art, including means of synthetic organic chemistry. Constrained polypeptides are discussed in Rizo J. & Gierasch L. M. Annu. Rev. Biochem. 61 (1992) 387-418 and elsewhere.

As used herein, the terms "conformationally restricted polypeptides", "structurally constrained polypeptides", "constrained polypeptides" and "conformationally constrained polypeptides" are used interchangeably and are meant to refer to polypeptides which, for example through intramolecular bonds, are conformationally stabilized and remain in a sufficiently constant conformation to maintain the polypeptide's level of function and activity more consistently. They include modified polypeptides having any (i.e., at least one) chemical modification, e.g., a chemical modification to incorporate a molecular tether; chemical modification to promote the formation of a disulfide bridge; etc. such that the structurally constrained peptide adopts a more limited number of structures than the unmodified peptide. It is understood that a species of constrained polypeptides in solution may not all have the desired confirmation all of the time. Instead, in a population of structurally constrained peptides in solution, the desired confirmation is present at least about 30%, 40%, 50%, 60%, 70%, 80%, 90%, 100%, or more of the time than the native or original peptide sequence in solution prior to modification. The structure of a species of polypeptides in solution can be determined by various methods known to those of skill in the art including, but not limited to, circular dichroism and NMR spectroscopy. Xray crystallography can be applied to determine the structure of a constrained polypeptide when packed in the form of a crystal.

As used herein, the term "linking amino acid residue" is meant to refer to an amino acid residue in an amino acid sequence which when linked to a non-adjacent amino acid residue results in cyclizing at least a portion of the peptide.

The term "target" [as in US20110182895A1] herein refers to a predetermined structure to which a specific binding agent as herein defined binds. The target may be polypeptide, carbohydrate, nucleic acid, lipid, hapten or other naturally occurring or synthetic compound. The terms antigen, antigen epitope and epitope are encompassed by the term "target".

As used herein, the term "protein scaffold" or "scaffold" refers to a conformationally constant, stably folding polypeptide entity capable of displaying a multitude of amino-acid sequences as a separate (i.e. as a non-scaffold) segment or domain in a localized surface region. A scaffold is particularly useful for discovery and engineering of such separate domains capable of interacting with and/or specifically binding to a predetermined target such as an antigen or an antigen epitope, an active site of a bioactive molecule, etc. Desirable physical properties of a protein scaffold include high thermal stability and reversibility of thermal folding and unfolding.

As used herein, the term "display" and "displaying" refers to the provision of one or more structure(s) and particularly a multitude of structures that may form part or all of a library, wherein the structure(s) is/are made available for selection based upon a specified characteristic. The specified characteristic may be a physical, chemical or functional characteristic. A specific embodiment of a displayed structure is a displayed polypeptide. An example therefor is a composition with ternary (tripartite) complexes, wherein each ternary complex comprises a functional ribosome, an mRNA encoding a polypeptide, and a nascent polypeptide encoded by the mRNA in the particular complex. Another specific embodiment of a displayed structure is a displayed amino acid sequence segment comprised in a polypeptide. An example for the latter is a protein scaffold with a displayed separate domain, wherein the domain comprises a nucleic acid sequence segment.

The display methods specifically disclosed herein link the coding function of a nucleic acid molecule and the physical, chemical and/or functional characteristics of the polypeptide encoded by the nucleic acid molecule. When such a display method is employed, polypeptides that have a desired physical, chemical and/or functional characteristic can be selected and the nucleic acid molecule encoding the selected polypeptide is readily isolated. Several display methods that link the coding functionality of a nucleic acid molecule with the associated polypeptide product are known in the art, for example, bacteriophage display (phage display), ribosome display, emulsion compartmentalization and display, yeast display, puromycin display (also known as mRNA display), bacterial display, display on plasmid, covalent display, CIS display and the like.

The term "library" refers to a mixture of heterogeneous polypeptides or nucleic acid molecules, also referred to as "population" of polypeptides or nucleic acid molecules. The library is composed of a plurality of "species", each of which has a substantially unique amino acid or nucleotide sequence. Sequence differences between library species are responsible for the diversity present in the library or population. In the present disclosure the library may take the form of a simple mixture of polypeptides or nucleic acid molecules, or may be present in the form of biological complexes in a biochemical environment for translation or combined transcription and translation.

In an embodiment disclosed herein the library may comprise a population of nucleic acid molecule in the form of RNA, wherein each RNA comprises an open reading frame encoding a particular polypeptide species. RNA as disclosed herein may serve as a template for translation in vitro; in such a case the RNA comprises all structural features necessary for forming a ternary complex together with a functional ribosome and for initiating and sustaining translation of the polypeptide species encoded by the RNA. An RNA molecule including these structural features required for translation is referred to as "mRNA", "mRNA molecule" or "RNA molecule as mRNA". In a specific embodiment of ribosome display the mRNA includes one or more structural feature(s) preventing dissociation of the ribosome, the translated polypeptide species and the mRNA encoding the polypeptide species. In a specific embodiment of mRNA display, the mRNA is connected to a puromycin molecule via a linking moiety.

A biochemical environment for translation or combined transcription and translation can be provided in the form of cell-free extracts optionally including a DNA-dependent RNA polymerase, the extracts being known to the art of in vitro transcription and/or protein expression, and to the art of ribosome display. Accordingly, in a specific embodiment the library may be present as a population of ternary complexes (exemplifying biological complexes), each ternary complex comprising a mRNA and a functional ribosome, the mRNAs of the population of ternary complexes comprising a composition of RNA molecules encoding a population of polypeptide species, wherein each ternary complex displays a nascent member of an encoded chimeric polypeptide species. Thus, the aforementioned also represents a library of nascent polypeptide species. Typically, a single ternary complex contains only one species of the mRNA/nascent polypeptide libraries.

Following mRNA display mRNA may be reverse-transcribed to cDNA. A nucleic acid molecule in the form of DNA such as cDNA may be multiplied by way of the polymerase chain reaction (PCR). In such a case, extended primer sequences are useful to optionally fuse e.g. a promotor sequence upstream to the nucleotide sequence encoding a particular polypeptide species.

In an embodiment including transcription/translation a library of nucleic acid molecules encoding the library of polypeptide species is initially present in the form of DNA molecules. Upstream of the open reading frame each DNA molecule includes a promotor sequence facilitating transcription of mRNA. Exemplified in a specific embodiment, the promotor is a T7 promotor or a functional variant thereof, and T7 polymerase or a functional variant thereof is the DNA-dependent RNA polymerase used for transcribing DNA to form mRNA.

The term "member" denotes a single object, typically a polypeptide of a nucleic acid molecule, which belongs to a group, wherein all members of the group share at least one common feature, typically a shared contiguous sequence of amino acid residues or nucleotides. In a specific embodiment, all members in a given group are identical.

The term "species" as used herein denotes a group within a population, the group having one or more member(s), wherein in the case of a plurality of members all members of the same group are identical. Typically a multitude of different species is comprised in a population.

The term "amino acid" in the context of the present invention is used in its broadest sense and is meant to include naturally occurring L a-amino acids or residues, as well as mimetics thereof. The commonly used one and three letter abbreviations for naturally occurring amino acids are used herein: A=Ala; C=Cys; D=Asp; E=Glu; F=Phe; G=Gly; H=His; I=Ile; K=Lys; L=Leu; M=Met; N=Asn; P=Pro; Q=Gln; R=Arg; S=Ser; T=Thr; V=Val; W=Trp; and Y=Tyr (Lehninger, A. L, (1975) Biochemistry, 2d ed., pp. 71-92, Worth Publishers, New York).

An "amino acid mimetic" refers to a moiety, other than a naturally occurring amino acid, that conformationally and functionally serves as a substitute for a particular amino acid in a peptide-containing compound without adversely interfering to a significant extent with the function of the compound (e.g., binding to a target). In some circumstances, substitution with an amino acid mimetic may actually enhance properties of the compound (e.g., interaction of the compound with the target). Examples of amino acid mimetics include D-amino acids. Peptides substituted with one or more D-amino acids may be made using well known peptide synthesis procedures.

A "polypeptide" is a polymer of two or more amino acid residues joined by peptide bonds, whether produced naturally or biochemically in vitro or by means of chemical synthesis. Polypeptides of less than around 12 amino acid residues in length may also be referred to as "peptides" and those between about 12 and about 30 amino acid residues in length may be referred to as "oligopeptides". Polypeptides can also undergo maturation or post-translational modification processes that may include, but are not limited to: glycosylation, proteolytic cleavage, lipidization, signal peptide cleavage, propeptide cleavage, phosphorylation, and such like. The term "protein" is used herein to refer to a macromolecule comprising one or more polypeptide chains.

The term "chimeric polypeptide" refers to a polypeptide whose amino acid sequence represents a fusion product of subsequences of the amino acid sequences from at least two distinct origins. A chimeric protein typically is not produced by direct manipulation of amino acid sequences, but, rather, is expressed from a "chimeric" nucleic acid molecule that encodes the chimeric amino acid sequence. Thus, the chimeric polypeptide may be created through the joining in-frame of two or more coding nucleic acid sequences which originally code for separate polypeptides or polypeptide domains. In a specific embodiment, translation of the fused coding sequence results in a single polypeptide with functional properties derived from each of the original polypeptides or polypeptide domains.

A "domain" as referred to herein, is a tertiary polypeptide structure independent of the rest of a protein to which the domain may be linked, either covalently or otherwise. Domains can be responsible for specific functional properties of polypeptides or proteins, and in many cases may be added, removed or transferred to other polypeptides without loss of function of the domain itself. In a specific embodiment herein a domain is capable of binding specifically to a target.

The "percentage of sequences identity" is determined by comparing two optimally aligned sequences over a comparison window, wherein the portion of the sequence in the comparison window can comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The term "identical" in the context of two or more nucleic acids or polypeptide sequences, refer to two or more sequences or subsequences that are the same. Sequences are "substantially identical" to each other if they have a specified percentage of nucleotides or amino acid residues that are the same (e.g., at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% identity over a specified region), when compared and aligned for maximum correspondence over a comparison window, or designated region as measured using one of the following sequence comparison algorithms or by manual alignment and visual inspection. These definitions also refer to the complement of a test sequence. Optionally, the identity exists over a region that is at least about 50 nucleotides in length, or more typically over a region that is 100 to 500 or 1000 or more nucleotides in length.

The terms "similarity" or "percent similarity" in the context of two or more polypeptide sequences, refer to two or more sequences or subsequences that have a specified percentage of amino acid residues that are either the same or similar as defined by a conservative amino acid substitutions (e.g., 60% similarity, optionally 65%, 70%, 75%, 80%, 85%, 90%, or 95% similar over a specified region), when compared and aligned for maximum correspondence over a comparison window, or designated region as measured using one of the following sequence comparison algorithms or by manual alignment and visual inspection. Sequences are "substantially similar" to each other if they are at least 20%, at least 25%, at least 30%, at least 35%, at least 40%, at least 45%, at least 50%, or at least 55% similar to each other. Optionally, this similarly exists over a region that is at least about 50 amino acids in length, or more typically over a region that is at least about 100 to 500 or 1000 or more amino acids in length. For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters are commonly used, or alternative parameters can be designated. The sequence comparison algorithm then calculates the percent sequence identities or similarities for the test sequences relative to the reference sequence, based on the program parameters.

As used herein, "detecting", "detection" and the like are understood that an assay performed for identification of a specific analyte in a sample, a product from a reporter construct in a sample, or an activity of an agent in a sample.

Ranges provided herein are understood to be shorthand for all of the values within the range. This includes all individual sequences when a range of SEQ ID NOs: is provided. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

The terms "a", "an" and "the" generally include plural referents, unless the context clearly indicates otherwise. As used herein, "plurality" is understood to mean more than one. For example, a plurality refers to at least two, three, four, five, or more. Unless specifically stated or obvious from context, as used herein, the term "or" is understood to be inclusive.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about.

A "sample" as used herein refers to a biological material that is isolated from its environment (e.g., blood or tissue from an animal, cells, or conditioned media from tissue culture) and is suspected of containing, or known to contain an analyte, such as a virus, an antibody, or a product from a reporter construct. A sample can also be a partially purified fraction of a tissue or bodily fluid.

An agent, polypeptide, nucleic acid, or other compound "specifically binds" a target, e.g., antigen, polypeptide, nucleic acid, or other compound, when the target is bound with at least 50-fold, specifically at least 100-fold, specifically at least 500-fold, specifically at least 1000-fold, specifically at least a 5000-fold, specifically at least a 10,000-fold preference as compared to a non-specific compound, or a pool of non-specific compounds. Specifically binds can be used in relation to binding one of two or more related compounds that have physically related structures. Binding preferences and affinities, absolute or relative, can be determined, for example by determining the affinity for each pair separately or by the use of competition assays or other methods well known to those of skill in the art.

The term "panning" as used herein refers to the process of an affinity selection technique which selects for peptides or polypeptides, specifically chimeric polypeptides (collectively also referred to as "binders") that bind to a predetermined (given) target. The process of panning involves four major steps for selection of binders. The first step is to provide a display library. In a specific embodiment the display library is a composition comprising a population of ternary complexes as described in any of the embodiments disclosed herein. The second step is the capturing step. It involves contacting the display library with the desired target. In a specific embodiment the target is immobilized. By way of specific binding interaction only specific displayed binding domains presented by any of the peptides, polypeptides, and chimeric polypeptides are bound to the target. The third step is a separation step, subsequent to the capturing step, to separate the bound members of the display library from unbound members by way of removing the unbound members. In a specific embodiment the separation is performed as a washing step wherein a mixture comprising immobilized target with bound members of the display library is washed, thereby removing unbound members. As a result of the separation step, target-bound members of the display library are retained. The fourth step is a recovery step where the bound members or components thereof are recovered and/or enriched and/or purified, for further processing and/or characterization.

[ASK] The term "denotes a polypeptide that has the following amino acid sequence" denotes a polypeptide of the given amino acid sequence and also includes variants thereof that have the same properties as the polypeptide with respect to X. In one embodiment the term denotes a polypeptide with at least 70% amino acid sequence identity. In one embodiment the term denotes a polypeptide with at least 80% amino acid sequence identity. In one embodiment the term denotes a polypeptide with at least 90% amino acid sequence identity. In one embodiment the term denotes a polypeptide with at least 95% amino acid sequence identity. In one embodiment the term denotes a polypeptide with at least 98% amino acid sequence identity.

The term "*E. coli* SlyD" denotes a polypeptide that has the following amino acid sequence:

(SEQ ID NO: 6)
MKVAKDLVVSLAYQVRTEDGVLVDESPVSAPLDYLHGHGSLISGLETALE

GHEVGDKFDVAVGANDAYGQYDENLVQRVPKDVFMGVDELQVGMRFL

AETDQGPVPVEITAVEDDHVVVDGNHMLAGQNLKFNVEVVAIREATEEEL

AHGHVHGAHDHHHDHDHD.

This amino acid sequence and variants thereof are individual aspects as reported herein.

If a polypeptide is produced in or derived from *E. coli* the amino-terminal methionine residue is usually not efficiently cleaved off by proteases, thus the amino-terminal methionine residue is partially present in the produced polypeptide. In order to account for this all sequence are given with the starting methionine residue.

The term "*Thermus thermophilus* SlyD" denotes a polypeptide that has the following amino acid sequence:

(SEQ ID NO: 7)
MKVGQDKVVTIRYTLQVEGEVLDQGELSYLHGHRNLIPGLEEALEGREEG

EAFQAHVPAEKAYGPHDPEGVQVVPLSAFPEDAEVVPGAQFYAQDMEGN

PMPLTVVAVEGEEVTVDFNHPLAGKDLDFQVEVVKVREATPEELLHGHA

H.

This amino acid sequence and variants thereof are individual aspects as reported herein.

The term "*Thermococcus gammatolerans* SlyD" denotes a polypeptide that has the following amino acid sequence:

(SEQ ID NO: 8)
MKVERGDFVLFNYVGRYENGEVFDTSYESVAREQGIFVEEREYSPIGVTV

GAGEIIPGIEEALLGMELGEKKEVVVPPEKGYGMPREDLIVPVPIEQFTS

AGLEPVEGMYVMTDAGIAKILKVEEKTVRLDFNHPLAGKTAIFEIEVVEI

KKAGEA.

This amino acid sequence and variants thereof are individual aspects as reported herein.

The term "human FKBP12" denotes a polypeptide that has the following amino acid sequence:

(SEQ ID NO: 9)
MGVQVETISPGDGRTFPKRGQTCVVHYTGMLEDGKKFDSSRDRNKPFKFM

LGKQEVIRGWEEGVAQMSVGQRAKLTISPDYAYGATGHPGIIPPHATLVF

DVELLKLE.

This amino acid sequence and variants thereof are individual aspects as reported herein.

The term "*Arabidopsis thaliana* FKBP13" denotes a polypeptide that has the following amino acid sequence:

(SEQ ID NO: 10)
ETTSCEFSVSPSGLAFCDKVVGYGPEAVKGQLIKAHYVGKLENGKVFDSS

YNRGKPLTFRIGVGEVIKGWDQGILGSDGIPPMLTGGKRTLRIPPELAYG

DRGAGCKGGSCLIPPASVLLFDIEYIGKA.

This amino acid sequence and variants thereof are individual aspects as reported herein.

The term "FKBP12 chimeric polypeptide" denotes a polypeptide that has the following amino acid sequence:

(SEQ ID NO: 11)
MRSGVQVETISPGDGRTFPKRGQTAVVHYTGMLEDGKKFDSSRDRNKPFK

FMLGKQEVIRGWEEGVAQMSVGQRAKLTISPDYAYG-X-TLVFDVELLKL

E, wherein X is an amino acid sequence comprising a variable sequence to be displayed by the FKBP12 chimeric polypeptide.

This amino acid sequence and variants thereof are individual aspects as reported herein.

The term "*Thermus thermophilus* SlyD chimeric polypeptide" denotes a polypeptide that has the following amino acid sequence:

(SEQ ID NO: 12)
MRSKVGQDKVVTIRYTLQVEGEVLDQGELSYLHGHRNLIPGLEEALEGRE

EGEAFQAHVPAEKAY-X-GKDLDFQVEVVKVREATPEELLHGHAH, wherein X is an amino acid sequence comprising a variable sequence to be displayed by the *Thermus thermophilus* SlyD chimeric polypeptide.

This amino acid sequence and variants thereof are individual aspects as reported herein.

The term "*Thermococcus gammatolerans* SlyD chimeric polypeptide" denotes a polypeptide that has the following amino acid sequence:

(SEQ ID NO: 13)
MKVERGDFVLFNYVGRYENGEVFDTSYESVAREQGIFVEEREYSPIGVTV

GAGEIIPGIEEALLGMELGEKKEVVVPPEKGYGMP-X-AGKTAIFEIEVV

EIKKAGEA wherein X is an amino acid sequence comprising a variable sequence to be displayed by the *Thermococcus gammatolerans* SlyD chimeric polypeptide.

This amino acid sequence and variants thereof are individual aspects as reported herein.

The term "*Thermus thermophilus* SlyD-FKBP13 chimeric polypeptide" denotes a polypeptide that has the following amino acid sequence:

(SEQ ID NO: 14)
GDRGAGCGS-X-GSSCLIPPASVLDFQVEVVKVREATPEELLHGHAH, wherein X is an amino acid sequence comprising a variable sequence to be displayed by the *Thermus thermophilus* SlyD-FKBP13 chimeric polypeptide.

This amino acid sequence and variants thereof are individual aspects as reported herein.

The term "*Arabidopsis thaliana* FKBP13 chimeric polypeptide" denotes a polypeptide that has the following amino acid sequence:

(SEQ ID NO: 15)
ETTSCEFSVSPSGLAFCDKVVGYGPEAVKGQLIKAHYVGKLENGKVFDSS

YNRGKPLTFRIGVGEVIKGWDQGILGSDGIPPMLTGGKRTLRIPPELAYG

DRGAGCGS-X-GSSCLIPPASVLLFDIEYIGKA, wherein X is an amino acid sequence comprising a variable sequence to be displayed by the *Arabidopsis thaliana* FKBP13 chimeric polypeptide.

This amino acid sequence and variants thereof are individual aspects as reported herein.

The term "*Thermus thermophilus* SlyD FKBP chimeric polypeptide" denotes a polypeptide that has the following amino acid sequence:

(SEQ ID NO: 16)
MKVGQDKVVTIRYTLQVEGEVLDQGELSYLHGHRNLIPGLEEALEGREEG

EAFQAHVPAEKAY-X-GKDLDFQVEVVKVREATPEELLHGHA, wherein X is an amino acid sequence comprising a variable sequence to be displayed by the *Thermus thermophilus* SlyD chimeric polypeptide.

This amino acid sequence and variants thereof are individual aspects as reported herein.

A specific embodiment of a *Thermus thermophilus* SlyD FKBP chimeric polypeptide is a polypeptide that has the following amino acid sequence:

```
                                          (SEQ ID NO: 17)
MKVGQDKVVTIRYTLQVEGEVLDQGELSYLHGHRNLIPGLEEALEGREEG

EAFQAHVPAEKAY-X-GKDLDFQVEVVKVREATPEELLHGHAGAGSGAGA

GSGAGAGSPAAVPAAVPAAVGEGEGEFSTPVWISQAQGIRAGPQRLSNPQ

PMRG,
``` wherein X is an amino acid sequence comprising a variable sequence to be displayed by the *Thermus thermophilus* SlyD chimeric polypeptide. This specific embodiment encompasses a spacer region encoded as a C-terminal fusion as presented in the Definition This amino acid sequence and variants thereof are individual aspects as reported herein.

In a more specific embodiment thereof, X is GAGS-O-GSS, wherein O is an amino acid sequence comprising a variable sequence to be displayed by the *Thermus thermophilus* SlyD chimeric polypeptide.

The chimeric polypeptides as reported herein are based on polypeptides from the FKBP domain protein family (i.e. proteins with PPIase activity), such as human FKBP12 (Handschumacher, R. E., et al., Science 226 (1984) 544-547), or *Arabidopsis thaliana* FKBP13, or *E. coli* SlyD, or *Thermos thermophilus* SlyD, or *Thermococcus gammatolerans* SlyD. The chimeric polypeptides as reported herein are a scaffold for the presentation of polypeptides comprised in the amino acid sequence of X.

The amino acid sequence of X can replace the Flap domain (amino acid residues A85 to A96) and the beta-bulge (amino acid residues S39 to P46) in the FKBP12 part and/or the IF domain (amino acid residues G69 to D120) in SlyD part.

Any amino acid sequence can be inserted as domain X, such as helices, helix-turn-helix motifs, coiled coil structures, helix bundles, turn-loop motifs, beta-hairpin structures, beta sheets, sheet-helix motifs, sheet-turn-sheet motifs etc. It is also possible to display defined native tertiary structures, individual domains of a multi-domain polypeptide or subdomains, binding domains, antibody fragments, enzymes etc. Particularly suited are naturally occurring polypeptides or domains comprising about 100 amino acids or more which, in their native state, are characterized by N-termini and C-termini closely (in the range of $4 \times 10^{-10}$ m to about $10 \times 10^{-10}$ m) localized to each other.

The chimeric polypeptides as reported herein are suitable scaffolds for mimicking a structural plurality of peptidic secondary structure motives (including domains X and O).

*Thermus Thermophilus* SlyD (Loew, C., et al., J. Mol. Biol. 398 (2010) 375-390) originates from the archaic bacterium *Thermus Thermophilus*. *Thermococcus gammatolerans* SlyD originates from the Archaea *Thermococcus gammatolerans*. Both proteins show elevated thermodynamic stability in contrast to human FKBP12, FKBP13, chimeric FKBP12/13, as well as *E. coli* SlyD.

*Thermus thermophilus* SlyD as well as *Thermococcus gammadurans* SlyD are highly stable proteins with the ability to reversibly fold even when their Flap domain is being replaced by a foreign amino acid insertion X. These molecules can be used in ribosome display, basically according to the method of Mattheakis, L. C., et al. Proc. Natl. Acad. Sci USA 91 (1994) 9022-9026) to display a polypeptide sequence X in the frames of *Thermus thermophilus* SlyD or *Thermococcus gammadurans* SlyD. The so called ternary complex consists of (1) the ribosomal subunits attached to the (2) mRNA encoding the genetic information of the (3) ribosomally presented chimeric polypeptide or nascent chimeric polypeptide.

[ASK] The chimeric polypeptides as reported herein can be used for generating with a multitude of variable sequences. The libraries can be screened to select among the chimeric polypeptides those species of which the amino acid sequence of (ii) is capable of specifically binding to a target. In the resulting selected binder the amino acid sequence is inserted into the one or more parts derived from the one or more polypeptides with PPIase activity or belonging to the FKBP family.

A particular embodiment disclosed herein is library screening by way of ribosome display. [Plückthun] An important concept of ribosome display is to translate a library of mRNA molecules with a stoichiometric quantity of functional ribosomes. If an mRNA molecule has no stop codon, the ribosome will frequently run to the very end of the mRNA molecule. The corresponding polypeptide emerges from the ribosome while its end is still within the ribosomal tunnel, and its last amino acid is still connected to the peptidyl-tRNA. The release of the polypeptide from the ribosome is normally catalyzed by the release factors, which are proteins that bind to the stop codons UGA, UGG, and UAA, taking the place of a tRNA in normal "sense" codons. In the absence of stop codons, this binding of release factors does not happen. Furthermore, the mRNA can only be released from the ribosome after the newly synthesized protein and the tRNA have already dissociated, and this is caused by the ribosome recycling factor. Thus, the ribosomes which translate mRNA without stop codons will be trapped in a form where the translated polypeptide has emerged from the ribosome and the mRNA is also still connected to the ribosome, thereby connecting phenotype (the translated polypeptide) and genotype (the mRNA). The actual reaction therefore consists of a brief in-vitro translation reaction which is stopped under appropriate conditions.

A particular embodiment disclosed herein is composition of nucleic acid (DNA and/or RNA) molecules according to any of the embodiments of all aspects as reported herein, the nucleic acid molecules encoding a population of chimeric polypeptide species, wherein in each nucleic acid molecule the sequence encoding the particular species of chimeric polypeptide is fused to a further sequence encoding a C-terminal tether. In a specific embodiment, the tether is capable of filling a ribosomal tunnel.

[Item 1] The polypeptides as reported herein are particularly useful in different embodiments of display, including phage display, mRNA display and ribosome display. Specifically, the present disclosure presents a composition of nucleic acid molecules encoding a population of polypeptides which more specifically are chimeric polypeptides. They can be used for peptide, secondary and tertiary structure display including methods for screening/selection for target-binding of a variable domain comprised in the chimeric polypeptides. The polypeptides as reported herein can be recombinantly produced, are thermodynamically stable, monomeric and soluble in aqueous solutions.

One aspect as disclosed herein is a composition of nucleic acid (DNA and/or RNA) molecules encoding a population of chimeric polypeptide species, wherein each nucleic acid molecule encodes a chimeric polypeptide species that comprises a polypeptide according to formula I $$NH_2—S_2—X—S_1—COOH \quad \text{(formula I)},$$

wherein
X is an amino acid sequence comprising a variable sequence,
$S_2$ and $S_1$ are non-variable and non-overlapping amino acid sequences derived (i) from a polypeptide with peptidyl-prolyl cis/trans-isomerase activity (PPIase activity) or (ii) from a polypeptide from the FKBP-fold domain family,
— between two amino acids denotes a peptide bond, and
X is inserted in place of the insert-in-flap-domain (IF-domain) of the polypeptide of (i) or the polypeptide of (ii).

In one embodiment of all aspects as reported herein, the nucleic acids are in the form of mRNAs, that is to say in the specific embodiment the nucleic acids are RNA molecules capable of being translated by functional ribosomes. In yet a further specific embodiment in each of the mRNAs the reading frame encoding the chimeric polypeptide [according to Plückthun] lacks a stop codon, particularly a stop codon selected from the group consisting of UGA, UGG, and UAA.

The encoded chimeric polypeptides as reported herein are chimeric polypeptides comprising (i) one or more parts derived from one, i.e. the same, or different polypeptides with PPIase activity or belonging to the FKBP family, and (ii) an amino acid sequence comprising a variable sequence (denoted "X" or "domain X") inserted therein in between. Specifically, a variable amino acid sequence of X is inserted in place of the insert-in-flap-domain (IF-domain) of the SlyD part of the chimeric polypeptide as reported herein.

In one embodiment of all aspects as reported herein X can be selected from a fragment of a naturally occurring polypeptide or X comprises a randomized amino acid sequence.

[Items 2-5] In one embodiment of all aspects as reported herein X comprises an amino acid sequence of 5 to 500 residues, particularly 10 to 250 residues, particularly 50 to 150 residues, particularly 5 to 75 residues. In specific embodiments X comprises an amino acid sequence of 12, 13, 14, 15 or 16 residues.

[Item 22] Further, herein disclosed is the use, in an in vitro translation system, of a composition of RNA molecules encoding a population of chimeric polypeptide species, the composition being specified according to any of the embodiments of all aspects as reported herein, for displaying members or nascent members of the encoded population of chimeric polypeptide species in ternary complexes, wherein each ternary complex comprises an RNA molecule of the composition of RNA molecules as mRNA, and a functional ribosome. [Item 23] Further, there is disclosed herein the use, in an in vitro transcription/translation system, of a composition of DNA and RNA molecules encoding a population of chimeric polypeptide species, the composition being specified according to any of the embodiments of all aspects as reported herein, for displaying members or nascent members of the encoded population of chimeric polypeptide species in ternary complexes, wherein each ternary complex comprises an RNA molecule of the composition of RNA molecules as mRNA, and a functional ribosome. [Item 24] Further disclosed herein is a composition comprising a population of ternary complexes, each ternary complex comprising an mRNA and a functional ribosome, the mRNAs of the population of ternary complexes comprising a composition of RNA molecules encoding a population of chimeric polypeptide species according to any of the embodiments of all aspects as reported herein, wherein each ternary complex displays a member of an encoded chimeric polypeptide species or a nascent member of an encoded chimeric polypeptide species. The ternary complexes as disclosed herein can be used in panning procedures versus a predetermined target. In the panning procedures a X amino acid sequence which specifically binds to the target is selected for.

In order for ribosome display to allow selection of functional polypeptides with desired properties such as binding to a predetermined target, the displayed polypeptide must fold to its correct three-dimensional structure while still attached to the ribosome. As disclosed herein, a chimeric polypeptide species of formula I is particularly useful to this end as the scaffold derived (i) from a polypeptide with peptidyl-prolyl cis/trans-isomerase activity (PPIase activity) or (ii) from a polypeptide from the FKBP-fold domain family constrains the conformation of the domain X which is inserted in place of the insert-in-flap-domain (IF-domain) of the polypeptide of (i) or the polypeptide of (ii). Owing to this constrainment the degrees of freedom for the domain X to fold are reduced, and the number of possible conformations of X are therefore reduced. Given that X comprises 5 or more amino acids, the shorter the amino acid sequence of X, the stronger is this stabilizing effect on the conformation of X. The stronger the stabilizing effect is on the conformation of X, the fewer are the degrees of freedom for X to be displayed in substantially different conformations. Specifically, the stabilizing effect is particularly strong when the amino acid sequence of X comprises 5 to 500 amino acids, more specifically 10 to 250 amino acids, more specifically 50 to 150 amino acids, more specifically 5 to 75 amino acids, more specifically 10 to 30 amino acids, more specifically 10 to 20 amino acids.

Further, for ribosome display to allow selection of functional polypeptides with desired properties such as binding to a predetermined target, a "tether" or "spacer" region is usually added and fused to the C-terminal end of a library of polypeptides. Such a spacer is genetically encoded as a 3' fusion to the DNA library of interest, corresponding to a C-terminal fusion on the level of amino acid sequence. This C-terminal fused-on polypeptide spacer fills the ribosomal tunnel and provides some extra flexibility, thus allowing the protein of interest to fold as an independent unit and bind to the target. In specific embodiments the spacer may comprise a translational stalling sequence such as SecM.

In a further specific embodiment according to the disclosure herein the mRNA encoding the library is protected against nucleolytic digestion, e.g. by the presence of a RNA hairpin structure ath the 3' end of the mRNA.

Concerning the stability of the resulting ternary complexes between mRNA, ribosomes, and translated polypeptide, under appropriate experimental conditions the complexes are stable and can be maintained for more than 10 days thereby allowing very extensive off-rate selections. This stabilization is possible by cooling the ternary complexes and by adding a high concentration of $Mg^{2+}$ to the buffer, which is thought to "crosslink" the phosphate groups of the ribosomal RNA, and may thus prevent the dissociation of the ribosomal complexes at decreased temperatures. An advantage of maintaining the ternary complexes is that polypeptides displayed on the ribosome appear to be less aggregation-prone. While selections have to be carried out at low temperature, the molecules selected have the same high affinities at high temperatures.

By way of non-limiting illustration, the steps of ribosome display known to the art, e.g. by the disclosure of Lipovsek D. & Plückthun A. J. Immunol. Methods 290 (2004) 51-67, can be summarized as follows. (1) A DNA library that encodes the polypeptide of interest is fused in frame to a C-terminal tether region by DNA ligation. This DNA does not carry a stop codon and is transcribed into mRNA. (2) The mRNA is used as template for in-vitro translation. After translating the entire coding sequence, the ribosome stops and the translated polypeptide that has emerged from the ribosome folds into a three-dimensional structure. As a result, ternary complexes are obtained. (3) The target is added, e.g., in biotinylated form, and the ternary complexes are bound and captured, e.g., by streptavidin-coated magnetic beads, and washed to remove library members that bind weakly or non-specifically. (4) To recover the library enriched for target-binding sequences, EDTA is added to destabilize the ternary complexes and mRNA is isolated from the dissociated ternary complexes. Alternatively, a competitive elution with the target molecule can be carried out before isolating the mRNA. (5) A reverse transcription reaction followed by PCR (RT/PCR) provides the DNA template for the next round. At this stage, error-prone PCR can optionally be used to increase the diversity centered around enriched sequences. Depending on library complexity, the type of protein scaffold and on the target, two to six rounds of selection may be required to select proteins with low nanomolar or subnanomolar affinity for the target.

Further disclosed herein is a method of ribosome display for identifying an amino acid sequence of a domain X that binds to a predetermined target, the method comprising the steps of
 (1) providing as mRNAs a composition of RNA molecules encoding a population of chimeric polypeptide species according to any of the embodiments of all aspects as reported herein;
 (2) contacting mRNAs of step (1) with an in vitro translation system and translating the mRNAs, and forming a composition comprising a population of ternary complexes, each ternary complex comprising an mRNA and a functional ribosome, wherein each ternary complex displays a nascent member of an encoded chimeric polypeptide species;
 (3) contacting ternary complexes obtained in step (2) with the predetermined target under aqueous binding conditions capable of maintaining intact ternary complexes and suitable for specific non-covalent binding of nascent members to the target, thereby forming a mixture of unbound and bound ternary complexes, wherein the bound ternary complexes comprise nascent members of chimeric polypeptide species, the nascent members being bound to the target;
 (4) separating intact ternary complexes bound to the target from unbound ternary complexes by washing the intact bound ternary complexes with a wash solution and removing unbound ternary complexes;
 (5) dissociating target-bound ternary complexes obtained in step (4), and synthesizing cDNAs from mRNA of the dissociated ternary complexes;
 (6) determining in a cDNA obtained in step (5) the nucleic acid sequence encoding the domain X, and deducing therefrom the amino acid sequence of X,
thereby identifying the amino acid sequence of a domain X that binds to the predetermined target.

In one embodiment of all aspects as reported herein X is composed according to formula II

$$U\text{---}O\text{---}Z \quad \text{(formula II)},$$

wherein
 O is an amino acid sequence comprising a variable sequence,
 U and Z are selected independently of each other, wherein either is present or absent and, if present, each of U and/or Z is a non-variable amino acid sequence comprising 1 to 10 residues, and
 U, if present, is linked with a peptide bond to $S_2$, and Z, if present, is linked with a peptide bond to $S_1$.

In a specific embodiment, each of U and/or Z is an amino acid sequence of 1 to 5 residues, and particularly 4 residues. More specifically, U, if present, is the amino acid sequence of SEQ ID NO:1 (GAGS), and Z, if present is the amino acid sequence GSSG (SEQ ID NO:2) or the amino acid sequence GSS (SEQ ID NO:3). The GAGS segment and the GSSG segment on the one hand can each provide a certain degree of steric flexibility that may be desired. However, as the DNA encoding the GAGS segment can be designed to contain a BamHI restriction enzyme cleavage site, cloning steps transferring the nucleotide sequence encoding the element O from one vector to another are simplified. The same reasoning applies to the GSSG segment, the coding sequence of which can be designed to contain a SacI restriction enzyme cleavage site. Thus, the nucleotide sequence encoding O can advantageously be provided as a BamHI-SacI cassette.

In one embodiment of all aspects as reported herein the amino acid sequence of O or the amino acid sequence of X is composed of a subset of the naturally occurring amino acid residues. In a specific embodiment, each residue of the amino acid sequence of O or the amino acid sequence of X is independently selected from the list of amino acid residues consisting of Y, F, L, P, D, V, R, Q, S, I, E, G, W, A, H, T, N, K, and M. In one embodiment of all aspects as reported herein in the population of encoded chimeric polypeptide species the average relative frequency of occurrence of a particular amino acid residue in the amino acid sequence of O or the amino acid sequence of X is 8.5% to 11.5% for Y, 8.5% to 11.5% for F, 8.5% to 11.5% for L, 5% to 8% for P, 4.5% to 7.5% for D, for 4.5% to 7.5% V, for 4.5% to 7.5% R, for 4% to 7% for Q, 4% to 7% for S, 3.5% to 6.5% for I, 3% to 6% for E, 3% to 6% for G, 3% to 6% for W, 3% to 6% for A, 2.5% to 5.5% for H, 2% to 5% for T, 1% to 4% for N, 0.5% to 3.5% for K, and 0.5% to 2.5% for M.

The CDR-H3 domain is a specific region of the heavy chain within antibodies, of a complementarity determining region (CDR). CDR-H3 takes part in binding to the epitope. Thus, it can be desired to mimic a CDR-H3 amino acid composition in a "single loop" library such as the composition of nucleic acid (DNA and/or RNA) molecules encoding a population of chimeric polypeptide species, the composition being specified according to any of the embodiments of all aspects as reported herein. Hence, the frequency of certain amino acids can exhibit quite different length-dependent patterns in a CDR-H3 loop. For example, key target affinity-mediating amino acids, like Y and W increase in the falling CDR-H3 off-peak flank (Zemlin, M. et al. J Mol Biol 334 (2003) 733-749). While in an antibody binding affinity can be increased by cooperative binding between other CDRs, a single loop strategy needs a focus on effective positioning of key affinity-mediating amino acid residues and their suitable distribution over the entire variable amino acid sequence (specifically X and/or O) encoded in the library of nucleic acid molecules.

Where the amino acid residues of Y (35%), G (13%) and S (8%) dominate in human antibody germline sequences (Zemlin M, et al., supra), especially G and S residues would generate flexibility, but not enough affinity contribution in a single peptide binding loop. With technical advantage, in any of the embodiments of all aspects as reported herein the content of the amino acid residues G and S in any of the domains X and O can be reduced, in order to improve the probability of identifying in the library a member with desired target binding characteristics mediated by any of the encoded domains X or O.

In naturally occurring interactions between binders and their respective targets, the amino acids W, F, Y, I and L are overrepresented in peptide-protein interactions (London, N., et al. Structure 18 (2010) 188-199). With technical advantage, in any of the embodiments of all aspects as reported herein the content of the amino acid residues L, F and I are overrepresented in the in the variable domain X or O displayed in the library, when compared to the frequency of their respective presence in antibody CDR-H3 sequences. The amino acid residue Y is overrepresented in murine (22.48%) and human (10.89%) CDR-H3 loops, but in a specific embodiment as disclosed herein the variable amino acid sequence in embodied library contains Y at a lower level. An overrepresentation of the amino acid residue W can be disadvantageous for target binding and for solubility of an isolated domain X or an isolated domain O. With technical advantage, in any of the embodiments of all aspects as reported herein the content of the amino acid residue W in the variable amino acid sequence portion lower than 8%, particularly about 4%. Further technical advantage is provided by avoiding in the variable domain X or O a consecutive sequence of a plurality of W amino acid residues. Nevertheless, compared to the frequency of occurrence of W amino acid residues in human (2.56%) and murine (2.39%) CDR-H3 of 13 amino acids in length, technical advantage can be gained by increasing the content of W in the library, thereby enhancing formation of protein binding hotspots in the variable domain of X or O.

Whereas the frequency of the amino acid residue P in human and murine CDR-H3 of 13 amino acids in length is 3.65% (human) and 1.82% (murine) (Zemlin, M. et al. J Mol Biol 334 (2003). 733-749), the frequency of occurrence of the amino acid residue P in a library as specified according to any of the embodiments of all aspects as reported herein is set advantageously to 5%. The secondary structure stabilization mediated by proline rich motives can contribute to target affinity and the stability in biological fluids. Since in a specific embodiment the library is flexibly attached to the rigid SlyD FKBP by the amino acid segments GAGS and GSSG, proline may support formation of autonomous secondary structures in the variable portion O thereby reducing structural entropy.

In a library as specified according to any of the embodiments of all aspects as reported herein the amino acid residue M is underrepresented (1%) in the variable region of X or O, in contrast to human (1.45%) and murine (2.94%) CDR-H3 segments of 13 amino acids in length, primarily to reduce potential effects owing to oxidation of the thio group present in M.

Whereas the frequency of the amino acid residue H in human and murine CDR-H3 segments of 13 amino acid in length is 1.7% (human) and 1.22% (murine) (Zemlin M, et al., supra) a library as specified according to any of the embodiments of all aspects as reported herein contains H in the variable region of X or O at about 4%. The amino acid residue H has also been found to be overrepresented in target-binding hotspot forming residues (London, supra).

The frequency of D in human and murine CDR-H3 of 13 amino acid in length is 11% (human) and 10% (murine) (Zemlin M, et al., supra). In a library as specified according to any of the embodiments of all aspects as reported herein the amino acid residue D was reduced to about 5% in the variable region of X or O, because D is apparently not overrepresented in peptide protein interactions.

To compensate the lack of the amino acid residue D the frequency of E was set to about 5% in the variable region of X or O in a library as specified according to any of the embodiments of all aspects as reported herein. This measure allows to increase negative charges. In contrast, in human and murine CDR-H3 of 13 amino acid in length D is represented with just 2.05% (human) and 1.14% (murine) (Zemlin M, et al., supra).

The frequency of the amino acid residue R in human and murine CDR-H3 of 13 amino acid in length is 9% (human) and 10.5% (murine) (Zemlin M, et al., supra).

In a library as specified according to any of the embodiments of all aspects as reported herein R is advantageously reduced to about 5%, as apparently R is not overrepresented in peptide-protein binding hotspot forming residues (London, supra).

In further specific embodiments the amino acid composition of the variable region of domain X or domain O, 11% acidic residues and 14% basic residues can be selected such that 25% of charged residues are balanced with 25% of aliphatic residues. The amino acid K is advantageously reduced to avoid accidental occurrence of protease cleavage sites. Further, amino acid residues such as A, G, S, C and T can be selected to an aggregate value of a theoretical content of 16%. Amino acids like A, D, G, N, P, S, T, V, C can be selected to an aggregate value of 36% content. Aromatic amino acids, like F, H, W, Y can be selected to an aggregate value of 28% content. Aliphatic residues, like A, I, L, V can be selected to an aggregate value of 26%. Polar residues, like D, E, H, K, N, Q, R, S, T can be selected to an aggregate value of 41%. Non-polar residues, like A, C, F, G, I, L, M, P, V, W, Y can be selected to an aggregate value of 59%. Acidic residues, like D and E can be selected to an aggregate value of 11%. Basic residues, like H, K, R can be selected to an aggregate value of 14%. Charged residues, like D, E, H, K, R can be selected to an aggregate value of 25%. Structural relevant P can be selected to an aggregate value of 5%.

Apart from the methods and procedures encompassed by ribosome display, specific binders can also be identified using any screening and library display methodology, such as mRNA display, phage display, cell surface display, and viral display, particularly in further specific embodiments using nucleic acid molecules encoding a chimeric polypeptide as reported herein.

In the herein disclosed composition of nucleic acid (molecules encoding a population of chimeric polypeptide species the *Thermus thermophilus* SlyD and *Thermococcus gammadurans* SlyD chaperones are free of cysteine residues, thus enabling a display of polypeptides without any uncontrolled oxidation products of cysteines.

Further disclosed herein is a method for producing a constrained polypeptide, the constrained polypeptide being a specific binder of a predetermined target, the method comprising the steps of (1) identifying, according to a method according to any of the embodiments of all aspects as reported herein, an amino acid sequence of a domain X that binds to the predetermined target, wherein the domain X is identified as a domain replacing the IF-domain in (i) a polypeptide with peptidyl-prolyl cis/trans-isomerase activity (PPIase activity) or (ii) a polypeptide from the FKBP-fold domain family;

(2) providing a linear polypeptide comprising the amino acid sequence of the domain X identified in step (1);

(3) connecting the N-terminus and C-terminus of the polypeptide of step (2), wherein the distance of the connected N-terminus and C-terminus of the polypeptide mimicks the distance of the connected N-terminus and C-terminus of the IF-domain, of (i) the polypeptide with peptidyl-prolyl cis/trans-isomerase activity (PPIase activity) or (ii) the polypeptide from the FKBP-fold domain family;

thereby producing the constrained polypeptide, the constrained polypeptide being a specific binder of the predetermined target.

With respect to step (2) the polypeptides according to the present disclosure can be made by chemical synthesis methods, which are well known to the skilled artisan and described herein. See, for example, Fields et al, Chapter 3 in Synthetic Peptides: A User's Guide, ed. Grant, W. H. Freeman & Co., New York, N.Y., 1992, p. 77; and Bird, G. H., et al., Methods Enzymol 446, 369-86 (2008). Hence, peptides can be synthesized using the automated Merrifield techniques of solid phase synthesis with the alpha-$NH_2$ protected by either t-Boc or Fmoc chemistry using side chain protected amino acids on, for example, an Applied Biosystems Peptide Synthesizer Model 430A or 431 or the AAPPTEC multichannel synthesizer APEX 396. One manner of making of the peptides described herein is using solid phase peptide synthesis (SPPS). The C-terminal amino acid is attached to a cross-linked polystyrene resin via an acid labile bond with a linker molecule. This resin is insoluble in the solvents used for synthesis, making it relatively simple and fast to wash away excess reagents and by-products. The N-terminus is protected with the Fmoc group, which is stable in acid, but removable by base. Any side chain functional groups are protected with base stable, acid labile groups. Longer peptides can also be made by conjoining individual synthetic peptides using native chemical ligation. Alternatively, longer synthetic peptides can be synthesized by well known recombinant DNA techniques. Such techniques are provided in well-known standard manuals with detailed protocols. To construct a coding sequence encoding a peptide of this invention, the amino acid sequence is reverse translated to obtain a nucleic acid sequence encoding the amino acid sequence, preferably with codons that are optimum for the organism in which the gene is to be expressed. Next, a coding sequence is made, typically by synthesizing oligonucleotides which encode the peptide and any regulatory elements, if necessary. The coding sequence is inserted in a suitable cloning vector and transfected into a host cell. Furthermore, the host cell is engineered so as to be able to incorporate the non-natural amino acids for the hydrocarbon staple. The peptide is then expressed under suitable conditions appropriate for the selected expression system and host. See Liu et al. Proc. Nat. Acad. Sci (USA), 94: 10092-10097 (1997). The peptide is purified and characterized by standard methods.

Constrained polypeptides disclosed herein may comprise a cyclic portion. In a specific embodiment in step (3) the N-terminus and the C-terminus of the polypeptide are connected covalently with a "linking group". Constrained polypeptides can be produced as linear peptides that are subsequently cyclicized by non-peptide bonds, for example by disulfide bonds between distally positioned cysteine residues, often N-terminal and C-terminal cysteines. Polypeptides may be constrained by any of several well known means. In preferred embodiments, disulfide bonds between two non-adjacent cysteines cyclicize and thereby conformationally restrict the polypeptide.

Constrained polypeptides may be improved, e.g. with respect to target-binding, by modifying them. Methods of synthesizing constrained peptides with modifications to place them within the scope of the present disclosure are well known and completely within the skill of those having ordinary skill in the art. Modifications accordingly include exchange of a naturally occurring amino acid with a non-natural compound capable of being covalently linked with amino acids by way of peptide bonds.

Further aspects and embodiments disclosed herein include but are not limited to the following items:

1. A composition of nucleic acid (DNA and/or RNA) molecules encoding a population of chimeric polypeptide species, wherein each nucleic acid molecule encodes a chimeric polypeptide species that comprises a polypeptide according to formula I $NH_2$—$S_2$—X—$S_1$—COOH    (formula I), wherein
   X is an amino acid sequence comprising a variable sequence,
   $S_2$ and $S_1$ are non-variable and non-overlapping amino acid sequences derived (i) from a polypeptide with peptidyl-prolyl cis/trans-isomerase activity (PPIase activity) or (ii) from a polypeptide from the FKBP-fold domain family,
   — between two amino acids denotes a peptide bond, and
   X is inserted in place of the insert-in-flap-domain (IF-domain) of the polypeptide of (i) or the polypeptide of (ii).

2. The composition according to item 1, wherein X comprises an amino acid sequence of 5 to 500 residues.

3. The composition according to any of the items 1 and 2, wherein X comprises an amino acid sequence of 10 to 250 residues.

4. The composition according to any of the items 1 to 3, wherein X comprises an amino acid sequence of 50 to 150 residues.

5. The composition according to any of the items 1 to 4, wherein X comprises an amino acid sequence of 5 to 75 residues, specifically 10 to 70 residues, more specifically 10 to 30 residues, more specifically 10 to 20 residues, more specifically 12, 13, 14, 15 or 16 residues.

6. The composition according to any of the items 1 to 5, wherein X is composed according to formula II U—O—Z    (formula II), wherein
   O is an amino acid sequence comprising a variable sequence,
   U and Z are selected independently of each other, wherein either is present or absent and, if present, each of U and/or Z is a non-variable amino acid sequence comprising 1 to 10 residues, and
   U, if present, is linked with a peptide bond to $S_2$, and Z, if present, is linked with a peptide bond to $S_1$.

7. The composition according to item 6, wherein each of U and/or Z is an amino acid sequence of 1 to 5 residues, and particularly 4 residues.
8. The composition according to any of the items 6 and 7, wherein U, if present, is the amino acid sequence of SEQ ID NO: 1(GAGS), and Z, if present is the amino acid sequence GSSG (SEQ ID NO:2) or the amino acid sequence GSS (SEQ ID NO:3).
9. The composition according to any of the items 6 to 8, wherein the amino acid sequence of O is composed of a subset of the naturally occurring amino acid residues.
10. The composition according to item 9, wherein each residue of the amino acid sequence of O is independently selected from the list of amino acid residues consisting of Y, F, L, P, D, V, R, Q, S, I, E, G, W, A, H, T, N, K, and M.
11. The composition according to item 10, wherein in the population of encoded chimeric polypeptide species the average relative frequency of occurrence of a particular amino acid residue in the amino acid sequence of O is 8.5% to 11.5% for Y, 8.5% to 11.5% for F, 8.5% to 11.5% for L, 5% to 8% for P, 4.5% to 7.5% for D, for 4.5% to 7.5% V, for 4.5% to 7.5% R, for 4% to 7% for Q, 4% to 7% for S, 3.5% to 6.5% for I, 3% to 6% for E, 3% to 6% for G, 3% to 6% for W, 3% to 6% for A, 2.5% to 5.5% for H, 2% to 5% for T, 1% to 4% for N, 0.5% to 3.5% for K, and 0.5% to 2.5% for M.
12. The composition according to any of the items 1 to 11, wherein the encoded amino acid sequences of $S_2$ and $S_1$ are fragments of a naturally occurring polypeptide, wherein in the naturally occurring polypeptide an IF-domain is located between $S_2$ and $S_1$.
13. The composition according to any of the items 1 to 12, wherein the encoded amino acid sequences of $S_2$ and $S_1$ are fragments of a naturally occurring polypeptide which is (i) a polypeptide with peptidyl-prolyl cis/trans-isomerase activity (PPIase activity) or (ii) a polypeptide from the FKBP-fold domain family.
14. The composition according to any of the items 1 to 13, wherein the encoded amino acid sequences of $S_2$ and $S_1$ are fragments of a SlyD polypeptide.
15. The composition according to any of the items 1 to 14, wherein the encoded amino acid sequences of $S_2$ and $S_1$ are fragments of a polypeptide derived from a thermophile.
16. The composition according to item 15, wherein the encoded amino acid sequences of $S_2$ and $S_1$ are fragments of a polypeptide derived from a thermophile bacterium or a thermophile Archaea.
17. The composition according to any of the items 15 and 16, wherein the encoded amino acid sequences of $S_2$ and $S_1$ are fragments of a polypeptide derived from a thermophile from the family of Thermaceae.
18. The composition according to any of the items 15 to 17, wherein the encoded amino acid sequences of $S_2$ and $S_1$ are fragments of a polypeptide derived from *Thermus thermophilus*.
19. The composition according to any of the items 15 and 16, wherein the encoded amino acid sequences of $S_2$ and $S_1$ are fragments of a polypeptide derived from a hyperthermophilic Archaea.
20. The composition according to any of the items 15, 16, and 19, wherein the encoded amino acid sequences of $S_2$ and $S_1$ are fragments of a polypeptide derived from a thermophile from the class of Thermococci.
21. The composition according to any of the items 15, 16, 19, and 20, wherein the encoded amino acid sequences of $S_2$ and $S_1$ are fragments of a polypeptide derived from *Thermococcus gammatolerans*.
22. Use, in an in vitro translation system, of a composition of RNA molecules encoding a population of chimeric polypeptide species, the composition being specified according to any of the items 1 to 21, for displaying members or nascent members of the encoded population of chimeric polypeptide species in ternary complexes, wherein each ternary complex comprises an RNA molecule of the composition of RNA molecules as mRNA, and a functional ribosome.
23. Use, in an in vitro transcription/translation system, of a composition of DNA and RNA molecules encoding a population of chimeric polypeptide species, the composition being specified according to any of the items 1 to 21, for displaying members or nascent members of the encoded population of chimeric polypeptide species in ternary complexes, wherein each ternary complex comprises an RNA molecule of the composition of RNA molecules as mRNA, and a functional ribosome.
24. A composition comprising a population of ternary complexes, each ternary complex comprising an mRNA and a functional ribosome, the mRNAs of the population of ternary complexes comprising a composition of RNA molecules encoding a population of chimeric polypeptide species according to any of the items 1 to 21, wherein each ternary complex displays a member or nascent member of an encoded chimeric polypeptide species.
25. The composition according to item 24, wherein in a nascent member of an encoded chimeric polypeptide species the distance between the C-terminal peptide bond of $S_2$ and the N-terminal peptide bond of $S_1$ mimicks the distance of the corresponding peptide bonds of $S_2$ and $S_1$ connected by an IF domain in a polypeptide derived (i) from a polypeptide with peptidyl-prolyl cis/trans-isomerase activity (PPIase activity) or (ii) from a polypeptide from the FKBP-fold domain family.
26. The composition according to any of the items 24 and 25, wherein in a nascent member of an encoded chimeric polypeptide species $S_2$ and at least the translated N-terminal part of $S_1$ are folded as in the corresponding full length member of the chimeric polypeptide species, the member having an intact FKBP domain.
27. A method for identifying an amino acid sequence of a domain X that binds to a predetermined target, the method comprising the steps of
    (1) providing as mRNAs a composition of RNA molecules encoding a population of chimeric polypeptide species according to any of the items 1 to 21;
    (2) contacting mRNAs of step (1) with an in vitro translation system and translating the mRNAs, and forming a composition comprising a population of ternary complexes, each ternary complex comprising an mRNA and a functional ribosome, wherein each ternary complex displays a nascent member of an encoded chimeric polypeptide species;
    (3) contacting ternary complexes obtained in step (2) with the predetermined target under aqueous binding conditions capable of maintaining intact ternary complexes and suitable for specific non-covalent binding of nascent members to the target, thereby forming a mixture of unbound and bound ternary complexes, wherein the bound ternary complexes comprise nascent members of chimeric polypeptide species, the nascent members being bound to the target;

(4) separating intact ternary complexes bound to the target from unbound ternary complexes by washing the intact bound ternary complexes with a wash solution and removing unbound ternary complexes;

(5) dissociating target-bound ternary complexes obtained in step (4), and synthesizing cDNAs from mRNA of the dissociated ternary complexes;

(6) determining in a cDNA obtained in step (5) the nucleic acid sequence encoding the domain X, and deducing therefrom the amino acid sequence of X, thereby identifying the amino acid sequence of a domain X that binds to the predetermined target.

28. The method according to item 27, wherein after step (5) performed for the first time and prior to performing step (6), the steps (5a) and (5b) are performed consecutively a desired number of times, wherein (5a) comprises synthesizing mRNAs from cDNAs obtained in the latest performed step (5), thereby providing newly synthesized mRNAs comprising a further composition of RNA molecules encoding a population of chimeric polypeptide species according to any of the items 1 to 21, followed by (5b) comprises performing steps 2 to 5 with newly synthesized mRNAs, and step (6) is performed with the cDNA obtained in the latest performed step (5).

29. The method according to item 28, wherein the number of times the steps (5a) and (5b) are consecutively performed is 1 to 12, more specifically the number of times is selected from 1, 2, 3, 4, 5, and 6.

30. The method according to any of the items 27 to 29, wherein step (6) is performed for a plurality of cDNAs obtained in step (5) or the latest performed step (5), thereby identifying amino acid sequences of a plurality of species of domain X (domain X species), wherein each of the domain X species is derived from a chimeric polypeptide species, and wherein each domain X species binds to the predetermined target.

31. The method according to item 30, wherein in step (6) nucleic acid sequences of cDNAs are determined in parallel by way of high-throughput sequencing.

32. The method according to any of the items 30 and 31, wherein the amino acid sequences deduced for the domain X species are grouped according to consensus sequences, thereby providing one or more groups with members, each member being derived from the amino acid sequence encoded by a separately determined cDNA, wherein the members within the same group are characterized by a common consensus amino acid sequence, and the consensus amino acid sequence is a contiguous subsequence of the amino acid sequences of the domain X species within the group.

33. The method according to item 32, wherein an amino acid sequence of the domain X in the group with the largest number of members is selected, thereby identifying the amino acid sequence of a domain X that binds to the predetermined target.

34. The method according to any of the items 30 and 31, wherein the amino acid sequences deduced for the domain X species are grouped according to sequence identity, thereby providing one or more groups with members, each member being derived from the amino acid sequence encoded by a separately determined cDNA, wherein the members within the same group are characterized by an identical amino acid sequence.

35. The method according to item 34, wherein the amino acid sequence of the domain X of the group with the largest number of members is selected, thereby identifying the amino acid sequence of a domain X that binds to the predetermined target.

36. A method for producing a constrained polypeptide, the constrained polypeptide being a specific binder of a predetermined target, the method comprising the steps of (1) identifying, according to a method according to any of the items 27 to 35, an amino acid sequence of a domain X that binds to the predetermined target, wherein the domain X is identified as a domain replacing the IF-domain in (i) a polypeptide with peptidyl-prolyl cis/trans-isomerase activity (PPIase activity) or (ii) a polypeptide from the FKBP-fold domain family;

(2) providing a linear polypeptide comprising the amino acid sequence of the domain X identified in step (1);

(3) connecting the N-terminus and C-terminus of the polypeptide of step (2), wherein the distance of the connected N-terminus and C-terminus of the polypeptide mimicks the distance of the connected N-terminus and C-terminus of the IF-domain, of (i) the polypeptide with peptidyl-prolyl cis/trans-isomerase activity (PPIase activity) or (ii) the polypeptide from the FKBP-fold domain family;

thereby producing the constrained polypeptide, the constrained polypeptide being a specific binder of the predetermined target.

37. The method according to item 36, wherein in the constrained polypeptide the distance between the connected N-terminus and C-terminus of the polypeptide is $4 \times 10^{-10}$ m to $6 \times 10^{-10}$ m.

38. The method according to any of the items 36 and 37, wherein in step (3) the N-terminus and the C-terminus of the polypeptide are connected covalently with a linking group.

39. The method according to any of the items 36 to 38, wherein the amino acid sequence of the polypeptide is free of cysteine residues.

40. The method according to any of the items 36 to 39, wherein either in step (2) or in step (3) a cysteine residue is added to each of the N-terminus and the C-terminus of the polypeptide, and a disulfide bond is formed between the two added cysteine residues, thereby producing the constrained polypeptide, the constrained polypeptide being a specific binder of the predetermined target.

41. The method according to item 40, wherein a further amino acid residue is added to an added cysteine residue.

42. A method of assaying a predetermined target (target) in a sample suspected of containing the target, the method comprising the steps of (1) identifying, according to a method according to any of the items 27 to 35, an amino acid sequence of a domain X that binds to the predetermined target, wherein the domain X is identified as a domain replacing the IF-domain in (i) a polypeptide with peptidyl-prolyl cis/trans-isomerase activity (PPIase activity) or (ii) a polypeptide from the FKBP-fold domain family;
(2) providing a chimeric polypeptide that comprises a polypeptide according to formula I

NH$_2$—S$_2$—X—S$_1$—COOH     (formula I), wherein
X is the amino acid sequence identified in step (1),
S$_2$ and S$_1$ are non-variable and non-overlapping amino acid sequences derived (i) from a polypeptide with peptidyl-prolyl cis/trans-isomerase activity (PPIase activity) or (ii) from a polypeptide from the FKBP-fold domain family,
— between two amino acids denotes a peptide bond, and
X is inserted in place of the insert-in-flap-domain (IF-domain) of the polypeptide of (i) or the polypeptide of (ii);
(3) contacting the sample with the chimeric polypeptide of step (2) under conditions permitting specific binding of the chimeric polypeptide to the target, thereby forming a mixture of unbound and, if target is present, bound chimeric polypeptide, the bound chimeric polypeptide being bound to the target, thereby providing a treated sample;
(4) removing, under conditions permitting specific binding, unbound chimeric polypeptide from the treated sample of step 3, thereby providing a probed sample;
(5) detecting the chimeric polypeptide in the probed sample of step (4), wherein presence of chimeric polypeptide in the probed sample is indicative of target being present in the sample;
thereby assaying the predetermined target in the sample suspected of containing the predetermined target.
43. The method according to item 42, wherein in step (5) the chimeric polypeptide is detected quantitatively in the probed sample of step (4).
44. A method of assaying a predetermined target (target) in a sample suspected of containing the target, the method comprising the steps of
(1) providing a constrained polypeptide being a specific binder of the predetermined target, the constrained polypeptide being produced by a method according to any of the items 36 to 41;
(2) contacting the sample with the constrained polypeptide of step (1) under conditions permitting specific binding of the constrained polypeptide to the target, thereby forming a mixture of unbound and, if target is present, bound constrained polypeptide, the bound constrained polypeptide being bound to the target, thereby providing a treated sample;
(3) removing, under conditions permitting specific binding, unbound constrained polypeptide from the treated sample of step 3, thereby providing a probed sample;
(4) detecting the constrained polypeptide in the probed sample of step (4), wherein presence of constrained polypeptide in the probed sample is indicative of target being present in the sample;
thereby assaying the predetermined target in the sample suspected of containing the predetermined target.
45. The method according to item 44, wherein in step (4) the constrained polypeptide is detected quantitatively in the probed sample of step (3).

The following examples, sequence listing and figures are provided to aid the understanding of the present invention, the true scope of which is set forth in the appended claims. It is understood that modifications can be made in the procedures set forth without departing from the spirit of the invention.

DESCRIPTION OF THE FIGURES

FIG. 1 Library Trinucleotide mixture composition Lib and Lib1

FIG. 2 Specific trinucleotides representing the particular codons used to encode the amino acids FIG. 3 Ribosome display construct FIG. 4 Analytical agarose gel showing the result of the ribosome display cycle (+control). M: 100 bp DNA molecular weight marker. 1: 719 bp Ribosome Display suitable DNA fragment. 2/3: controls, no DNA amplification was detectable, when the RT step was omitted. 4: full ribosome display cycle versus the positive control, the hairpin-peptide binding antibody, showing a DNA band at 622 bp. 5: ribosome display cycle versus the negative control, Pertuzumab, showing the background binding of the process.

T.th.SlyD-FKBP derivatives versus another 150 kDa protein target. The polypeptide bands of the Thermus thermophilus SlyD-FKBP derivatives form distinct bands at 15 kDa.

The SDS page shows consistently high expression rates of the different Thermus thermophilus SlyD-FKBP polypeptides. The concentration of the solubly expressed protein was in average 1.25 mg/ml to 1.7 mg/ml.

Figure 8:
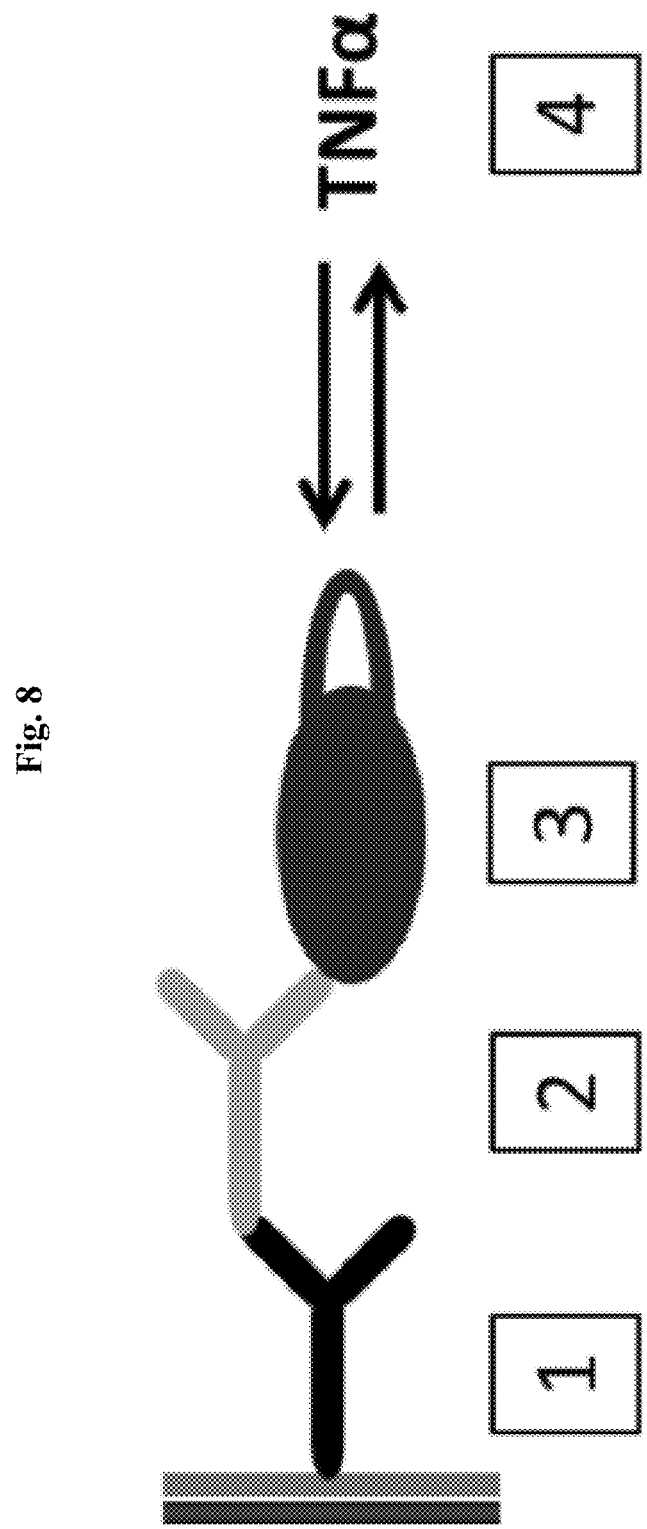

FIG. 8 SPR binding assay, schematic

Figure 9:
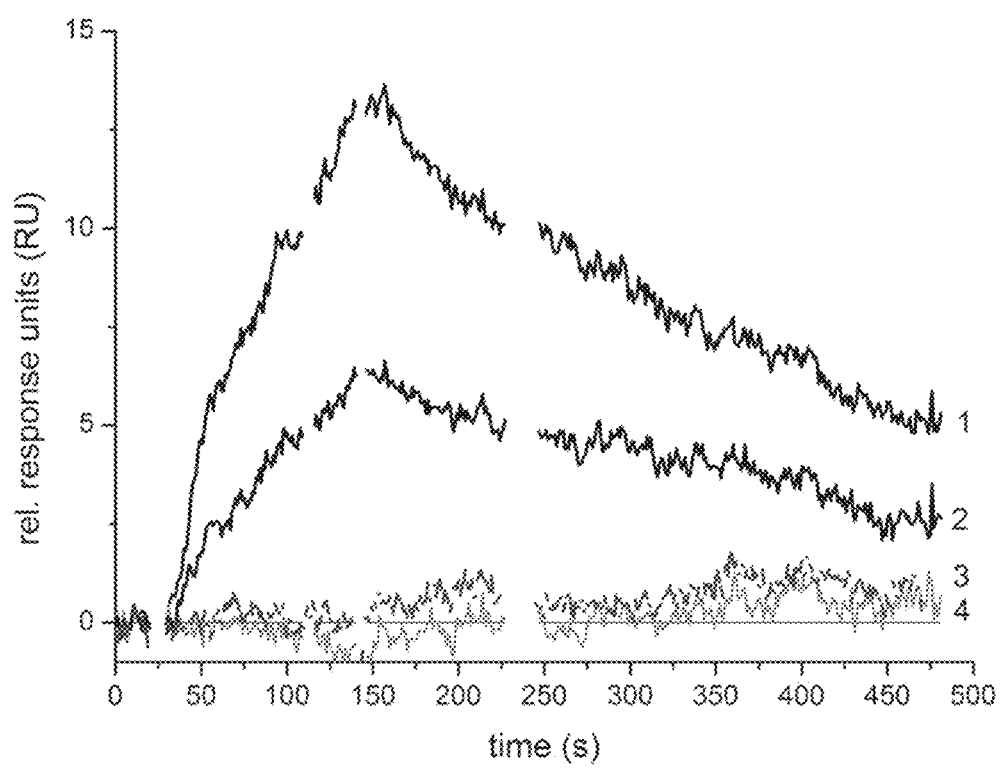

FIG. 9 Overlay sensorgram showing the SPR binding assay as described. 1: Binding signal of 1 μM TNFα as analyte in solution with the T710F7 mutant. 2: Binding signal of 300 nM TNFα as analyte in solution with the T710F7 mutant. 3: 1 μM TNFα analyte in solution versus the non-binding control C10B9 mutant. 4: Negative control, 1 μM streptavidin as analyte in solution versus TT10F7 mutant. The straight line is the buffer control subtraction FIG. 10 Exemplary Langmuir fit with RMax local on the concentration dependent TNFα/T710F7 mutant binding signals.

FIG. 11 Kinetics, calculated upon a TNFα molecular weight of the homotrimeric TNFα (52 kDa) in the presence and absence of the detergent TWEEN 20.

Figure 12:
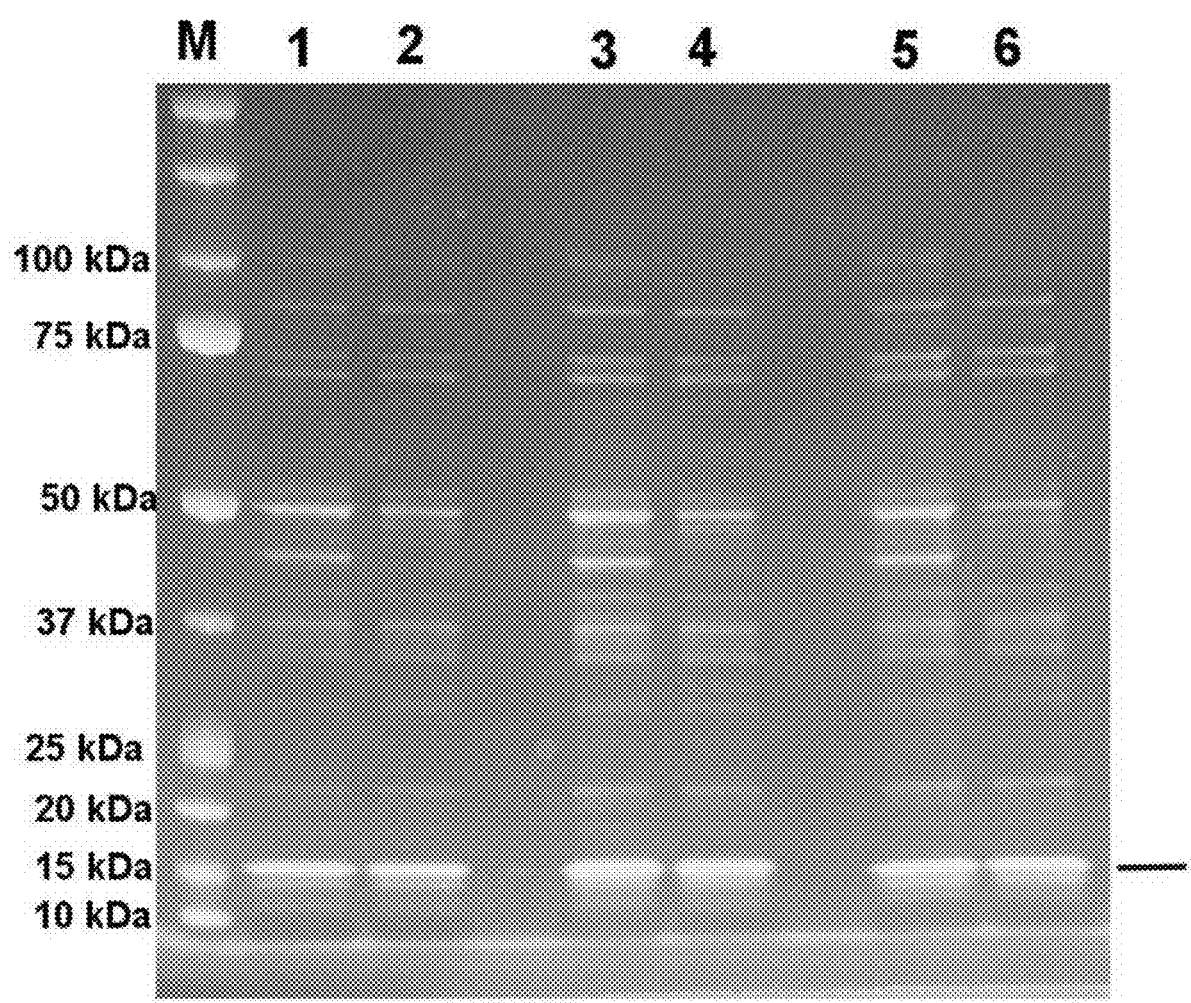

FIG. 12 SDS-PAGE of three randomly selected Thermus thermophilus SlyD-FKBP mutant polypeptides generated versus different targets. M: Molecular weight marker; 1,3,4: T.t. SlyD-FKBP mutants before 37° C. incubation; 2,4,6: T.t.

SlyD-FKBP mutants after 37° C. incubation. Indicated by a black line at 15 kDa: The total amount of each T.t. SlyD-FKBP mutant persists, whereas some protein bands from the *E. coli* lysate disappeared after the 37° C. incubation.

FIG. 13 Color-inverted agarose gels. M: 100 bp DNA molecular weight marker. Left side: second ribosome display cycle after RT-PCR: 1,2: versus TNFα with TWEEN 20; 3, 4: versus TNFα without TWEEN 20. right side: third ribosome display cycle after RT-PCR: 1,2: versus TNFα with TWEEN 20. 3, 4: versus TNFα without TWEEN 20.

FIG. 14 Results from Example 9

Figure 15:
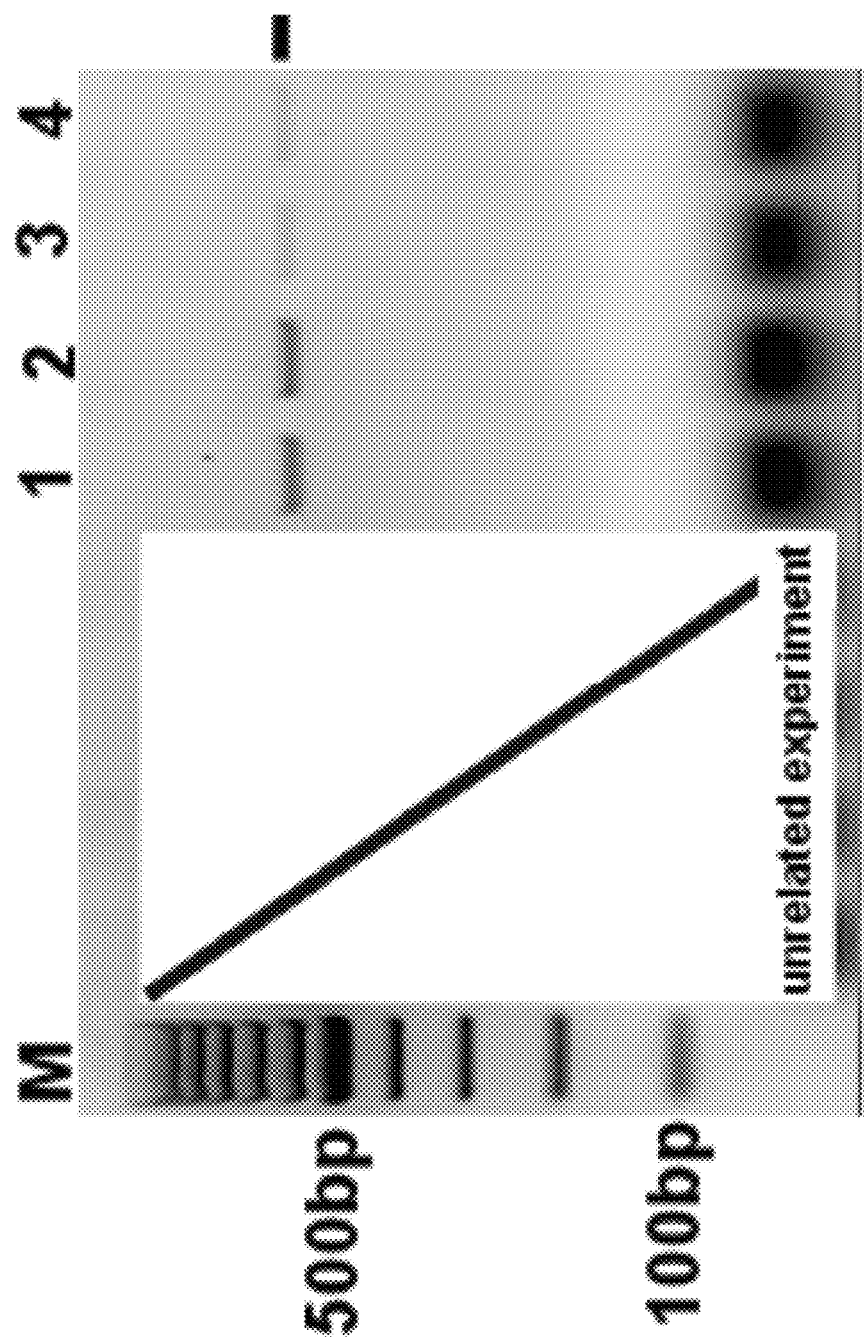

FIG. 15 M: DNA molecular weight marker. Third display cycles showing distinct DNA bands at 612 bp from 4 independent experiments, marked with black line. 1,2: display versus a human monoclonal IgG antibody. 3;4: display versus a human monoclonal IgG antibody including a pre-panning step with the same antibody. The box hides unrelated experimental data.

Figure 16:
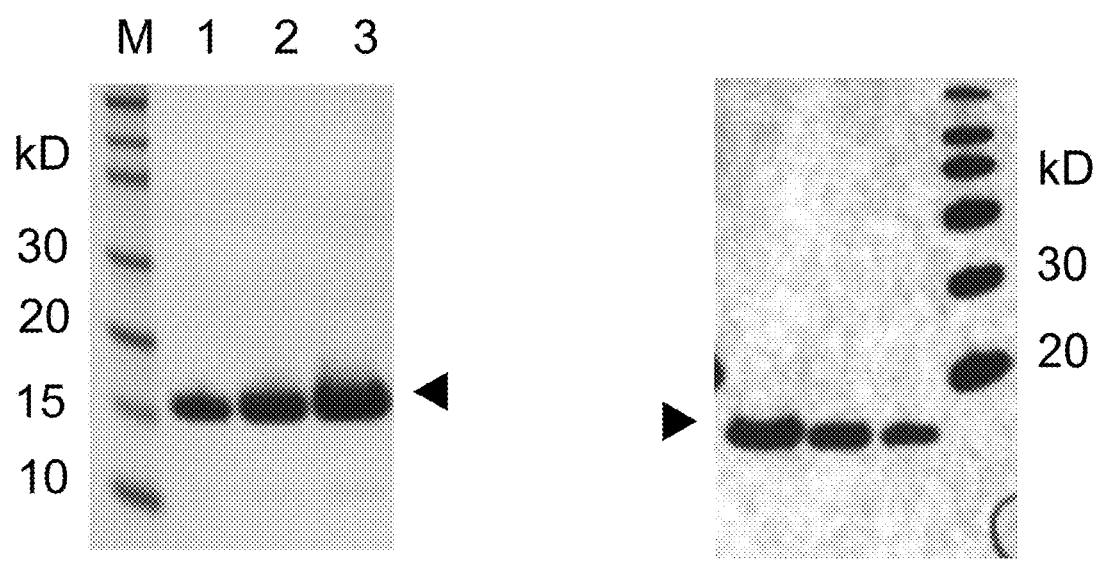

FIG. 16 SDS PAGE (Coomassie staining) and anti-his-tag Western Blot (10 sec exposition) of the SlyD/FKBP12-ERCC1 polypeptide. M—Novex Sharp Standard; 1—2.5 µg SlyD/FKBP12-ERCC1 fusion polypeptide; 2—5.0 µg SlyD/FKBP12—ERCC1 fusion polypeptide; 3—10 µg SlyD/FKBP12-ERCC1 fusion polypeptide; M*—MAGIC-MARK™.

Figure 17:
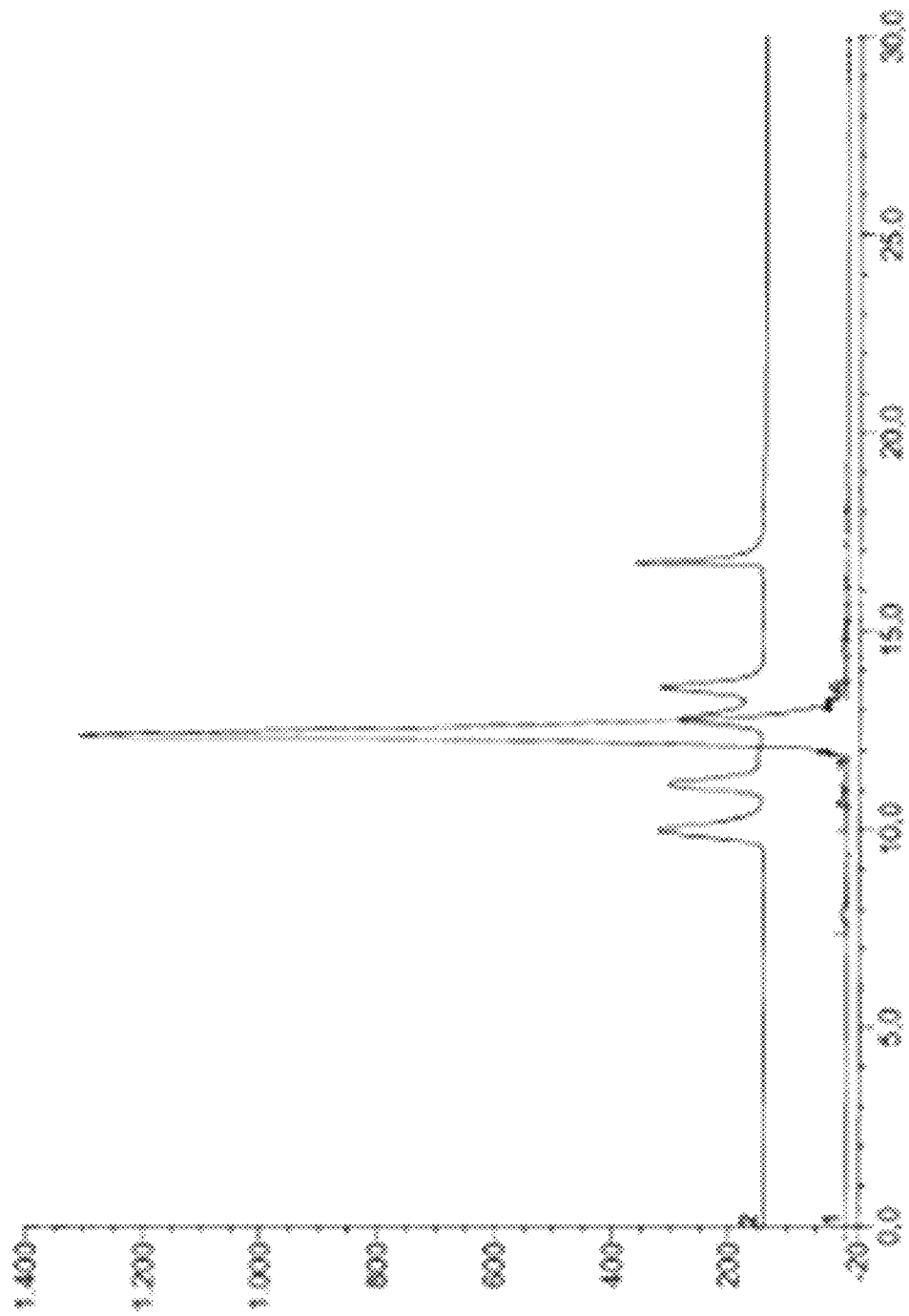

FIG. 17 Analytical HPLC chromatogram of the SlyD/FKBP12-ERCC1 fusion polypeptide. After Ni-NTA purification SlyD/FKBP12-ERCC1 elutes as a monomeric peak.

Figure 18:
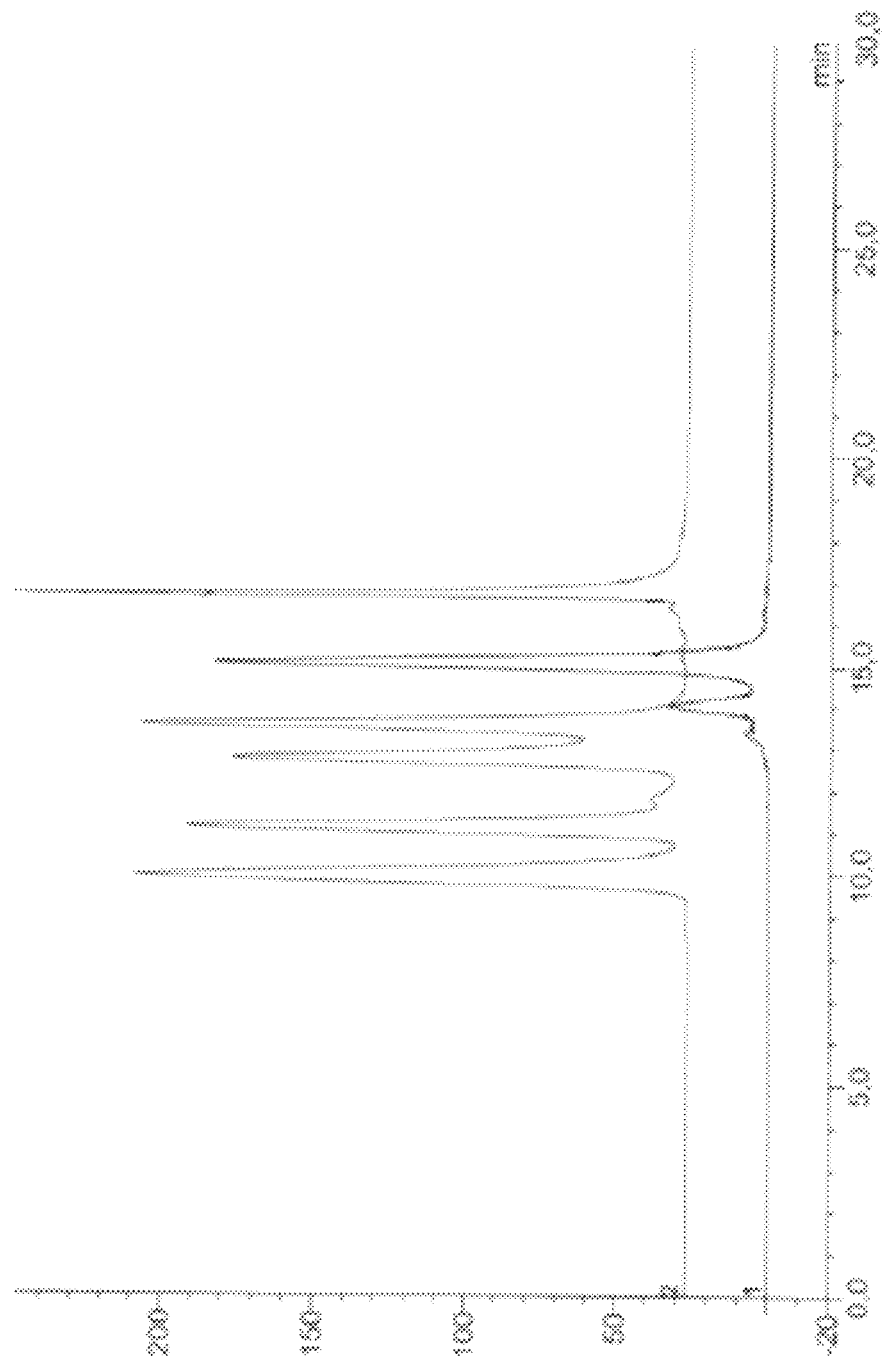

FIG. 18 Wavelength scan from 300 nm-600 nm was driven at 600 nm/min recoding fluorescence emission intensity of SlyD/FKBP12-ERCC1 fusion polypeptide at 25° C., 35° C., 45° C., 55° C., 85° C.

Figure 19:
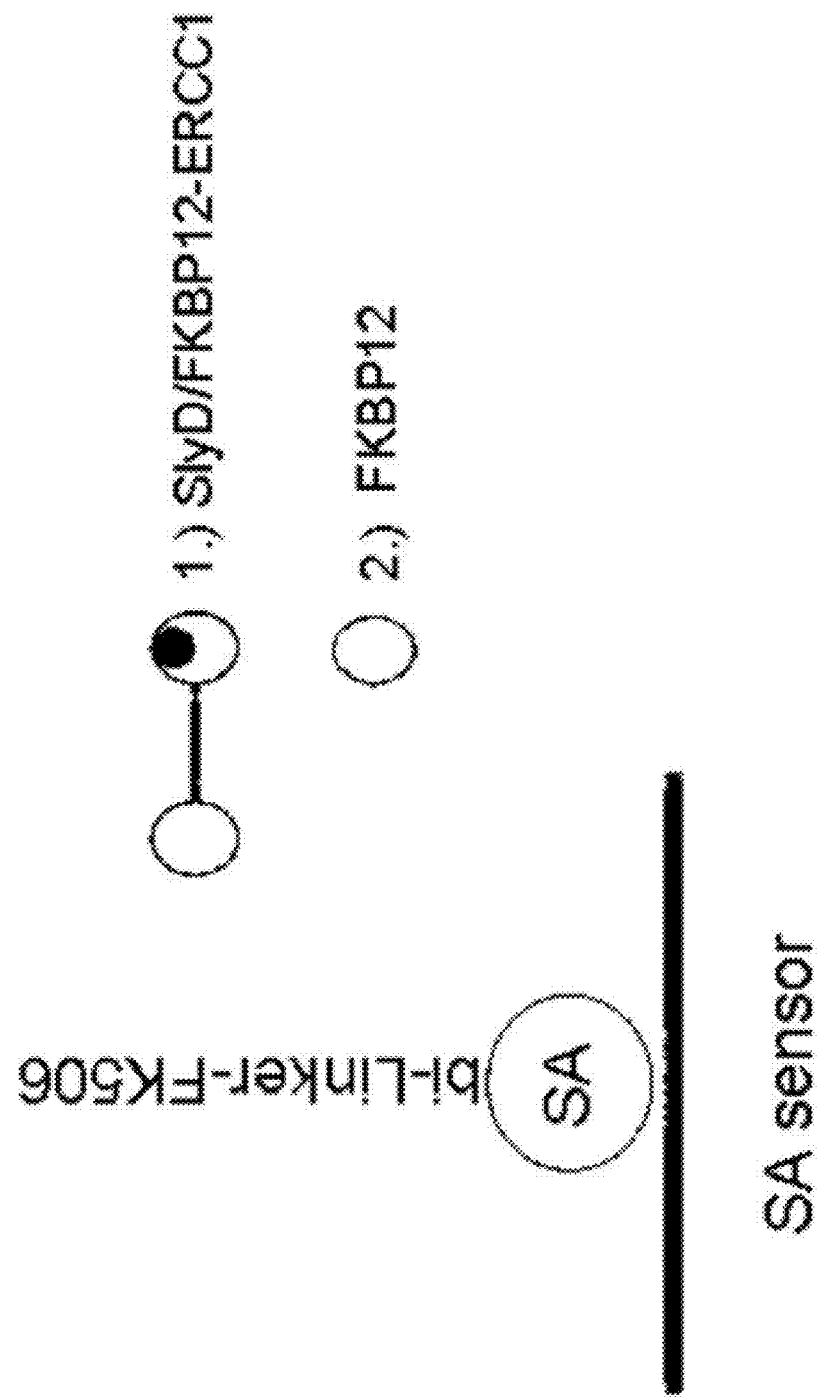

FIG. 19 Scheme of BIACORE™ assay for determining the binding of SlyD/FKBP12-ERCC1 fusion polypeptide to FK-506.

Figure 20:
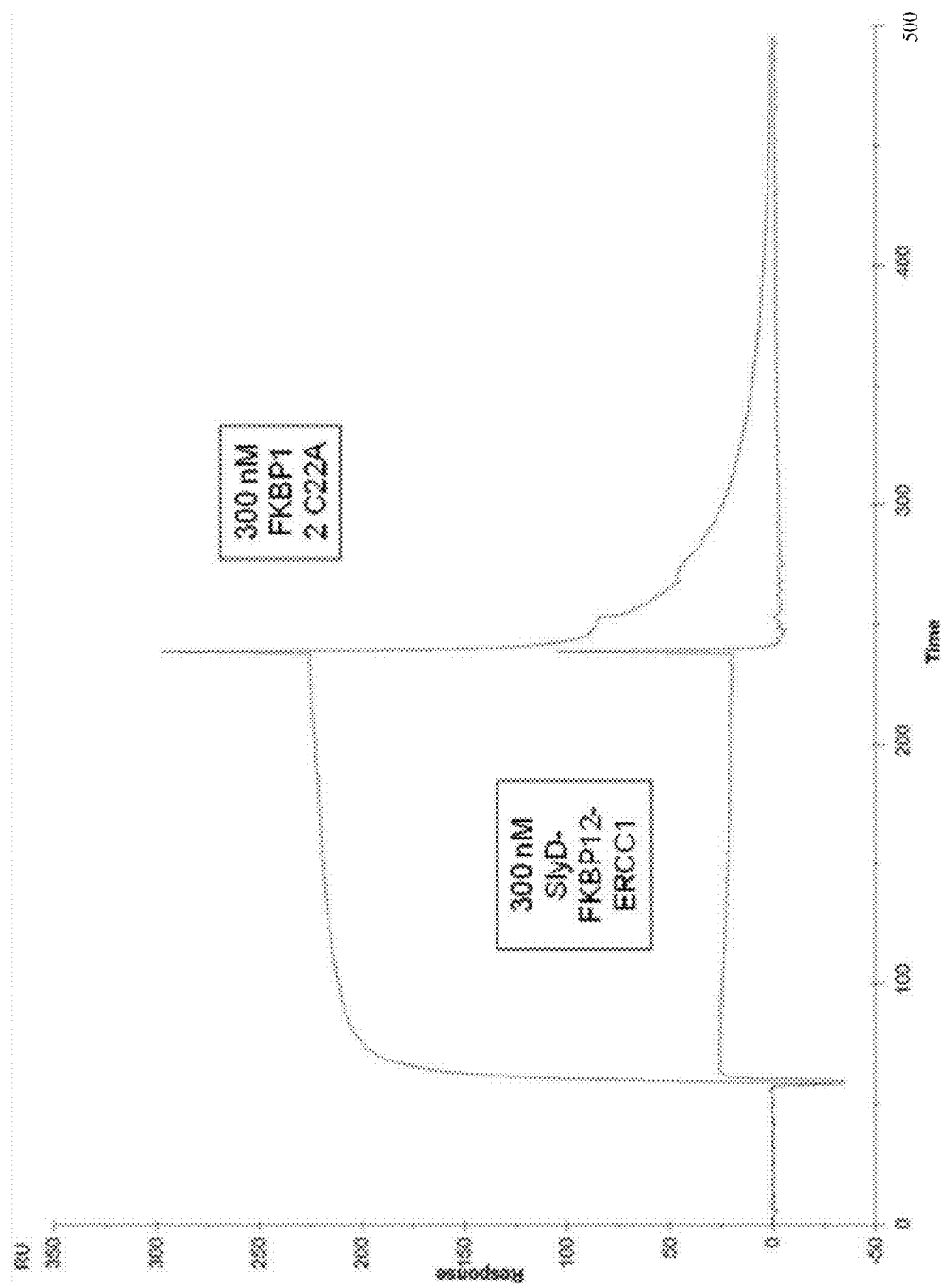

FIG. 20 300 nM SlyD/FKBP12-ERCC1 fusion polypeptide and 300 nM wild-type FKBP12 as analytes in solution vs. sensor surface presented biotinylated ligand bi-FK506.

Figure 21:
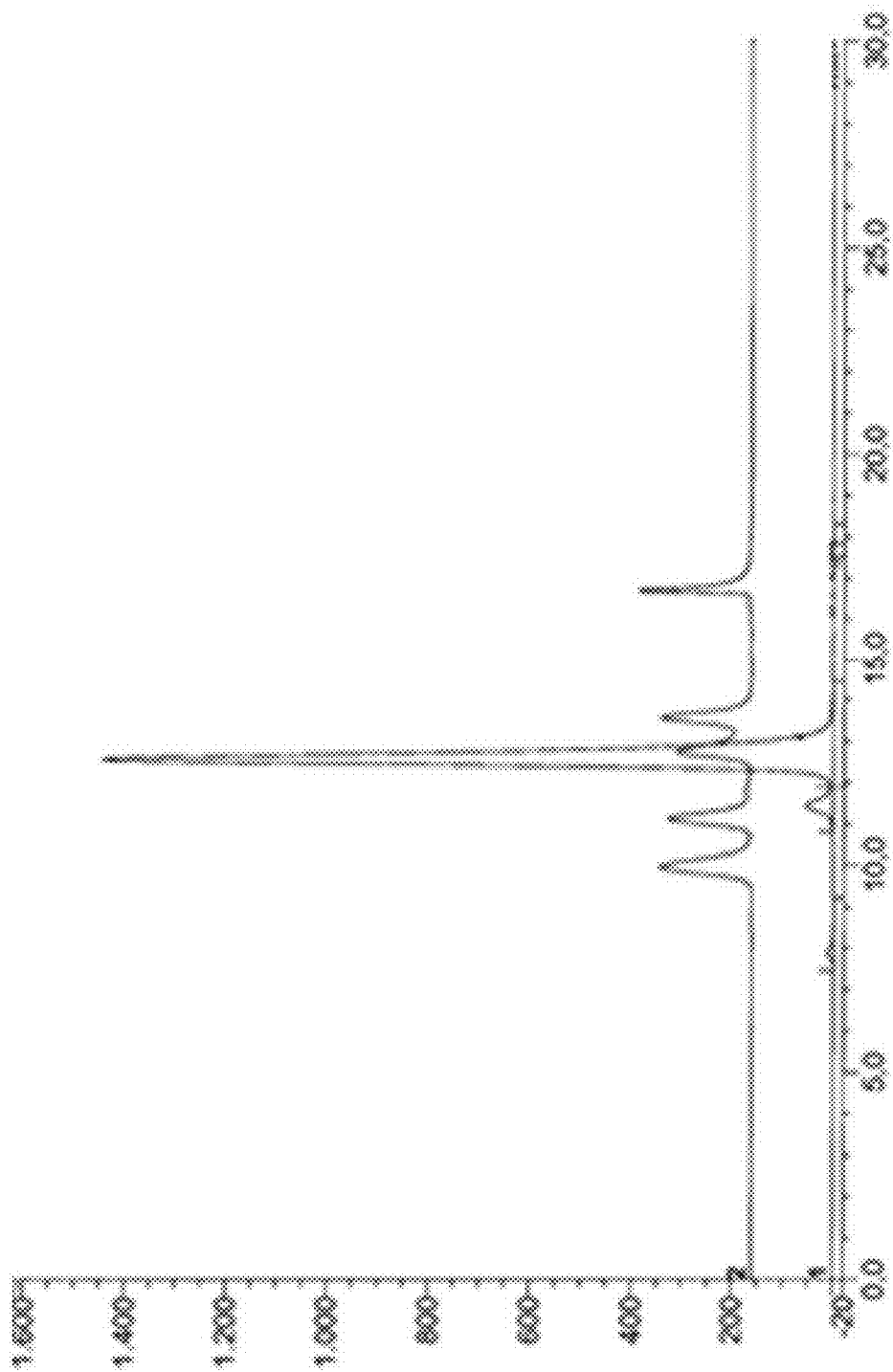

FIG. 21 Analytical HPLC chromatogram of the SlyD/FKBP12-ctrl fusion polypeptide. After Ni-NTA purification SlyD/FKBP12-ctrl elutes as a monomeric peak.

Figure 22:
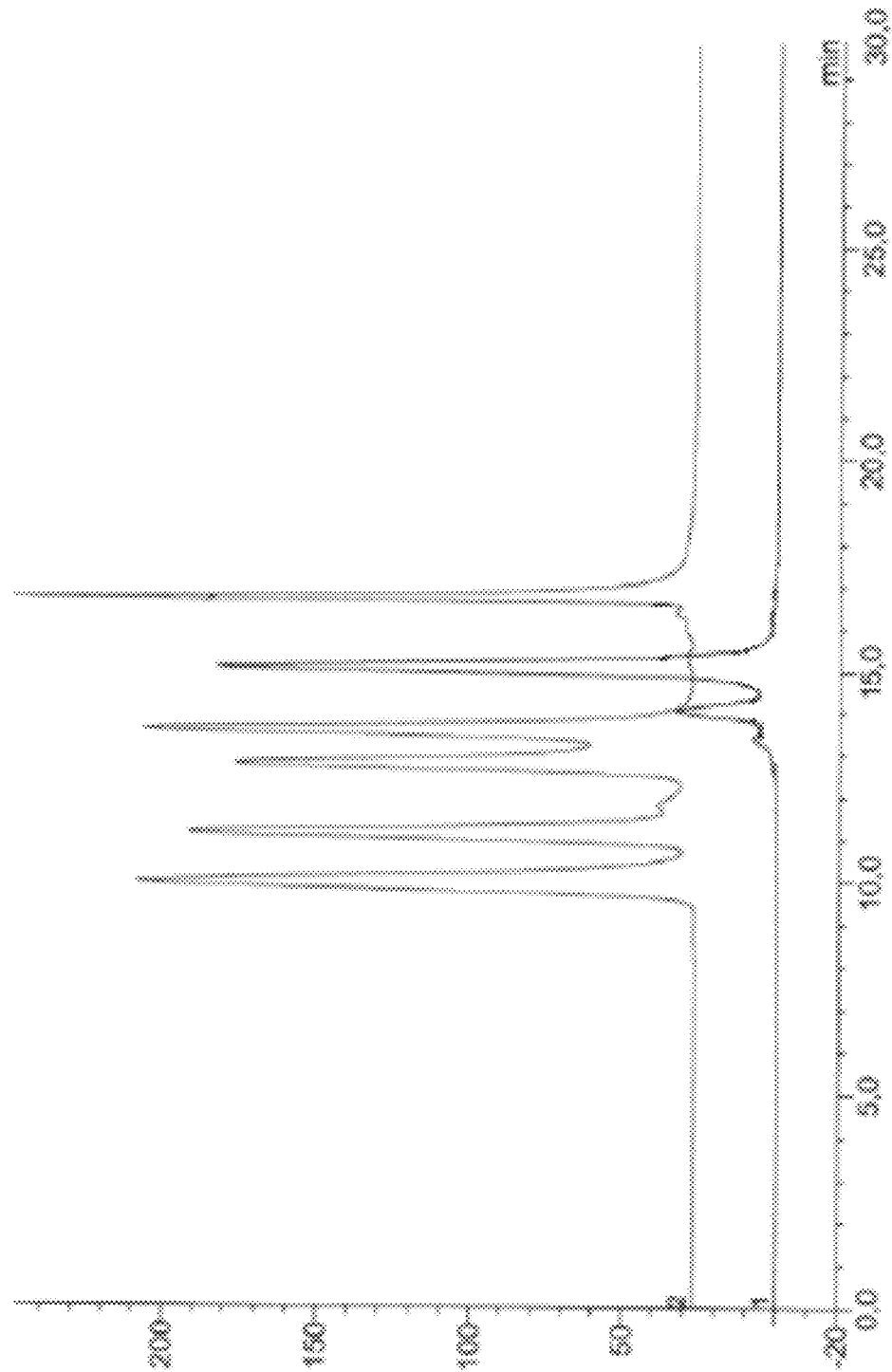

FIG. 22 Analytical HPLC chromatogram of *Thermus thermophilus* SlyD-IGF-1(74-90) fusion polypeptide.

Figure 23:
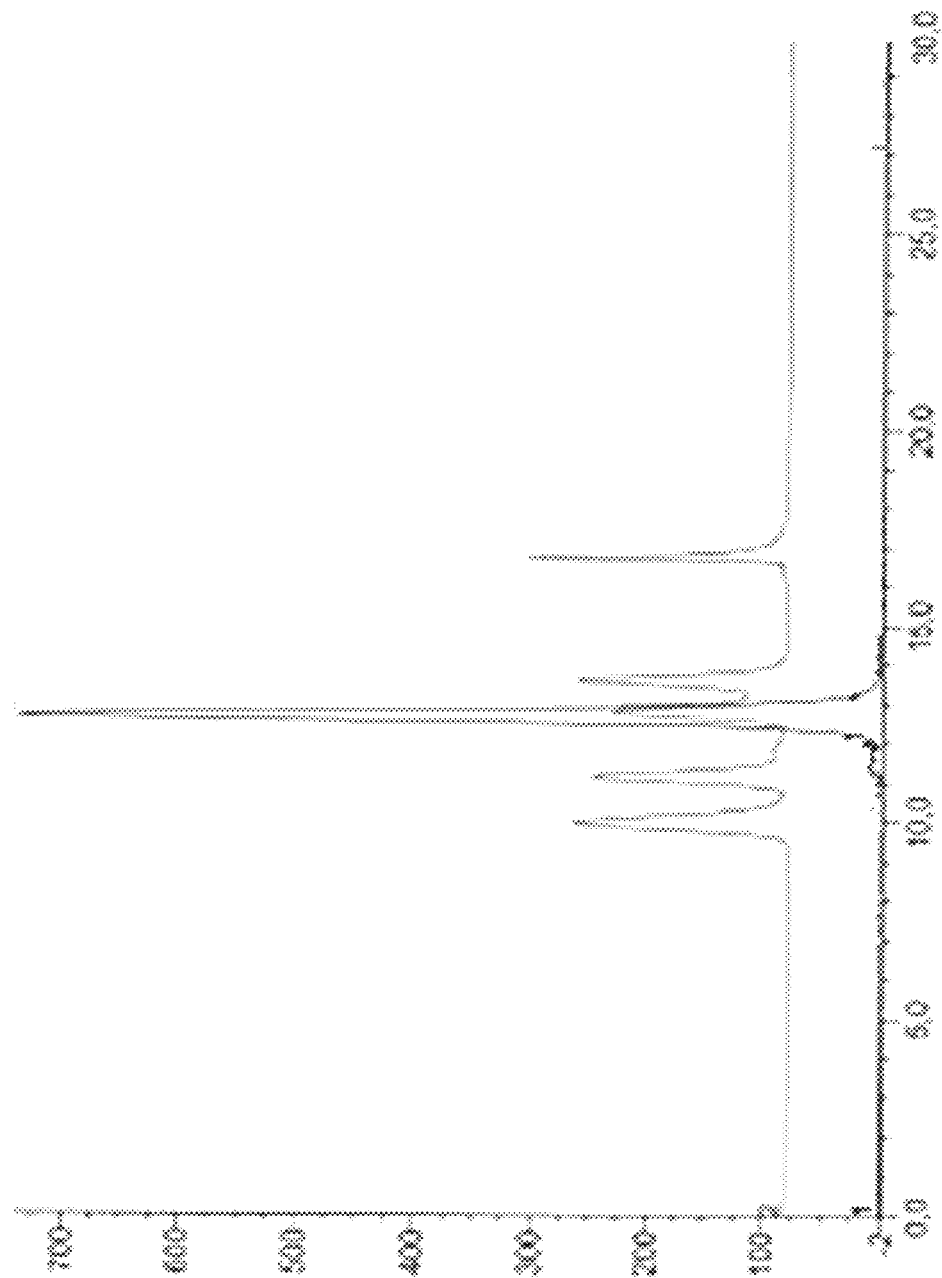

FIG. 23 Analytical HPLC chromatogram of the SlyD/FKBP12-IGF-1(74-90) fusion polypeptide.

Figure 24:
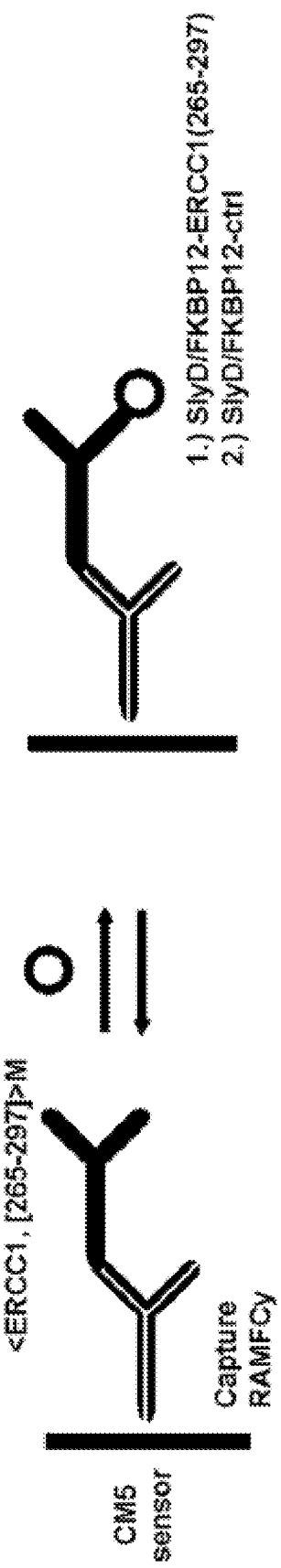

FIG. 24 Scheme of BIACORE™ binding assay kinetic screening with SlyD/FKBP12-ERCC1 fusion polypeptide and 300 nM SlyD/FKBP12-ctrl as analytes in solution. CM5 sensor, Capture RAMFCγ: Rabbit anti mouse Fc gamma capturing antibody.

Figure 25:
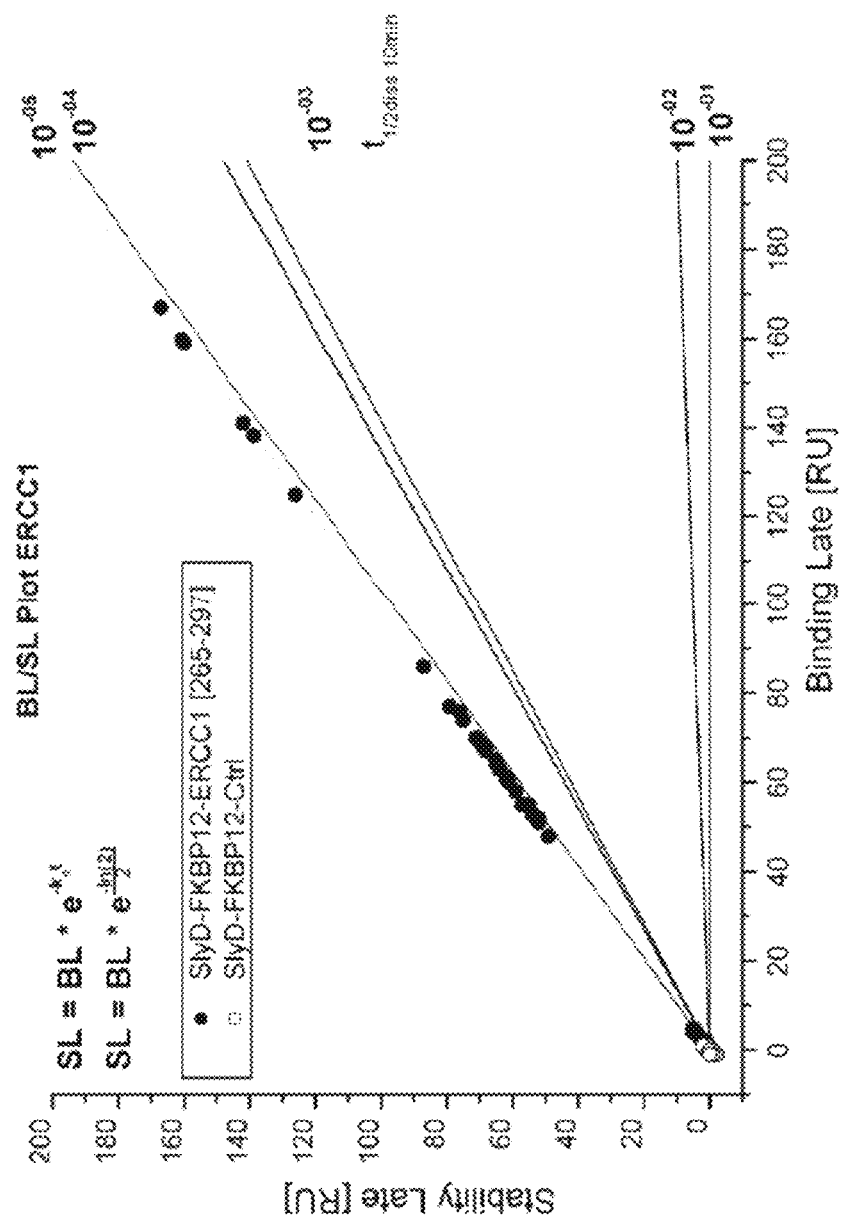

FIG. 25 Stability Late/Binding Late Plot showing kinetic properties of anti-ERCC1 antibodies determined by kinetic screening using SlyD/FKBP12-ERCC1 as analyte in solution. All clones populate the $10^{-5}$ 1/s trend line at Binding Late values >40 RU indicating extraordinary antigen complex stability. No binding versus SlyD/FKBP12-ctrl is detectable.

Figure 26:
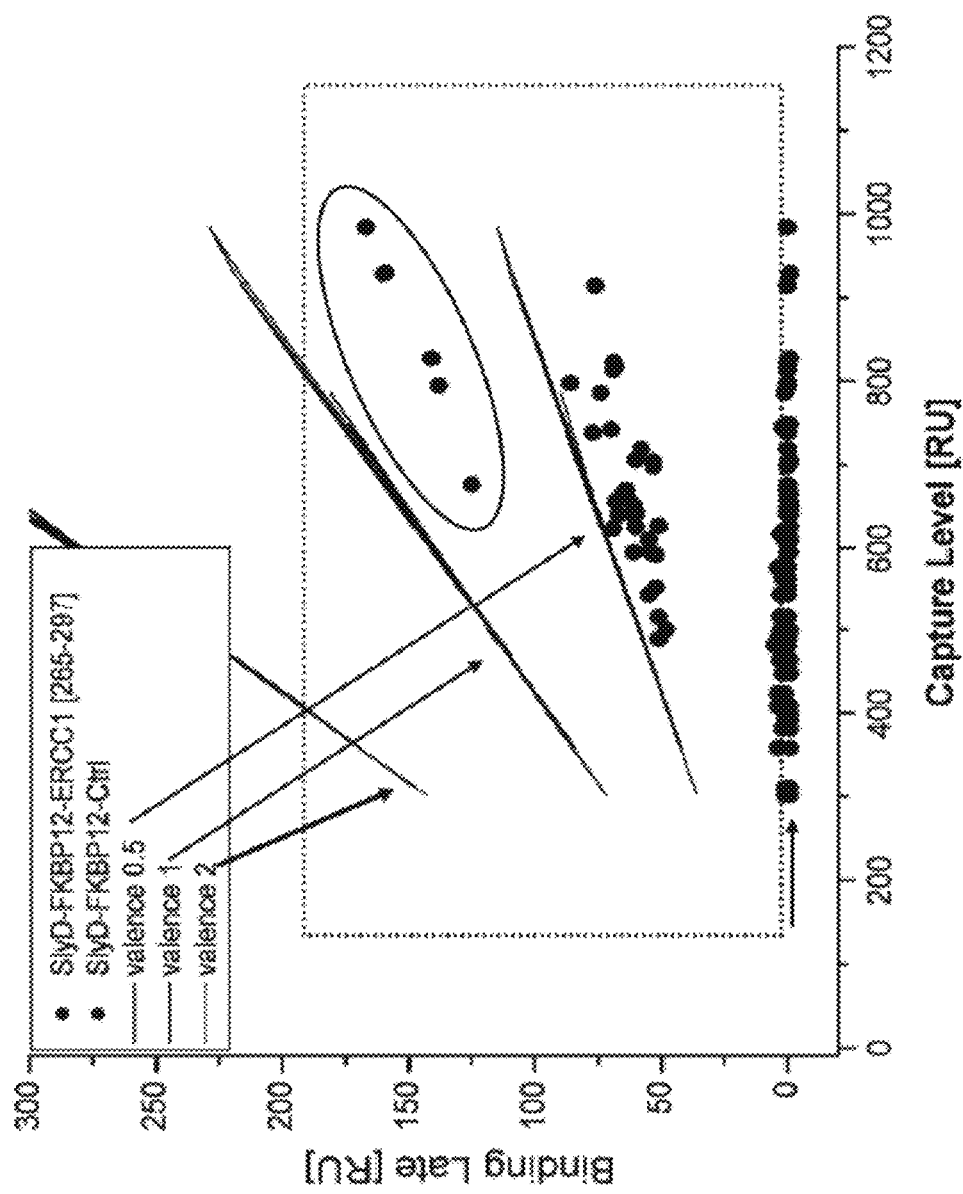

FIG. 26 Properties of anti-ERCC1 antibodies determined by kinetic screening. The Binding Late/Antibody Capture Level Plot indicates binding valence corridors by trend lines. All 5.00x.35 sister clones (encircled) populate the valence corridor between a Molar Ratio=0.5 and Molar Ratio=1 and were selected for further processing.

FIGS. 27A & 27B Table with kinetic properties of anti-ERCC1 antibodies determined by kinetic screening. BL: Binding Late, signal amplitude height in relative response units at the end of the SlyD/FKBP12-ERCC1 association phase. SL: Stability Late, signal amplitude height in relative response units at the end of the SlyD/FKBP12-ERCC1 dissociation phase. kd: dissociation rate constant (1/s) according to a Langmuir fit of the dissociation phase. t1/2diss: antibody-SlyD/FKBP12-ERCC1 complex half-life in minutes, calculated according to the formula t1/2 diss=ln (2)/(60*kd).

Figure 28:
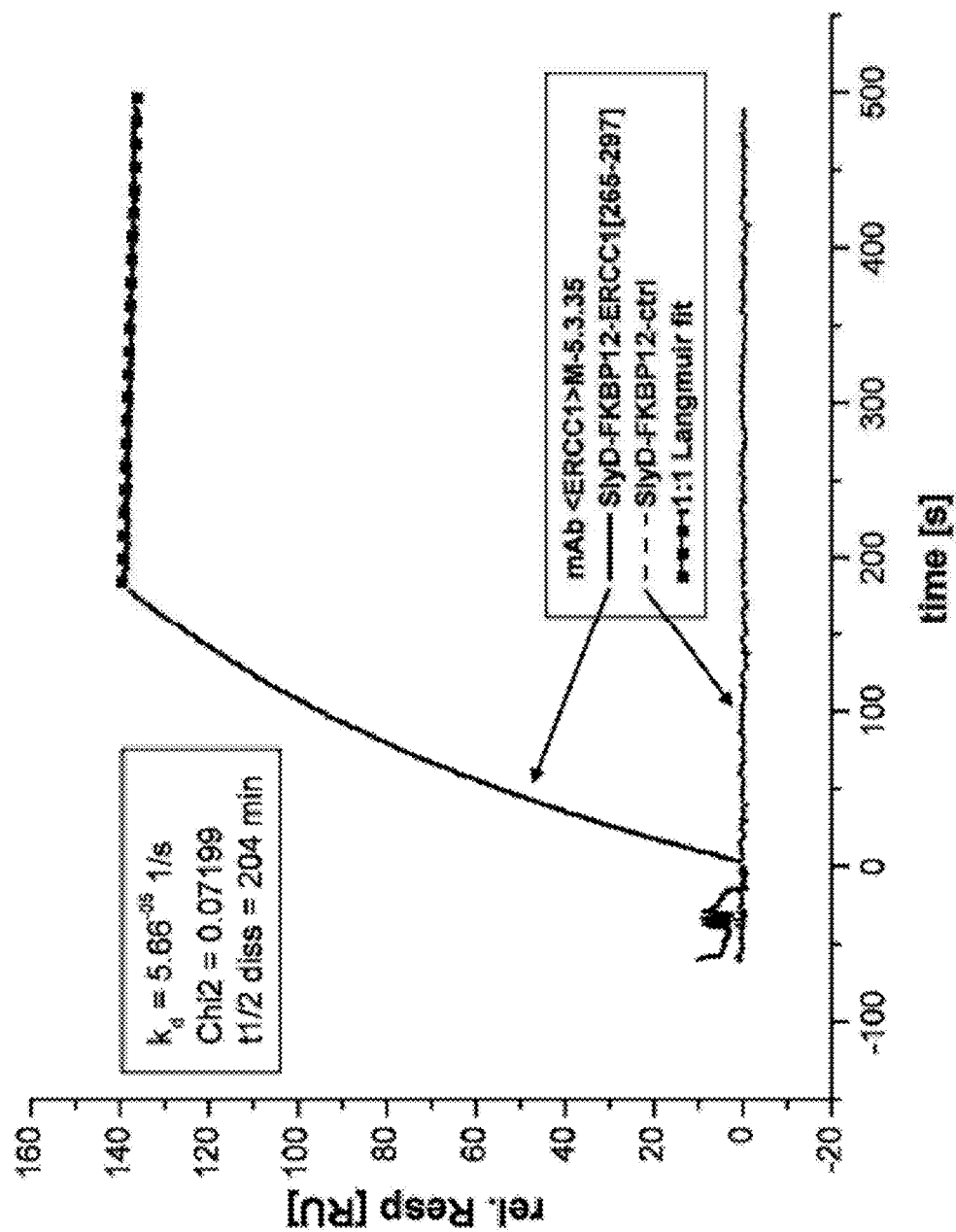

FIG. 28 Exemplary anti-ERCC1 antibody single concentration kinetic of clone <ERCC1>M-5.3.35 using SlyD/FKBP12-ERCC1 as analyte in solution.

Figure 29:
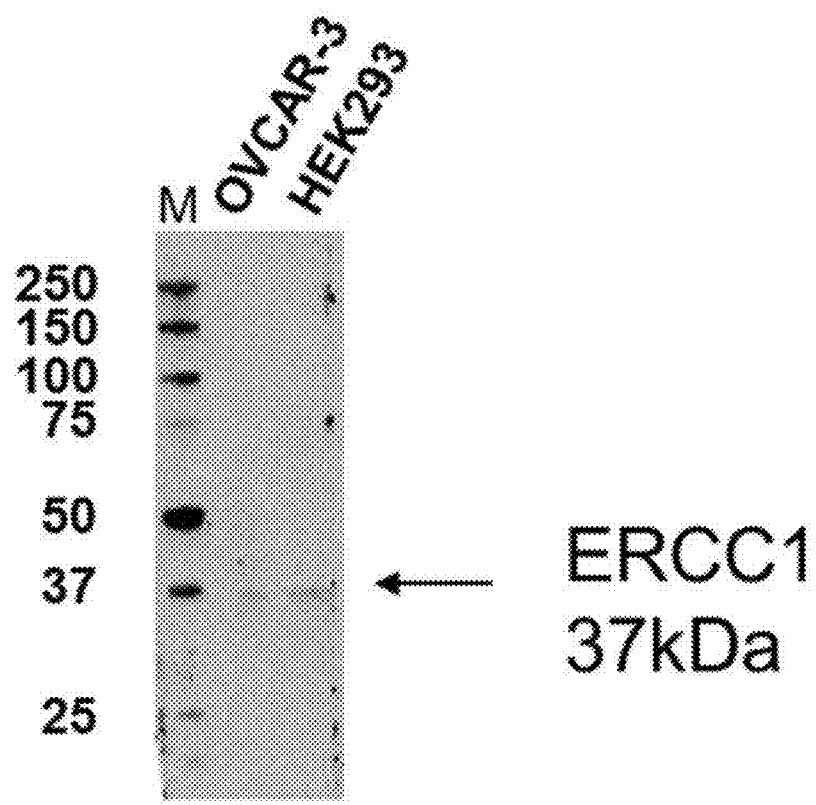

FIG. 29 Western blot using clone <ERCC1>M-5.1.35. 5 µg OVCAR-3 and HEK293 cell lysates were loaded per lane on a NuPAGE SDS gels (Invitrogen). A specific ERCC1 band at 37 kDa is detected.

Figure 30:
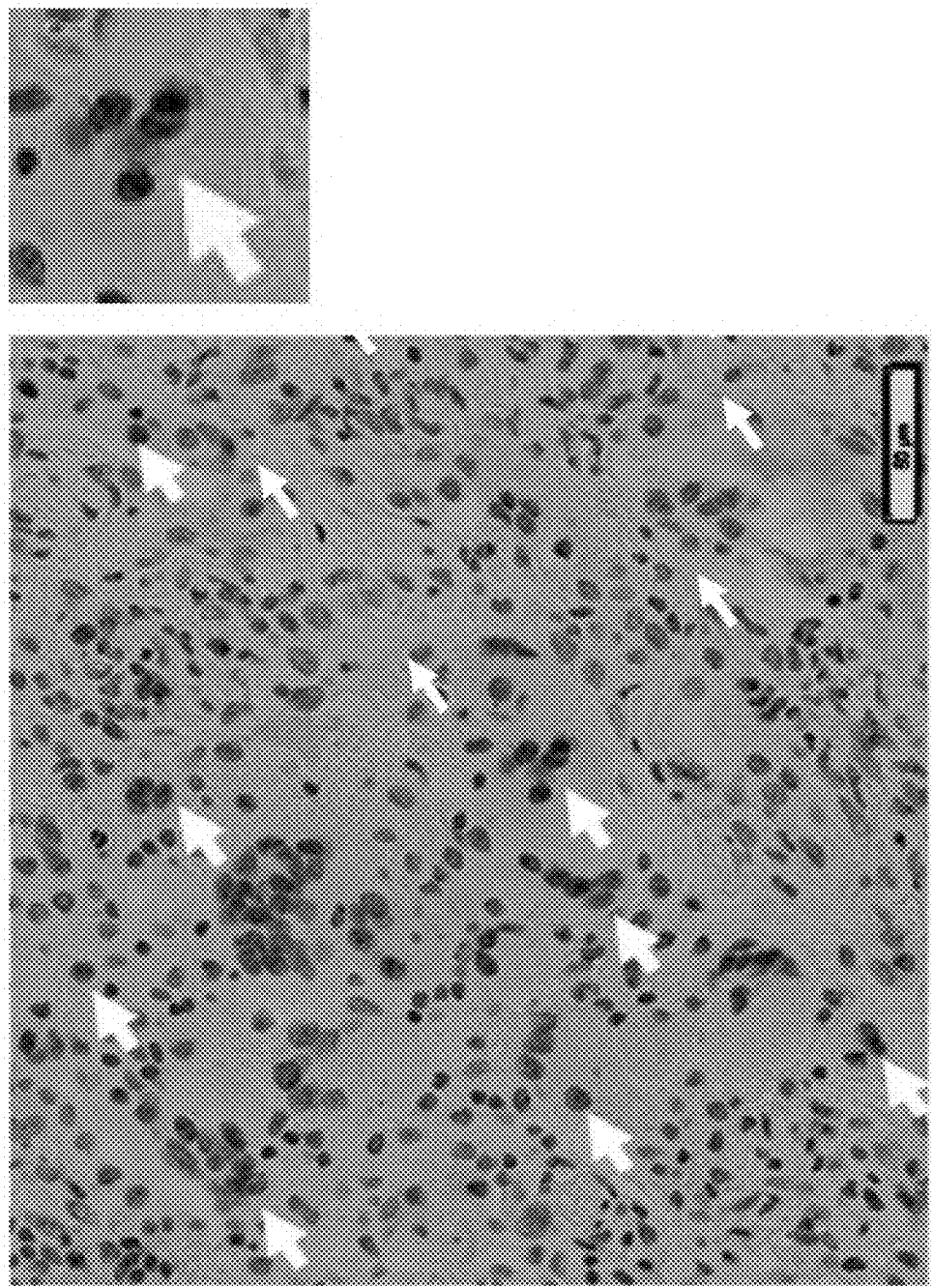

FIG. 30 Immunohistochemical detection of ERCC1 in FFPE embedded human cancer tissue of SCLC cancer sample. White arrows indicate cells with elevated ERCC1 level appearing in darker color.

Figure 31:
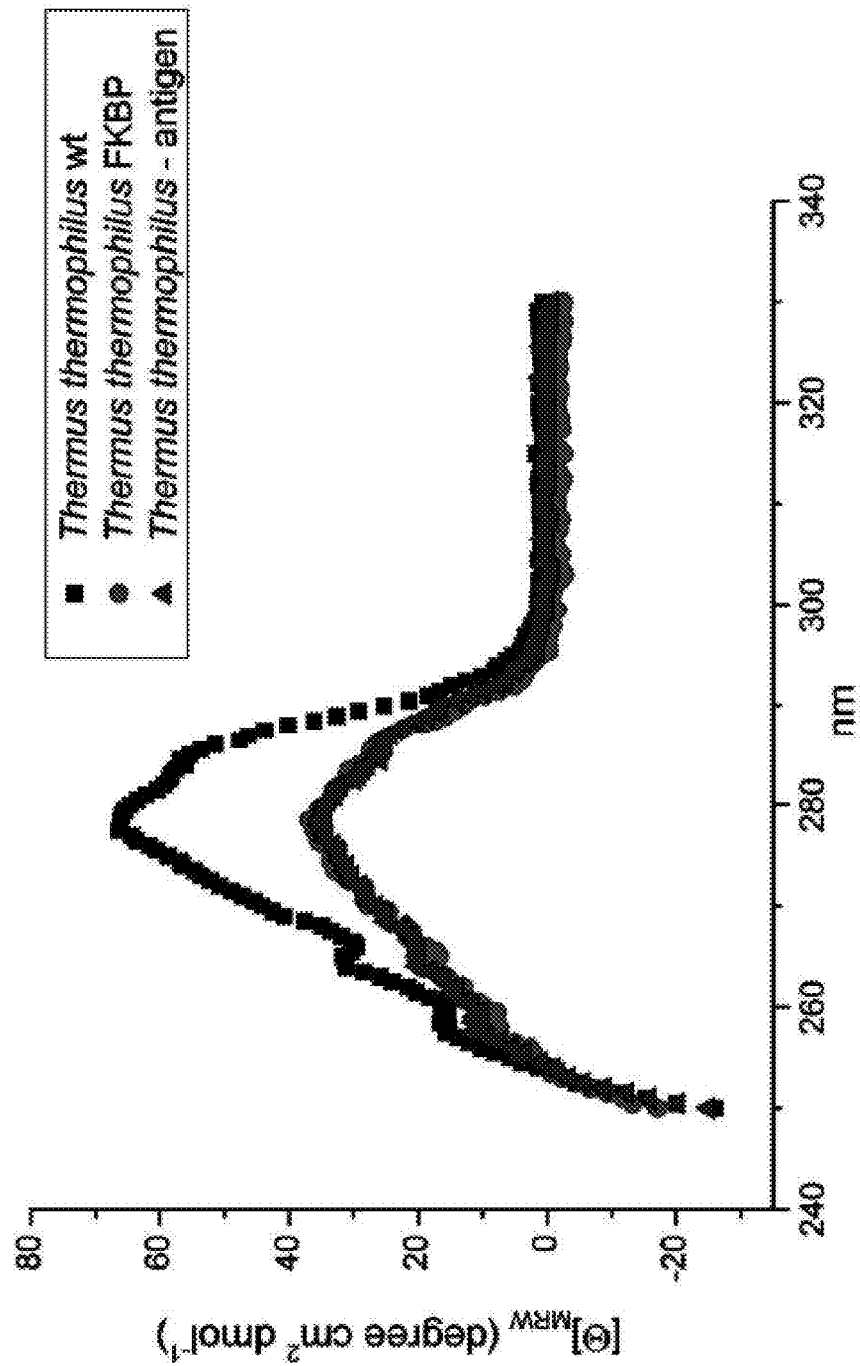

FIG. 31 Near UV CD spectra of *Thermus thermophilus* SlyD wild-type polypeptide, *Thermus thermophilus* SlyD-ΔIF fusion polypeptide (FKBP) and *Thermus thermophilus* SlyD-antigen fusion polypeptide. At 20° C. all polypeptides are folded in their native structure.

Figure 32:
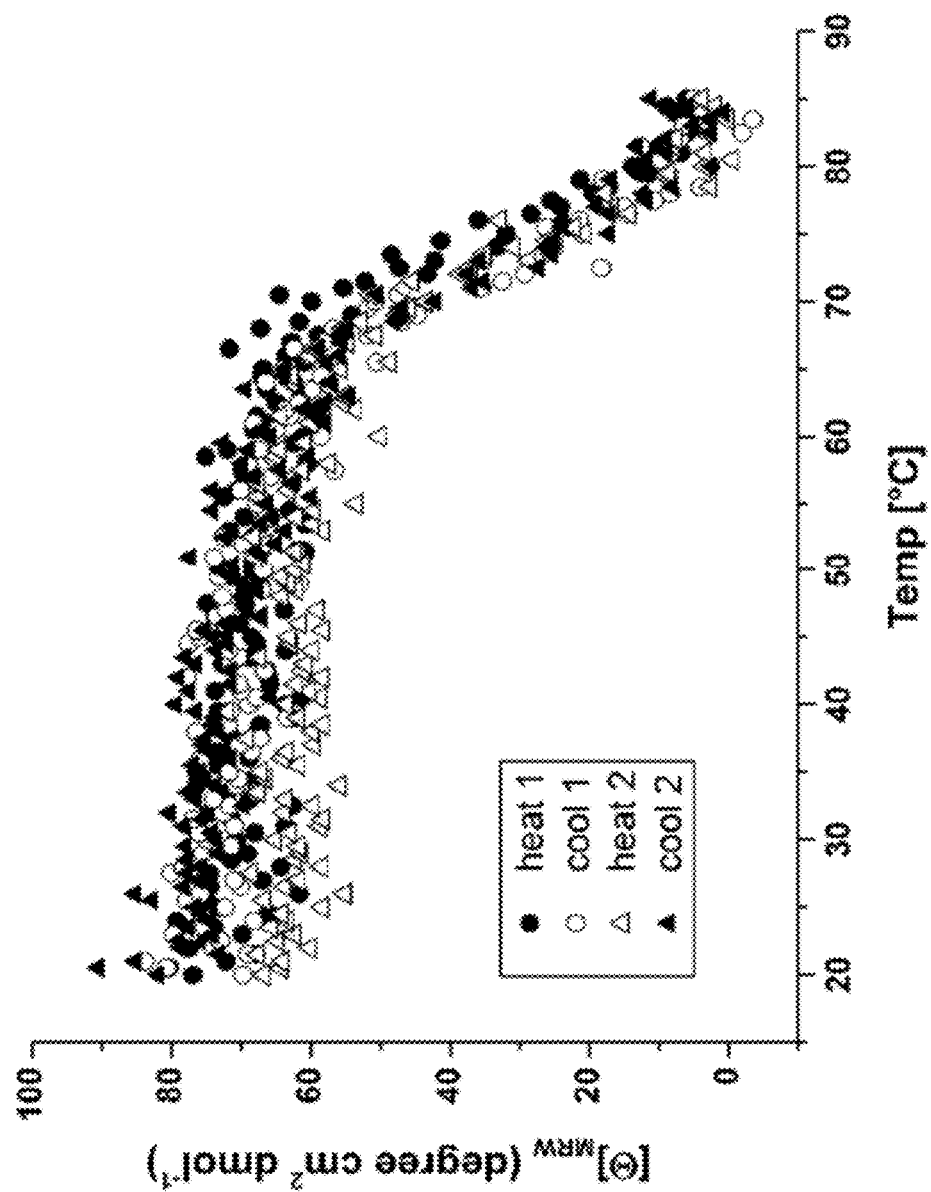

FIG. 32 Temperature-dependent CD spectra of the *Thermus thermophilus* SlyD-ΔIF fusion polypeptide. Repeated heating and cooling shows that the FKBP domain of *Thermus thermophilus* SlyD reversibly folds. *Thermus thermophilus* SlyD-ΔIF fusion polypeptide is stable up to 65° C. and unfolded at 85° C.

Figure 33:
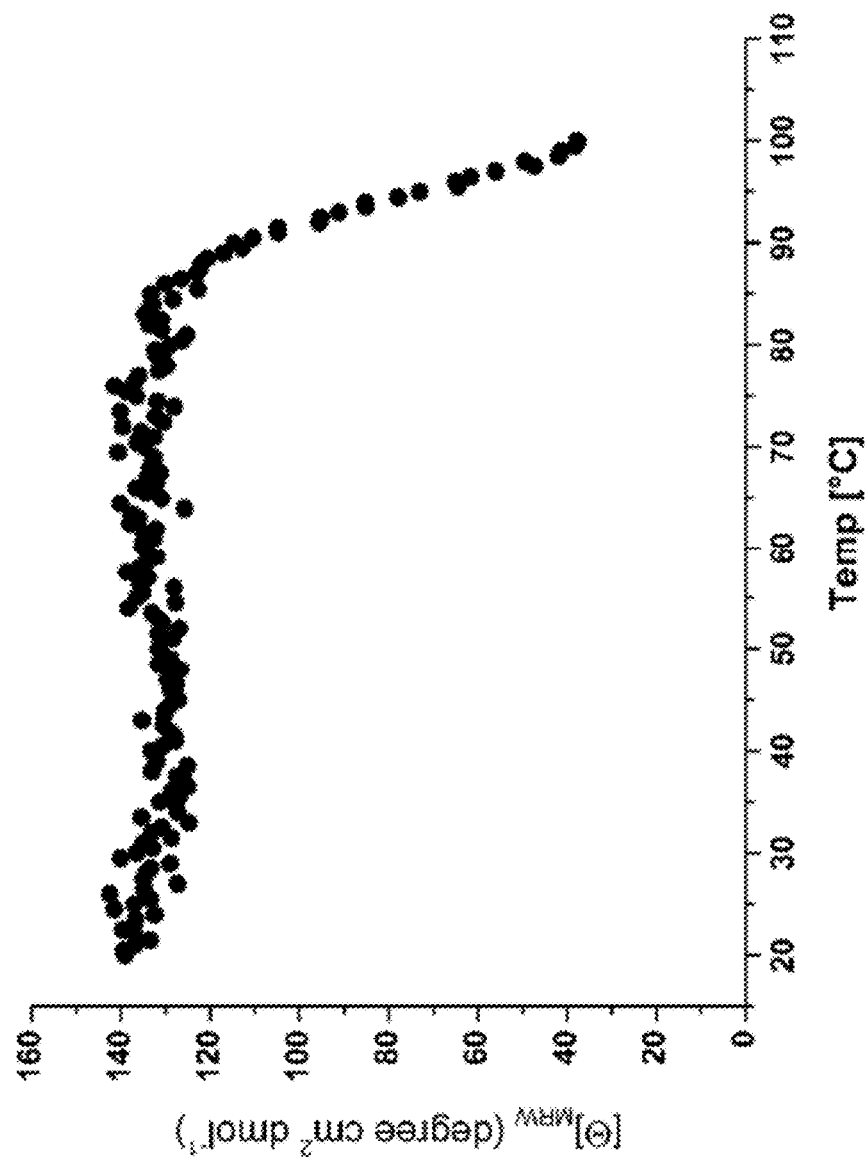

FIG. 33 Kinetics of 12 clonal culture supernatants for the binding of IGF-1.

FIG. 34 Serum titers, determined by ELISA after 12 weeks immunization of Balb/C and NMRI mice. mE: milli Absorbance, IGF-1: native human IGF-1 (PEPROTECH®).

FIG. 35 ELISA screen of clone culture supernatants vs. IGF-1, *Thermus thermophilus* SlyD-IGF-1(74-90) fusion polypeptide and *Thermus thermophilus* SlyD wild-type polypeptide. Elevated binding absorption signals were detectable vs. IGF-1 and *Thermus thermophilus* SlyD-IGF-1(74-90) fusion polypeptide.

FIG. 36 Table with binding kinetics of fusion polypeptide-developed anti IGF-1 antibodies. mAb: monoclonal antibody; RU: Relative response unit of monoclonal antibody captured on the sensor; Antigen: antigen in solution; kDa: molecular weight of the antigens injected as analytes in solution; ka: association rate constant; kd: dissociation rate constant; t1/2 diss: antibody-antigen complex half-life calculated according to the formula t1/2 diss=ln(2)/60*kd; KD: dissociation constant; $R_{MAX}$: Binding signal at the end of the association phase of the 90 nM analyte injection; MR: Molar Ratio; $Chi^2$: failure of the measurement; n.d.: not detectable.

Figure 37:
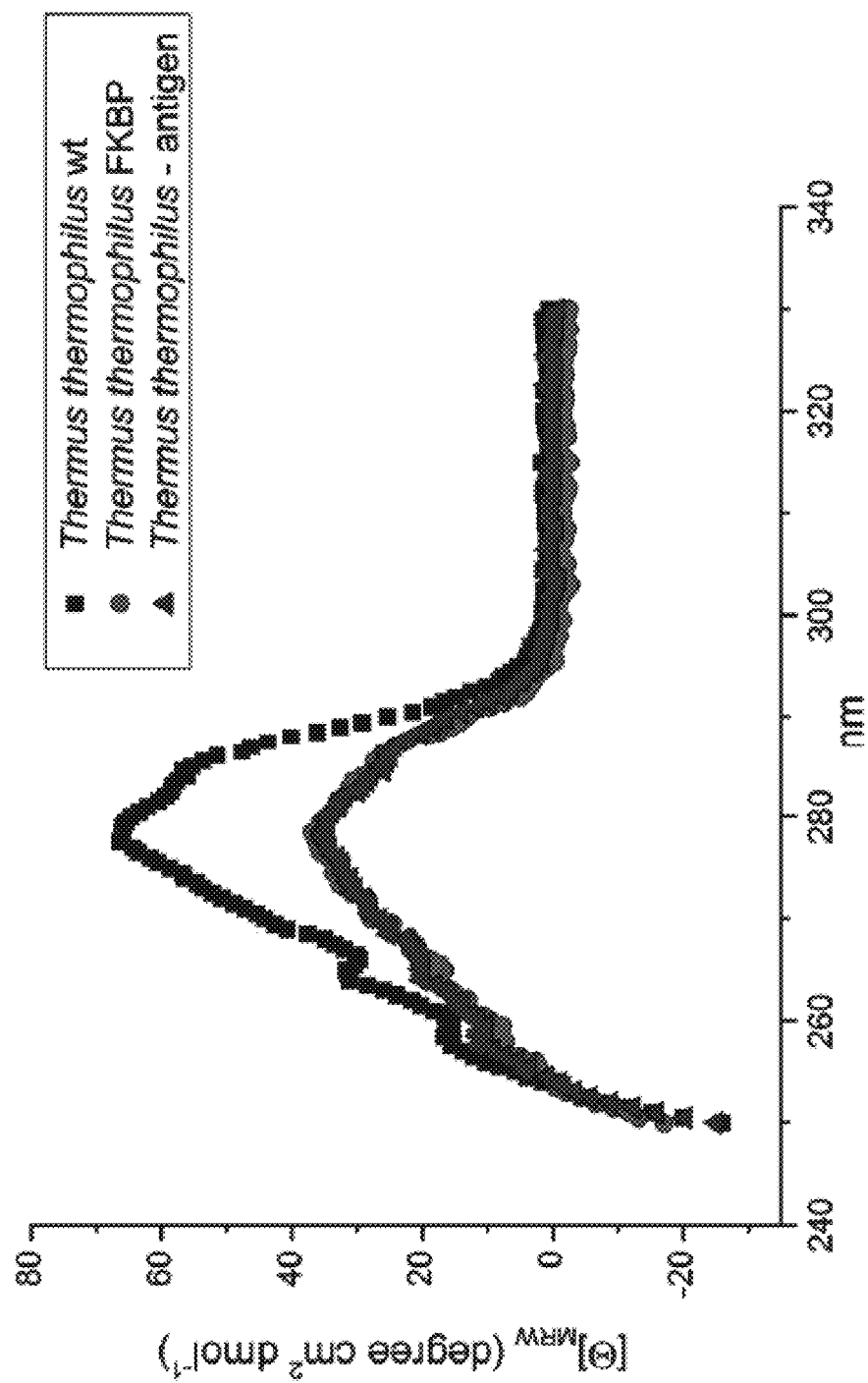

FIG. 37 Near UV CD spectra of *Thermus thermophilus* SlyD wild-type polypeptide, *Thermus thermophilus* SlyD-ΔIF fusion polypeptide (FKBP) and *Thermus thermophilus* SlyD-antigen fusion polypeptide. At 20° C. all polypeptides are folded in their native structure.

Figure 38:
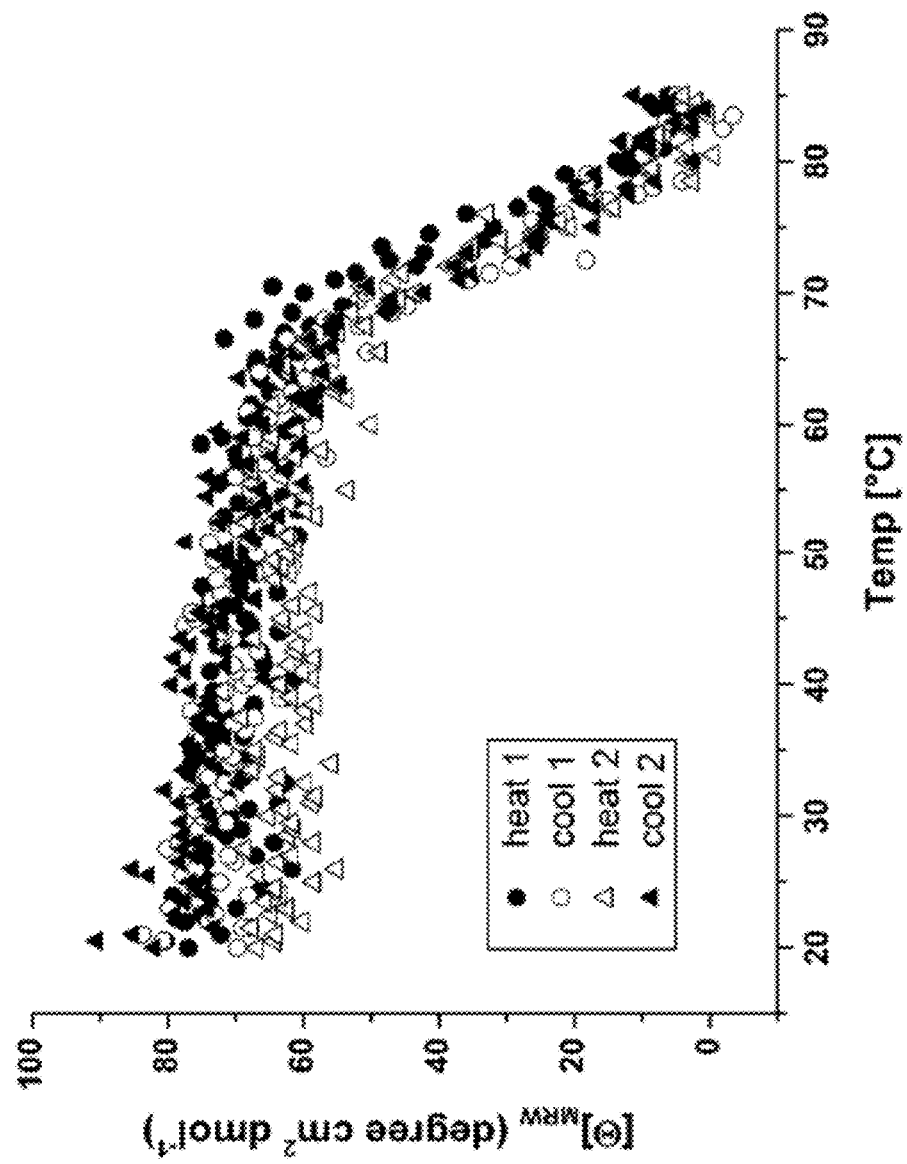

FIG. 38 Temperature-dependent CD spectra of the *Thermus thermophilus* SlyD-ΔIF fusion polypeptide. Repeated heating and cooling shows that the FKBP domain of *Thermus thermophilus* SlyD reversibly folds. *Thermus thermophilus* SlyD-ΔIF fusion polypeptide is stable up to 65° C. and unfolded at 85° C.

Figure 39:
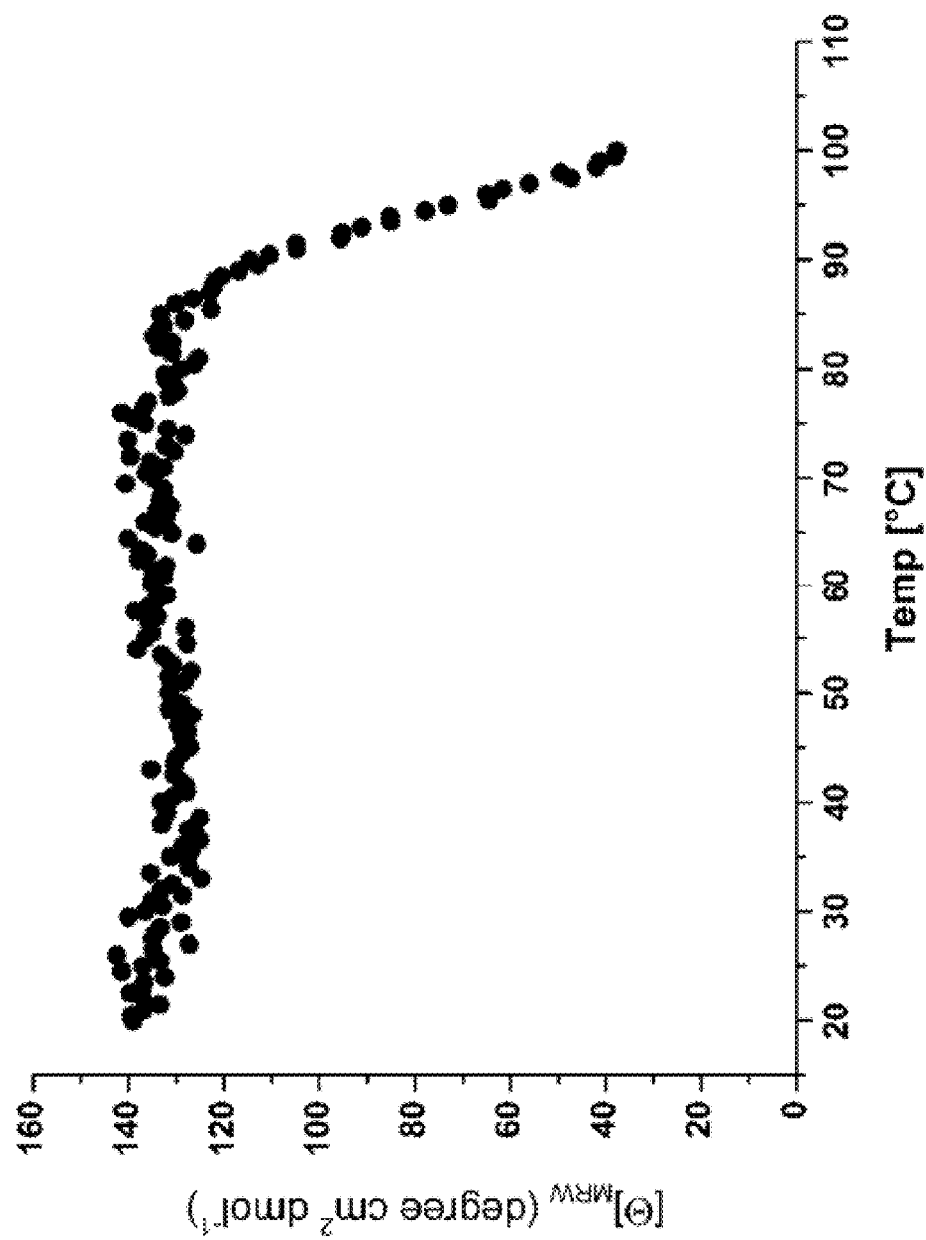

FIG. 39 Temperature-dependent CD spectra of the *Thermococcus gammatolerans* SlyD-antigen fusion polypeptide. At 100° C. no lower signal plateau was reached, indicating that the fusion polypeptide is not yet completely unfolded. Up to 80° C. the fusion polypeptide is stable and folded.

Figure 40:
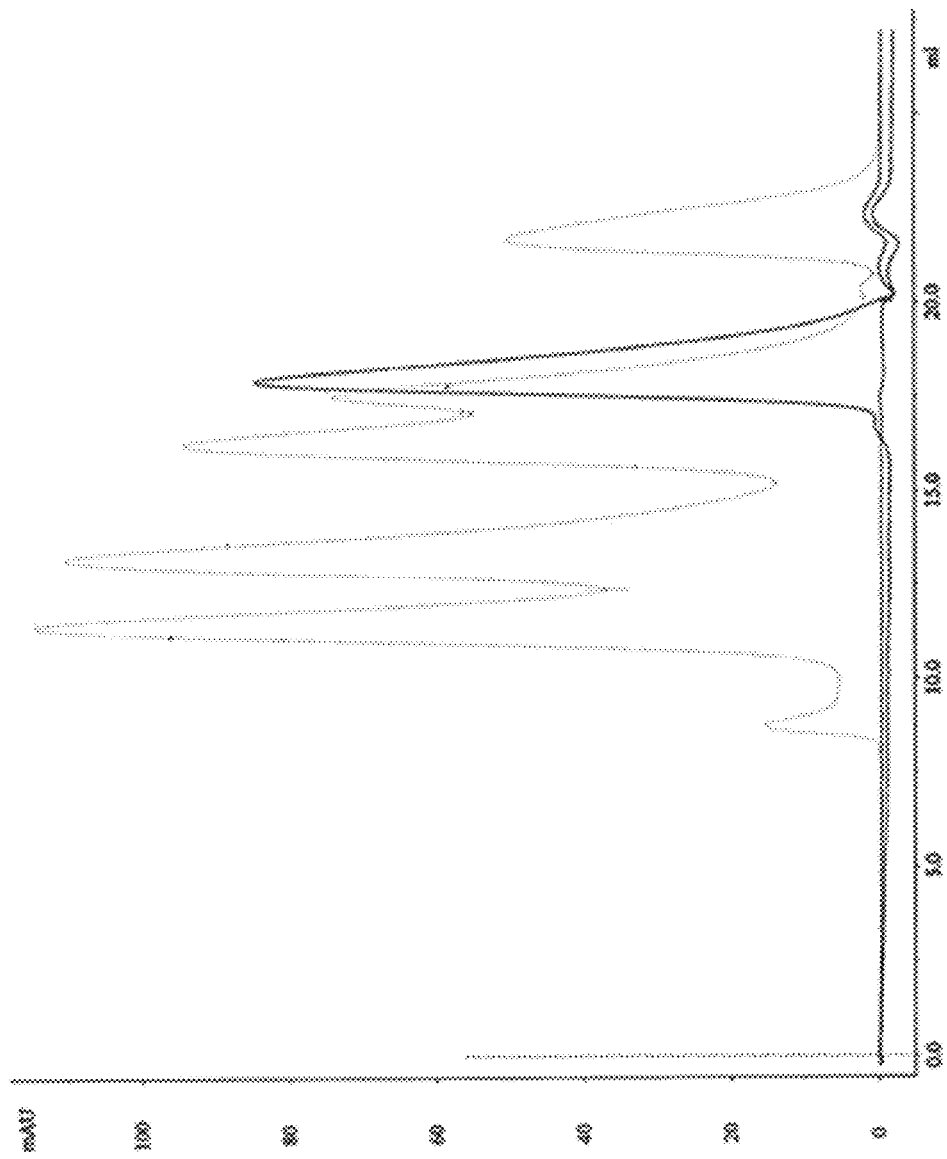

FIG. 40 The monomeric *Thermococcus gammatolerans* SlyD-antigen fusion polypeptide comprising fraction was rechromatographed after repeated freezing and thawing cycles and a temperature stress test. 280 nm SUX 200 profile of 300 μg Ni-NTA elution fraction of *Thermococcus gammatolerans* SlyD-antigen fusion polypeptide in 100 μl 50 mM K$_2$HPO$_4$/KH$_2$PO$_4$, pH 7.0, 100 mM KCl, 0.5 mM EDTA at 0.75 m/min.

Figure 41:
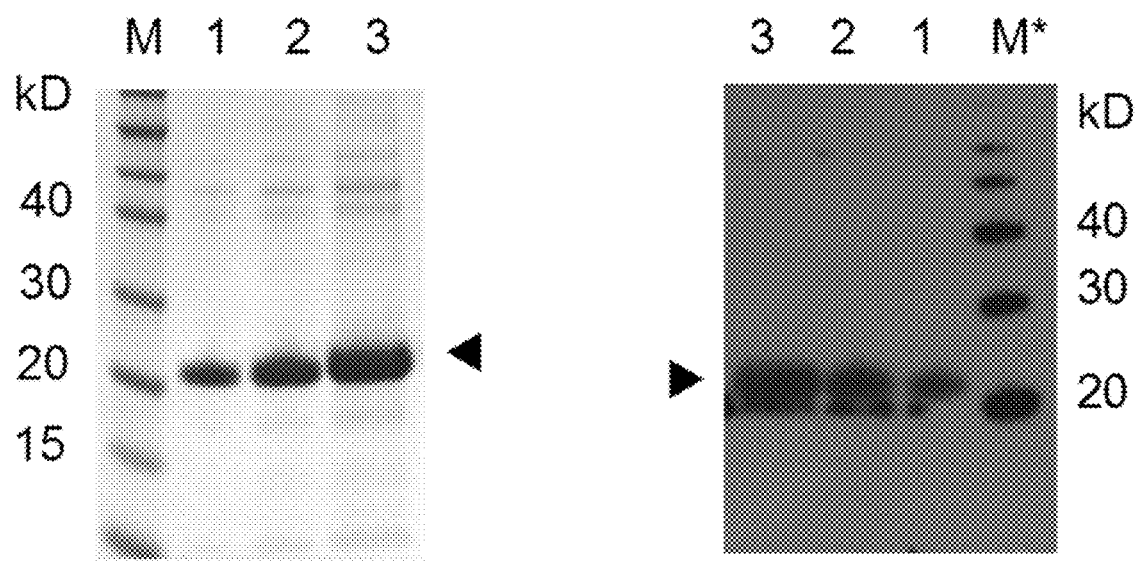

FIG. 41 SDS PAGE (Coomassie staining) and Western Blot (10 sec incubation with anti-octa-his-tag antibody) of the *Thermus thermophilus* SlyD-wild-type polypeptide.

FIGS. 42A & 42B Quantification of this kinetic screening approach for anti-IGF-1 antibodies. Empty cells denote that the respective value was not detectable/could not be determined.

FIG. 43 Kinetics of 12 clonal culture supernatants for the binding of IGF-1.

Figure 44:
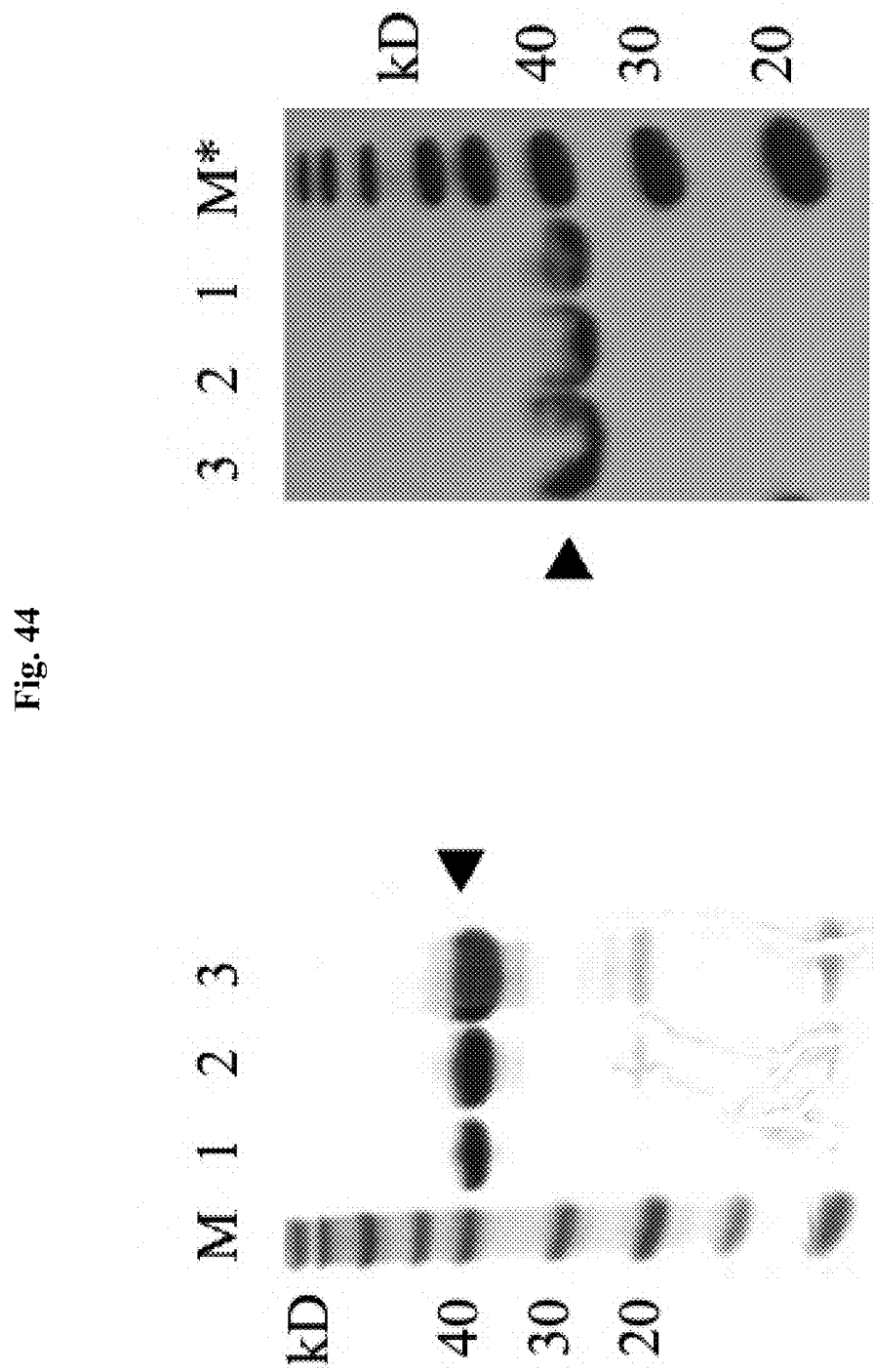

FIG. 44 Exemplary BIACORE™ kinetic screening of primary culture <IGF-1>M-11.0.15 vs. IGF-1, IGF-2, *Thermus thermophilus* SlyD-IGF-1(74-90) fusion polypeptide and *Thermus thermophilus* SlyD wild-type polypeptide.

Figure 45:
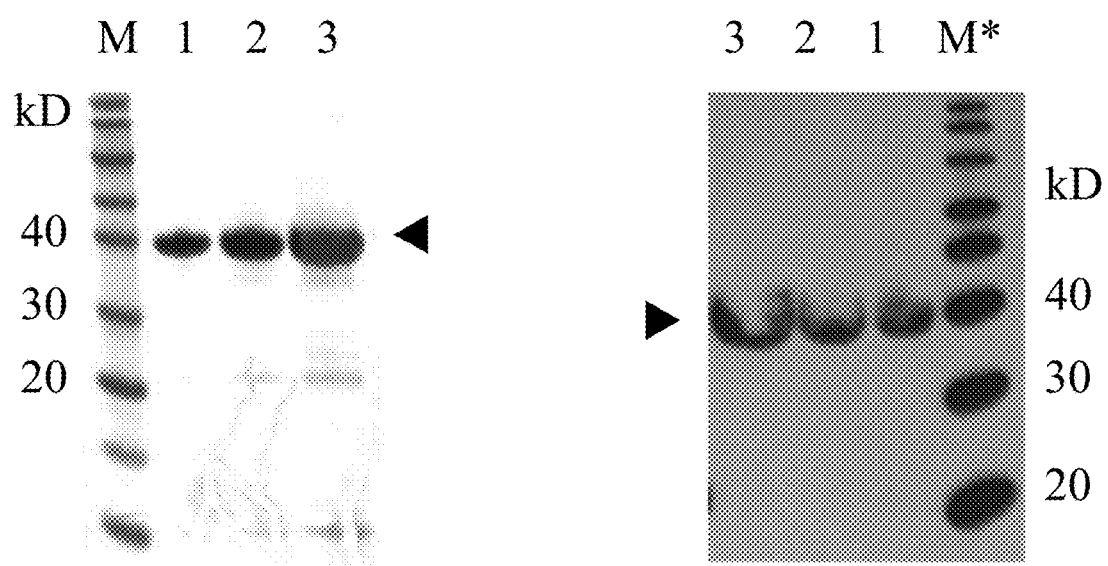

FIG. 45 SDS page (left) and Western Blot (right) of Ni-NTA chromatographically purified SlyD-FKBP12-CD81. M: Novex Sharp Standard, 1: SlyD/FKBP12-CD81; 2.5 μg MW: 36 kD, 2: SlyD/FKBP12-CD81; 5.0 μg, 3: SlyD/FKBP12-CD81; 10 μg M*: MAGICMARK™.

EXAMPLE 1

Synthesis of a DNA Sequence Encoding a Variable Sequence with a Selected Subset of Naturally Occurring Amino Acid Residues A library of 97 bp single-stranded linear DNA fragments comprising a variable sequence encoding an amino acid sequence of 13 amino acids was synthesized by making use of established state-of-the-art phosphoramidite chemistry. The DNA fragment was a fragment with a contiguous nucleotide sequence according to formula III

$$5'\text{-}U_D\text{-}O_D\text{-}Z_D\text{-}3' \qquad \text{(formula III)},$$

wherein $U_D$, $O_D$, and $Z_D$ were linked by phosphodiester bonds.

$U_D$ was 5'-CGA CAG TGT GGC GCA GGA TCC-3' comprising a BamHI site (SEQ ID NO:18) and serving as a binding site for a complementary forward primer.

$Z_D$ was 5'-GGG AGC TCG CAG GAG ACG TAG C-3' comprising a SacI site (SEQ ID NO:19) and serving as a binding site for a complementary reverse primer.

$O_D$ was a variable sequence according to the formula IV

$$5'\text{-}(\text{Lib-Lib1})_6\text{-Lib-3'} \qquad \text{(formula IV)}.$$

Lib was a first mixture of trinucleotides, wherein each trinucleotide corresponded to a codon encoding an amino acid according to the genetic code. The composition of the codons was restricted in that codons for only a subset of the naturally occurring amino acids were present. FIG. 1 left panel indicates the amino acids for which codons were present in Lib. The percentage indicated for a particular encoded amino acid reflects the relative concentration of the respective trinucleotide in the mixture. All trinucleotides in the mixture represent 100%. In the mixture no codons encoding C and no codons representing stop codons were present.

Lib1 was a second mixture of trinucleotides, wherein each trinucleotide corresponded to a codon encoding an amino acid according to the genetic code. The composition of the codons was restricted in that codons for only a subset of the naturally occurring amino acids were present. FIG. 1 right panel indicates the amino acids for which codons were present in Lib1. The percentage indicated for a particular encoded amino acid reflects the relative concentration of the respective trinucleotide in the mixture. All trinucleotides in the mixture represent 100%. In the mixture no codons encoding any of C, I, and W and no codons representing stop codons were present.

To advantageously gain control over the encoded amino acid composition in the variable nucleotide sequence to prepared, phosphoramidite chemistry was applied. The oligonucleotide library was synthesized in a 1 μmole scale synthesis on an ABI 394 DNA synthesizer using standard automated solid phase DNA synthesis procedure and applying phosphoramidte chemistry. A dC-CPG (Sigma Aldrich, Proligo, part no. C401010-C04), standard dA(Bz), dC(Bz), dG(iBu) und dT phosphoramidites (Sigma Aldrich, Proligo, part no. A111031, C111031, G111031, T111031) in a 0.1 M concentration as well as the two different trimer phosphoramidite libraries Lib and Lib1 were used as building blocks. The trimer phosphoramidite building blocks were purchased from Glen Research, mixed in distinct ratios considering different molecular weights (MW) and reaction factors (RF) as recommended by Glen Research and diluted with DNA grade acetonitrile in a 0.1 M concentration according to the following calculation as depicted in FIG. 2. FIG. 2 also indicates the specific trinucleotides representing the particular codons used to encode the amino acids.

Standard DNA cycle were used for coupling dA, dG, dC and dT, standard RNA synthesis cycle was used for coupling Lib and Lib1, and standard cleavage program was used for cleavage of the 5'-DMT protected oligonucleotide library from the support by conc. ammonia. Protecting groups were cleaved by treatment with conc. ammonia (17 h at r.t. and 4 h at 56° C.). Crude DMT protected oligonucleotide library was evaporated and purified by RP HPLC (column: PRP1 (Hamilton part no. 79352)) using 0.1 M triethylammonium acetate pH 7/acetonitrile gradient. Product fractions were combined and desalted by dialysis (MWCO 1000, SpectraPor 6, part no. 132638) against water for 3 days thereby also cleaving DMT group. Finally oligonucleotide library was lyophilized. The yield was: 127,6 OD260 (146 nmoles).

As a result, a library 97 bp single-stranded linear DNA fragments of formula III was obtained.

According to the 4751 human and 2170 murine CDR-H3 segments in the Kabat and IMGT databases, the average length of a CDR-H3 amino acid sequence segment is between 12 and 14 amino acids (Zemlin, M. et al. J Mol Biol 334 (2003). 733-749). Since 13 amino acids are the mean value between the typical human and murine CDR-H3 lengths, the library fragment length for the variable amino acid sequence encoded in the present example was set to 13 amino acids.

Trinucleotides encoding Cysteine and stop codons were omitted. The theoretical diversity of 13 randomized positions with 19 amino acids diversity per position was roughly estimated to be 4×10$^{16}$. This diversity exceeds the diversity which can reasonably be worked with using a phage display approach. But a ribosome display approach is estimated to be capable of displaying at least 10×10$^{12}$ library members.

EXAMPLE 2

Ribosome Display with the *Thermus thermophilus* SlyD FKBP Domain, Positive Control Experiment [Positive Control]

First, the basic suitability of the *Thermus thermophilus* SlyD FKBP scaffold for the purpose of ribosome display selections was shown. A 719 bp Ribosome Display DNA Fragment was designed and synthesized. The 360 bp *Thermus thermophilus* SlyD FKBP sequence is under the control of a T7 promotor and gene10 RBS (ribosome binding site) regulatory sequences. A 84 bp sequence replaces the Insert in Flap Domain by the a sequence motif encoding a peptide hairpin, which is an antibody target motif. Downstream of the *Thermus thermophilus* SlyD FKBP sequence a 189 bp, stop-codon-less ribosome display spacer is fused. The spacer is basically designed according to Mattheakis, L. C. et al. PNAS 91 (1994) 9022-9026, but additionally contains the SecM translational stalling sequence (Nakatogawa, H. and K. Ito Cell 108 (2002) 629-636; Gumbart, J. et al. Biophys J 103 (2012) 331-341). At the 3'-end of the construct a mRNA hairpin encoding sequence is designed to stabilize and protect the mRNA from nuclease digestion.

The sequence of the DNA construct was (SEQ ID NO: 20)
5'-GGTGATGTCGGCGATATAGGCGCCAGCAACCGCACCTGTGGCGC

CGGTGATGCCGGCCACGATGCGTCCGGCGTAGAGGATCGTGATCTCGATC

CCGCGAAATTAATACGACTCACTATAGGGAGACCACAACGGTTTCCCTCT

AGAAATAATTTTGTTTAACTTTAAGAAGGAGATATACATATGAAAGTGGG

CCAGGATAAAGTTGTCACCATTCGCTATACCCTGCAGGTTGAAGGTGAAG

TGCTGGATCAGGGCGAACTCAGCTATTTACATGGTCACCGCAACCTGATT

CCGGGCCTGGAGGAAGCGCTGGAAGGTCGCGAGGAAGGCGAAGCATTTCA

GGCGCATGTGCCGGCAGAGAAAGCGTATGGCGCCGGATCCCCGCAGCCTC

TGGTGTATAACAAATTAACCTTTCAGCTGGAACCGAACCCTCATACCAAA

GGGAGCTCCGGCAAAGATTTAGATTTTCAGGTGGAAGTGGTTAAAGTGCG

CGAAGCAACCCCGGAGGAACTGTTACATGGCCACGCGGGCGCTGGCTCTG

GAGCTGGTGCAGGCTCTGGTGCTGGCGCAGGTTCTCCAGCAGCGGTGCCG

GCAGCAGTTCCTGCTGCGGTGGGCGAAGGCGAGGGAGAGTTCAGTACGCC

AGTTTGGATCTCGCAGGCACAGGGCATCCGTGCTGGTCCTCAGAGGCTTT

CCAACCCCCAGCCTATGCGGGGGTT-3'

On the level of amino acid sequence the ribosome display construct encodes a stop-codon free amino acid sequence:

(SEQ ID NO: 21)
NH2-MKVGQDKVVTIRYTLQVEGEVLDQGELSYLHGHRNLIPGLEEALEG

REEGEAFQAHVPAEKAYGAGSPQPLVYNKLTFQLEPNPHTKGSSGKDLDF

QVEVVKVREATPEELLHGHAGAGSGAGAGSGAGAGSPAAVPAAVPAAVGE

GEGEFSTPVWISQAQGIRAGPQRLSNPQPMRG-COOH

The ribosome display construct included an encoded segment of amino acids generating flexibility (GAGS), and included alpha helix breaker motives (PAAV) and also provided negative charges (GEGEGE) to optimally provide the FKBP domain for display (Mattheakis, et al. supra).

The IF domain was replaced by the Her-3 ECD heterodimerization hairpin domain II. This polypeptide sequence typically folds into a so called beta-hairpin structure. The amino acid sequence of the beta-hairpin, grafted into the *Thermus thermophilus* SlyD FKBP domain was: NH2-PQPLVYNKLTFQLEPNPHTK-COOH (SEQ ID NO:22).

In this ribosome display experiment a murine monoclonal anti-beta-hairpin antibody was used as a panning target for the ribosomally displayed *Thermus thermophilus* SlyD-FKBP Her-3 ECD beta hairpin peptide epitope.

No background DNA binding signal could be amplified, indicating that the ribosomally presented *Thermus thermophilus* SlyD-peptide hairpin chimera, tethered via a polypeptide linker (Mattheakis, et al. supra) to the ribosome-mRNA complex was cotranslationally correctly folded and displayed. When further processed in a second panning cycle, no background binding signal was evolved. When using trastuzumab and pertuzumab as control panning targets, no background binding signal was amplified. To summarize, no unspecific binding could be detected. This makes this scaffold protein ideal to be used in molecular display technologies, respectively in a ribosome display selection.

Primers being used in the ribosome display process:

Primer R1:
(SEQ ID NO: 23)
5'-AACCCCCGCATAGGCTGGGG-3'

Primer F1:
(SEQ ID NO: 24)
5'-GGTGATGTCGGCGATATAGGCGC-3'

Primer F1A:
(SEQ ID NO: 25)
5'-CGAAATTAATACGACTCACTATAGGGAGACCACAACGGTTTCCC-3'

Primer Frt:
(SEQ ID NO: 26)
5'-GGGAGACCACAACGGTTTCCCTCTAGAAATAATTTTGTTTAACTTT

AAGAAGGAGATATACATATG-3'

Primer R1A:
(SEQ ID NO: 27)
5'-AACCCCCGCATAGGCTGGGGGTTGGAAAGCCTCTGAGGACCAG

CACG-3'

Primer Rrt:
(SEQ ID NO: 28)
5'-GGAAAGCCTCTGAGGACCAGCACGGATGCCCTGTGC-3'

EXAMPLE 3

Example Amplification of the Ribosome Display Construct, Positive Control Experiment The ribosome display construct of Example (foregoing) was PCR-amplified as follows. 100 μL PCR reaction contained 0.2 mM dNTPs (10 mM stock, dNTPmix, Roche Diagnostics, Mannheim, Germany), 2.5 units PWO Polymerase (100 units stock, Roche Diagnostics, Mannheim, Germany), 0.25 μM Primer F1 and 0.25 μM Primer R1; 1×PWO PCR buffer (Roche Diagnostics, Mannheim, Germany) and 25 ng fragment DNA template. The PCR profile was as follows: 5 min 95° C., (2 min 94° C., 45 sec 57° C., 45 sec 72° C.)×25, 5 min 72° C., ∞4° C. The appropriate length of a 3 μl aliquot of the PCR reaction product was confirmed by analytical agarose gel electrophoresis. The PCR product was then resolved in a 3% GelRed (Biotium) stained agarose gel and the target DNA-band was extracted from the gel using the Qiagen Gel Extraction Kit II according to the manufacturer's instructions.

The combined cell-free transcription and translation system Puresystem Classic II was used for the production of ternary complexes. 500 ng purified PCR product in 20 μl buffer were assembled with 60 µl Solution A, 24 µl Solution B and 16 µl H₂O to a total volume of 120 µl. The translation mixture was incubated at 37° C. at 550 rpm for 30 min. The translation was stopped by adding 500 µL ice cold stop-buffer (50 mM Tris; pH 7.5 (6° C.) adjusted with AcOH, 150 mM NaCl, 50 mM magnesiumacetate, 33 mM KCl, 4 mM GSSG, 10% BSA blocker solution (Pierce), 5 µg/ml t-RNA, 0.05% TWEEN 20). The stopped translation mixture was centrifuged at 1° C. for 15 min at 10000 g. The supernatant was transferred into a fresh vial. 25 µL of a protein A coated magnetic bead suspension were transferred into 500 µl washing buffer (50 mM Tris; pH 7.5 (6° C.) adjusted with acetic acid, 150 mM NaCl. 50 mM magnesium acetate, 33 mM KCl, 10% BSA blocker solution (Pierce), 5 µg/ml t-RNA, 0.05% TWEEN 20). The beads were carefully mixed and magnetically precipitated. The washing buffer was removed. This step was repeated 4-times. Finally the beads were resuspended in 25 µl washing buffer. The stopped supernatant of the translation mix was transferred to the prepared bead suspension for the pre-panning step. The mixture was incubated at 4° C. with end-over-end rotation for 30 min and centrifuged at 10000 g at 1° C. for 10 min. The supernatant was transferred into a new BSA-blocked 2 mL Eppendorf tube. 20 µl of 150 nM anti-hairpin peptide binding monoclonal antibody were added into 300 µL of the pre-panned translation mix and were incubated at 4° C. with end-over-end rotation for 30 min. 10 µL of the washed magnetic beads solution were then added and were incubated at 4° C. with end-over-end rotation for 20 min. To capture the antibody target bound to the ternary complexes, the paramagnetic beads were magnetically precipitated and the supernatant was removed. The beads were washed 5-times with 500 µl washing buffer. In the last washing step the bead containing solution was transferred into a fresh BSA-blocked 2 mL Eppendorf tube, the beads were magnetically focused and the supernatant was removed. 100 µL ice cold Elution Buffer (50 mM Tris; pH 7.5 (6° C.) adjusted with AcOH, 150 mM NaCl, 20 mM EDTA, 50 µl Molecular Biology grade BSA (Roche Diagnostics, Mannheim, Germany), 5000 units rRNA; 25 µg/ml tRNA) were added and incubated for 10 min. The mixture was centrifuged at 10000 g at 1° C. in a table top centrifuge for 10 min. Isolation and Purification of mRNA from the ternary complexes was done by using the Qiagen RNeasy MinElute Cleanup Kit 50 as recommended by the supplier. 12 µL of the eluted mRNA sample were diluted with 38 µL RNase-free water to a total volume of 50 µL. Potential residual ribosome display template DNA was removed by using the Ambion DNA-free Kit as recommended by the supplier. For the reverse transcription of the mRNA, the Transcriptor (Roche) kit was used. For a single reaction 4 µl 5×RT-Puffer were pipetted together with 1 µl dNTP-Mix (Roche), 0.25 µl 100 µM Primer Rrt, 0.5 µl RNAsin (200 U/µl), 1.75 µl H₂O, 12 µl mRNA sample. The mix was incubated for 45 min at 65° C. 12 µl from the RT reaction were transferred to the first PCR amplification reaction. 74 µl H₂O, 10 µl 10×PWO PCR buffer (Roche), 2 µl dNTP mix (Roche) 0.25 µl 100 µM Primer Frt and Rrt each, 2.5 units PWO Polymerase (100 units stock, Roche Diagnostics, Mannheim, Germany). The PCR profile was as follows: 5 min 95° C., (2 min 94° C., 45 sec 57° C., 60 sec 72° C.)×25, 5 min 72° C., ∞ 4° C. The PCR products were resolved in a 2.5% NuSieve Agarose. The target DNA-band was extracted at 576 bp from the gel using the Qiagen Gel Extraction Kit II according to the manufacturer's instructions. 12 µl of the purified DNA were spectrophotometrically quantified. A second PCR step was performed to reamplify the construct to attach the T7 promotor encoding sequence and to produce enough ribosome display suitable DNA fragments for further cycles. The second PCR was as follows: 74 µl H₂O, 10 µl 10×PWO PCR buffer (Roche Diagnostics, Mannheim, Germany), 2 µl dNTP mix (Roche) 0.25 µl of 100 µM Primer F1A and R1A each, 2.5 units PWO Polymerase (100 units stock, Roche Diagnostics, Mannheim, Germany). The PCR profile was as follows: 5 min 95° C., (2 min 94° C., 45 sec 57° C., 60 sec 72° C.)×25, 5 min 72° C., ∞4° C. The PCR product was resolved in a 2.5% NuSieve Agarose. The target DNA-band was extracted at 622 bp from the gel using the Qiagen Gel Extraction Kit II according to the manufacturer's instructions. The purified DNA was spectrophotometrically quantified.

In the process diverse controls showed the success and the quality of the process. As one control pertuzumab was displayed on the surface of the protein A-coated paramagnetic particles instead of the peptide hairpin binding antibody. Another control was to add 12 µl sample from of the DNA digestion step (Ambion kit) into the first amplification PCR, by omitting the reverse transcription step. No DNA band should be obtained, indicating that the initial DNA template was completely removed.

Figure 3:
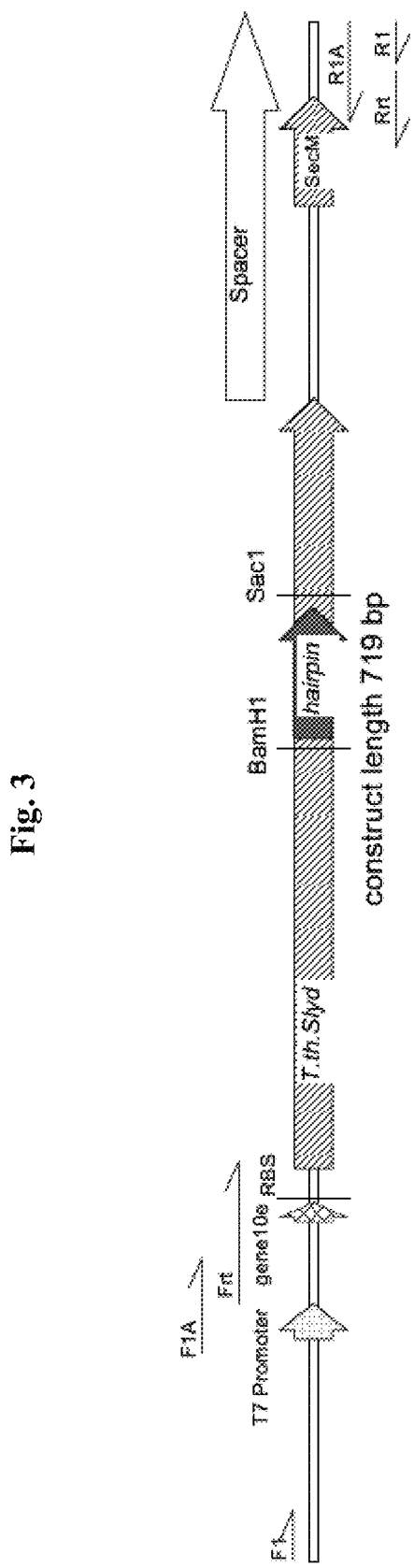
Figure 4:
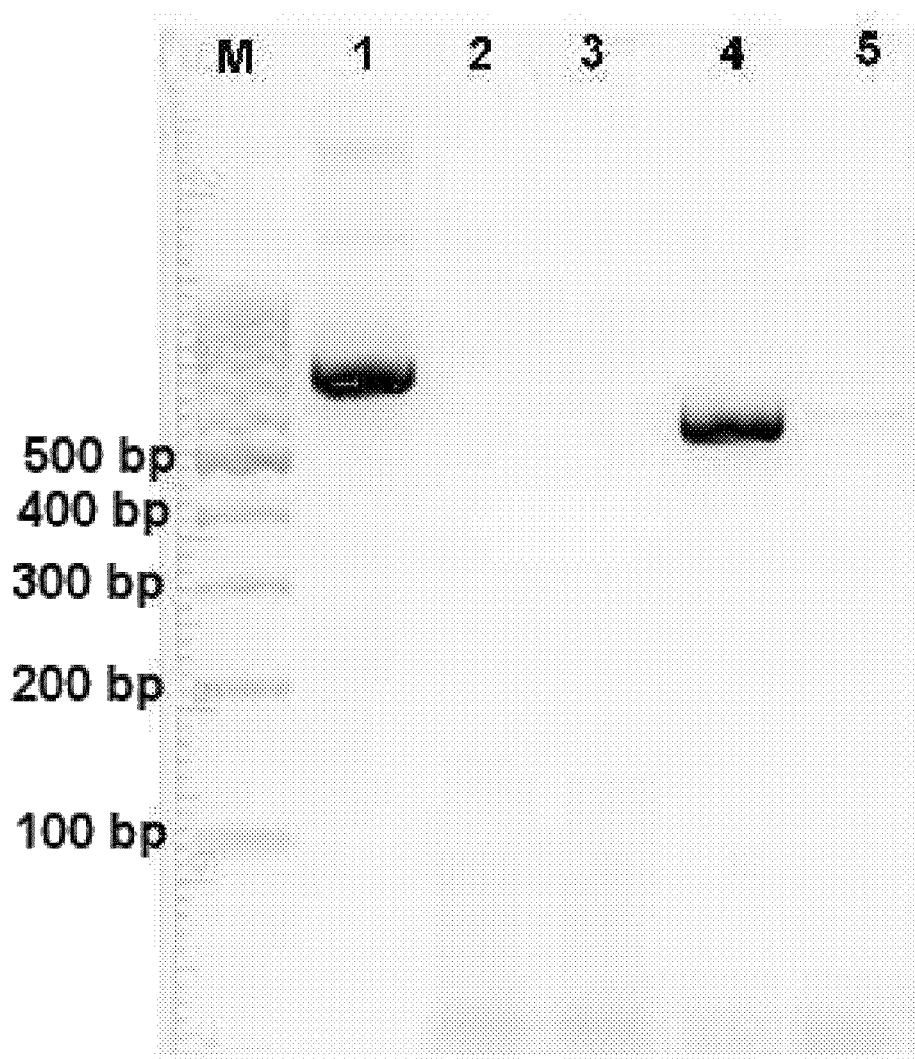

Results are depicted in FIG. 4.

EXAMPLE 4

Production of a Ribosome Display Suitable Library

The library produced as described in Example 1 was used. The chemically synthesized DNA library template was amplified by PCR as follows:

100 µL PCR volume containing 0.2 mM dNTPs (10 mM stock, dNTPmix, Roche Diagnostics, Mannheim, Germany), 2.5 units PWO Polymerase (100 units stock, Roche Diagnostics, Mannheim, Germany), 0.25 µM Primer lib1 (5'-CGTCACACGACAGTGTGGCGCAGGATCC-3'; SEQ ID NO:29); 0.25 µM Primer lib2 (5'-CGTCACAAGC-TACGTCTCCTGCGAGCTCCC-3'; SEQ ID NO:30); 1x PWO PCR buffer (Roche) and 25 ng of the library DNA template (5'-CGACAGTGTGGCGCAGGATCC nnnnnnnnnnnnnnnnnnnnnnnnnnnnnnnnnn nGG-GAGCTCGCAGGAGACGTAGC-3'; SEQ ID NO:31). Ten parallel PCRs were combined to produce a theoretical diversity of 5×1012 different library molecules. The PCR profile was as follows: 5 min 95° C., (2 min 95° C., 45 sec 49° C., 45 sec 72° C.)×25, 5 min 72° C., ∞4° C.

The PCR products were resolved in a 3% GelRed (Biotium) stained agarose gel. The target DNA-bands were extracted at 97 bp from the gel using the Qiagen Gel Extraction Kit II according to the manufacturer's instructions.

Both, the above generated library fragment and the vector containing the ribosome display construct, were double digested as follows: One reaction contained 400 ng of the library DNA fragment, 1 µL each of the restriction enzymes BamHI-HF and SacI-HF (both NEB), 0.5 µL BSA and 5 µL 10×NEB4 buffer. The vector digestion reaction contained 1.28 µg vector (T7Pg10e_ttH3caspMA-T), 1.25 µL each of the restriction enzymes BamHI-HF and SacI-HF, 0.5 µL BSA and 5 µL 10×NEB4 buffer. Both reactions were carried out seven fold in parallel and incubated overnight at 37° C. at 400 rpm. The digestion products were resolved in a 3% GelRed (Biotium) stained agarose gel for the library fragment and a 1% GelRed (Biotium)-stained agarose gel for the cut vector. The library fragment DNA-band was extracted at 51 bp from the gel using the Qiagen Gel Extraction Kit II according to the manufacturer's instructions. The cut vector DNA-band was extracted from the agarose gel using the Qiagen Gel Extraction Kit II according to the manufacturer's instructions.

In order to produce the ribosome display construct, the digested library fragment was inserted into the cut vector in a ligation reaction as follows: The ligation was carried out in a total volume of 40 µL with 93 ng of cut and purified library fragment, 11 ng of cut and purified vector, 20 µL 2× Quick Ligase buffer (Stratagene) and 2 units of Quick Ligase (Stratagene). The reaction was carried out tenfold at room temperature for one hour. The ligations were pooled and purified with the Qiagen Extraction kit yielding 200 ng of ligation product.

The linear assembled library DNA-template, providing the starting point for the coupled transcription and translation, was generated by PCR with the following setup:

In total, six 50 µL PCR reactions produced 1.62 µg of the linear ribosome display construct. Each reaction contained: 20 ng of ligation product as template, 5 µL 10× reaction buffer (Roche), 0.4 mM dNTPs (Roche) and 0.5 mM of each primer F1 (5'-GGTGATGTCGGCGATATAGGCGC-3'; SEQ ID NO:32) and R1 (5'-CCCCAGCC-TATGCGGGGTT-3'; SEQ ID NO:33). The PCR profile was as follows: 5 min 94° C., (2 min 94° C., 45 sec 57° C., 45 sec 72° C.)×25, 5 min 72° C., ∞4° C. The PCR products were resolved in a 1.5% GelRed (Biotium) stained agarose gel. The target DNA-band was extracted at 698 bp from the gel using the Qiagen Gel Extraction Kit according to the manufacturer's instructions.

For each target of the selection round 520 ng of linear library-DNA template was used for coupled transcription/translation with the PURE System (Ueda T. et al. Methods Mol. Biol. 607 (2010) 219-225). This equals a theoretical diversity of $1.4 \times 10^{12}$ molecules.

The ribosome display suitable *Thermus thermophilus* SlyD-FKBP construct has the following sequence:

```
                                              (SEQ ID NO: 34)
5'-GGTGATGTCGGCGATATAGGCGCCAGCAACCGCACCTGTGGCGC

CGGTGATGCCGGCCACGATGCGTCCGGCGTAGAGGATCGTGATCTCGATC

CCGCGAAATTAATACGACTCACTATAGGGAGACCACAACGGTTTCCCTCT

AGAAATAATTTTGTTTAACTTTAAGAAGGAGATATACATATGAAAGTGGG

CCAGGATAAAGTTGTCACCATTCGCTATACCCTGCAGGTTGAAGGTGAAG

TGCTGGATCAGGGCGAACTCAGCTATTTACATGGTCACCGCAACCTGATT

CCGGGCCTGGAGGAAGCGCTGGAAGGTCGCGAGGAAGGCGAAGCATTTCA

GGCGCATGTGCCGGCAGAGAAAGCGTATGGCGCCGGATCCNNNNNNNNNNN

NNNNNNNNNNNNNNNNNNNNNNNNNNNGGGAGCTCCGGCAAAGATTTA

GATTTTCAGGTGGAAGTGGTTAAAGTGCGCGAAGCAACCCCGGAGGAACT

GTTACATGGCCACGCGGGCGCTGGCTCTGGAGCTGGTGCAGGCTCTGGTG

CTGGCGCAGGTTCTCCAGCAGCGGTGCCGGCAGCAGTTCCTGCTGCGGTG

GGCGAAGGCGAGGGAGAGTTCAGTACGCCAGTTTGGATCTCGCAGGCACA

GGGCATCCGTGCTGGTCCTCAGAGGCTTTCCAACCCCCAGCCTATGCGGG

GGTT-3'
```

N each indicates one of the 39 defined library nucleobases.

EXAMPLE 5

Confirming the Library Diversity by a High-Throughput Sequencing Approach

The library diversity of the final ribosome display-suitable library construct was investigated using a 454 GS FLY+ Instrument. A deep sequencing approach was performed according to the rapid library preparation method manual (October2009, rev. January 2010) for the GS FLX Titanium Series using the GS FLX+Series–XL+Kit (May 2011).

228210 sequence reads were evaluated. Each showed long enough reading length, so that the library insertion motif could be evaluated. From 228210 successful reads, 196725 reads were found as unique sequences, 24983 sequences occurred twice, 5213 sequences occurred three times, 1365 sequences occurred four times, 346 sequences occurred five times, 116 sequences occurred six times, 35 sequences occurred seven times, 17 sequences occurred eight times, 3 sequences occurred nine times, 1 sequence occurred 10 times, 3 sequences occurred 11 times, 2 sequences occurred 12 times, 1 sequence occurred 16 times. Since the library fragment was PCR amplified prior to its ligation into the vector construct it is supposed, that the sequence duplicates and multiple copies might also derive from the PCR amplification process. From 228210 reads, 196725 were found unique, which is 86% of the working library. For each new target selection round 520 ng of linear library-DNA template was used, which equals a theoretical diversity of $1.4 \times 10^{12}$ molecules. The practical library diversity can be estimated as $1.4 \times 10^{12} \times 0.86 = 1.2 \times 10^{12}$ molecules. The conclusion of having $1.0 \times 10^{12}$ functional library members is a legal estimate.

Figure 5:
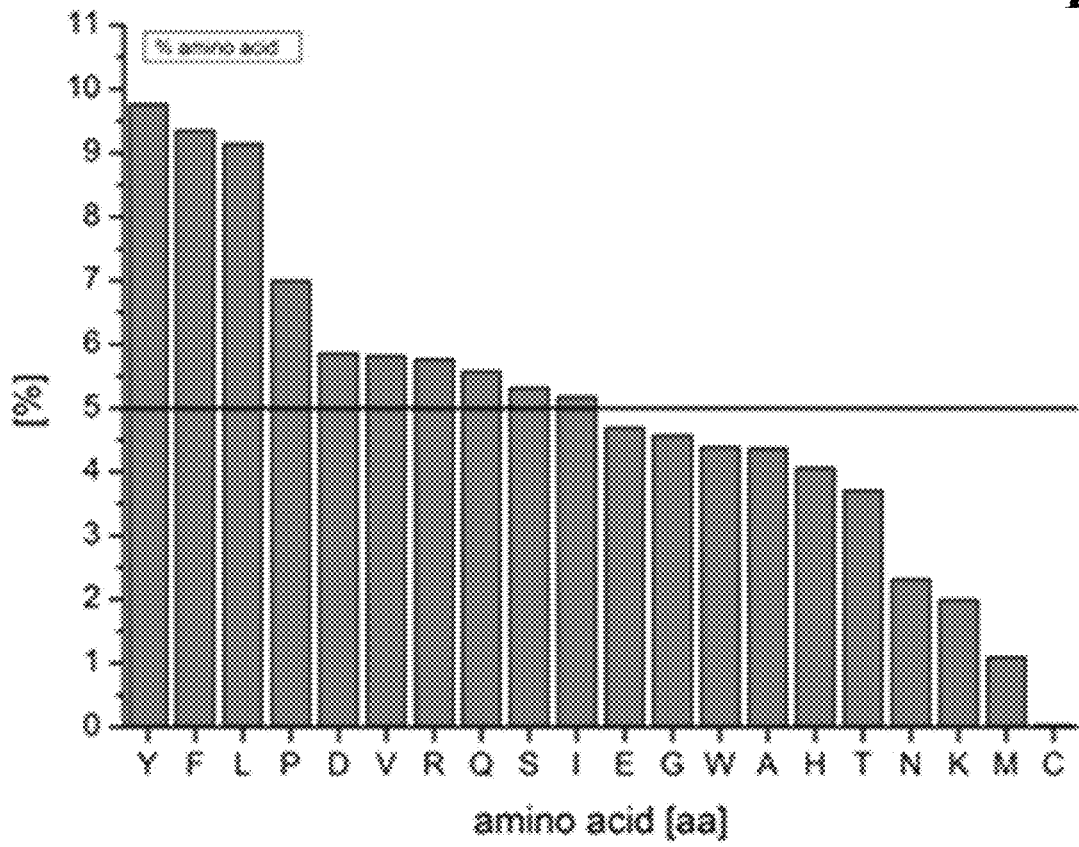
FIG. 5 Amino Acid frequency obtained from the high-throughput sequencing approach of 228210 full length reads. The black line indicates the amino acid's theoretical equal distribution.

The results are also depicted in FIG. 5.

The amino acid composition of 228210 full length reads reflect the design of the library fragment. On the amino acid translational level all 228210 reads are 13 aa in length and are all correctly flanked by the motifs Nt-GAGS-Ct and Nt-GSSG-Ct.

No stop codons were found. As intended the amino acids Y, F and L are overrepresented. Methionine (1.09%) cysteine (0.03%), and lysine (1.99%) are underrepresented, as intended. Due to the usage of trinucleotide phosphoramidite chemistry, frame shifts were in an insignificant range.

EXAMPLE 6

Ribosome Display Selection on TNFα as a Target

According to the herein described ribosome display (e.g. analogous to Example 3) three rounds of selection with increasing washing stringency were performed on TNFα as a target. This was done in the presence or absence of TWEEN 20. Here the selection in the presence of TWEEN is described. Untagged, human recombinant TNFα from HEK293 cells (Roche) was chemically biotinylated using EDC/NHS chemistry as it is done by a person skilled in the art. The biotinylation stoichiometry was 1:6, TNFα: bi-DDS biotinylation reagent. The final concentration of TNFα was 0.44 mg/ml in 50 mM $NaH_2PO_4$, 150 mM NaCl, 6% saccharose, pH 6.0. Binding of biotinylated TNFα was confirmed by a BIACORE™ SPR experiment, where the binding of bi-DDS-TNFα to a streptavidin coated BIACORE™ SA sensor was confirmed. For the first selection round, 520 ng of 719 bp linear library-DNA template was transferred into the coupled cell-free transcription and translation system.

The reaction was stopped with ice cold stopping buffer and centrifuged as described. Prepanning of the ternary complexes with magnetic beads was similar for all three display rounds, with the exception of bead types. The first and second cycle was prepanned with 25 µl streptavidin coated bead solution, the third display round was preincubated with 25 µl protein G coated bead solution (Dynabeads, Invitrogen).

20 µl strepatavidin paramagnetic particles were transferred into a pre-blocked 2 mL Eppendorf tube and were washed five times with 500 µL bead wash buffer (0.1 M NaH$_2$PO$_4$ pH 8.0, 0.1% TWEEN 20) followed by three washes with washing buffer as described. After the final wash step, the beads were resuspended in 25 uL wash buffer.

The stopped translation mix was carefully added to the prepared bead suspension and incubated at 4° C. with end-over-end rotation for 30 min. Beads were collected and removed by centrifugation at 13000 rpm at 1° C. for 10 min and the pre-panned supernatant was transferred into a new blocked 2 mL Eppendorf tube.

To 300 µL of the pre-panned translation mix, biotinylated bi-DDS-TNFα was added in 20 µL buffer in order to reach a final TNFα concentration of 120 nM. The concentration of bi-DDS-TNFα was 0.44 mg/mL (8.6 µM) and therefore 4.5 µL were diluted in 15.5 µL washing buffer and then added into the 300 µL of stopped translation mix. Incubation at 4° C. with end-over-end rotation for 30 min. Ternary complexes bound to bi-DDS-TNFα were captured by addition of 10 µL washed paramagnetic streptavidin particles by 20 min incubation at 4° C. with end-over-end rotation.

This was done in identical ways for the first and the second display round. In the third round, the target concentration was reduced to 60 nM bi-DDS-TNFα.

Washing and Elution was done as described in the display protocol (5× quick 500 µL washing buffer washes), except in the third display round III, where the selection pressure was increased through more stringent washing. Here, after the first normal quick washing step, the second wash step included 5 min incubation time (end-over-end) and the third wash step 10 min incubation time, followed by two quick washing steps as usual (all with 500 µL of washing buffer).

For all bi-DDS-TNFα display cycles, mRNA elution with 100 µL elution buffer and subsequent RT-PCR steps were done in the same way as described above.

Figure 6:
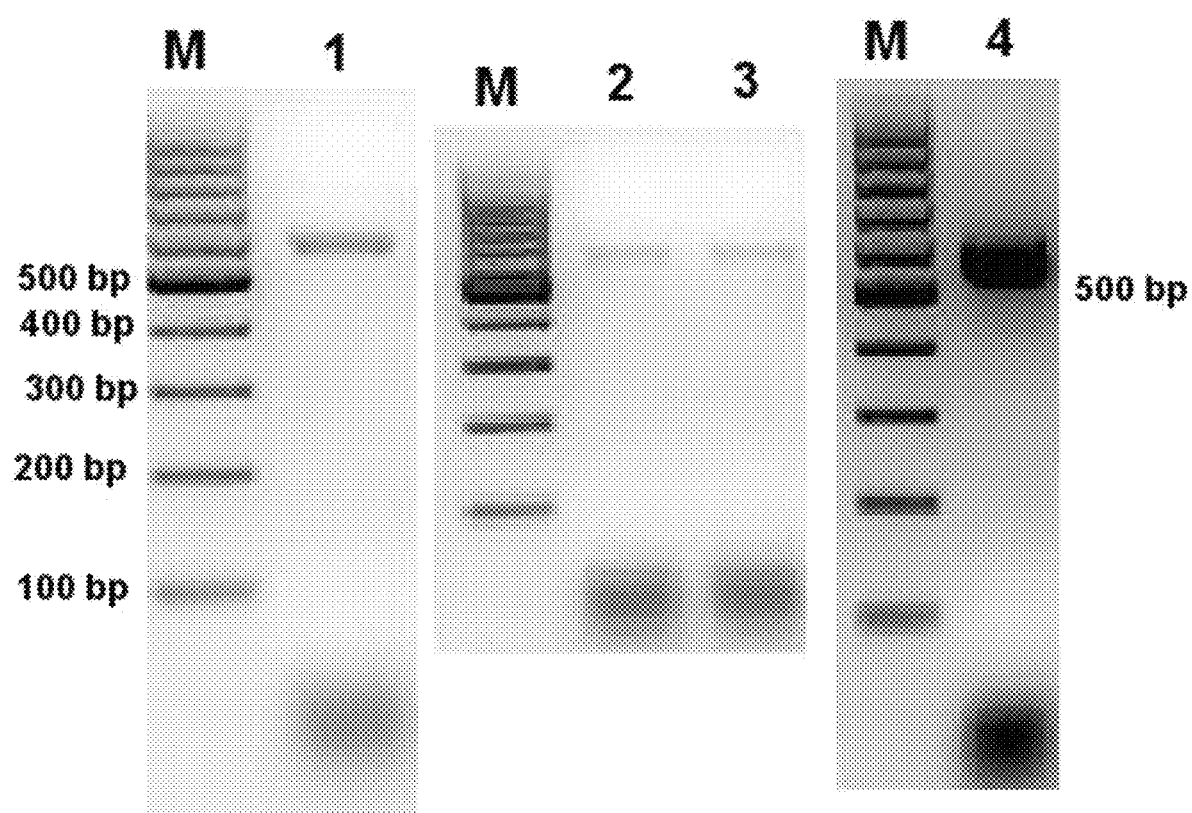
FIG. 6 Color-inverted agarose gels, showing the results of three ribosome display selection rounds versus bi-DDS-TNFα in the presence of detergent. M: 100 bp molecular weight marker. 1: First ribosome display cycle with distinct DNA fragment; 2/3: Samples of the second ribosome display cycle; 4: third ribosome display cycle. In each cycle a distinct DNA band appeared at 612 bp.

Results are also depicted in FIG. 6.

In order to introduce the selection pool DNA into the pQE80_ttSlyD expression vector, the vector and the RD dna pools were subjected to a double digestion with BamHI-HF and SacI-HF. Each target was simultaneously digested in two reactions and the vector in three. Each 50 µL target digest contained 1 µg DNA pool, 1.25 µL BamHI-HF, 1.25 µL SacI-HF, 5 µL 10×NEB 4 buffer, 0.75 µL BSA and 5.75 µL dH2O.

Each 50 µL vector digest contained 1.2 µg plasmid DNA, 1.25 µL BamHI-HF, 1.25 µL SacI-HF, 5 µL 10×NEB 4 buffer, 0.75 µL BSA and 35.75 µL dH2O.

The digestion reactions were incubated at 37 deg. C. for 3 h. The digested vector was purified and extracted from an agarose gel as described above. The digested selection pool DNA was purified via a 3% agarose gel and the corresponding band extracted with the Quiagen II extraction kit, due to the small size of the fragment.

The ligation was performed using the Quick Ligation Kit and contained in 15 µL total reaction volume 25 ng of digested vector DNA, 1.25 ng of digested selection pool DNA, 7.5 µL 2× Quick Ligase Buffer and dH2O. Incubation for 1 h at room temperature was followed by transformation of 10 µL into chemically competent E. coli DH5a cells and plated out on LB/Amp agar plates.

The 230 bp library DNA cassette from the third ribosome display cycle and the pQE80_ttSlyD expression vector DNA were both digested by BamH1 and SacI. Each 50 µL library DNA cassette digest contained 1 µg library DNA cassette, 1.25 µL BamHI-HF, 1.25 µL SacI-HF, 5 µL 10×NEB 4 buffer, 0.75 µL BSA and 5.75 µL dH2O. Each 50 µL vector digest contained 1.2 µg plasmid DNA, 1.25 µL BamHI-HF, 1.25 µL SacI-HF, 5 µL 10×NEB 4 buffer, 0.75 µL BSA and 35.75 µL dH2O.

The ligation was performed using the Quick Ligation Kit in 15 µL total reaction volume 25 ng of digested vector DNA, 1.25 ng of digested library DNA cassette, 7.5 µL 2× Quick Ligase Buffer and dH2O. Incubation for 1 h at room temperature was followed by transformation of 10 µL of the ligation mixture into chemically competent DH5a cells, plated on LB agar with ampicillin as selection marker and overnight incubation at 37° C.

The expression vector contained the nucleic acid sequence for the *Thermus thermophilus* SlyD-FKBP sequence, identical to the previous ribosome display construct, but c-terminally flanked with an Avitag (His)8 and stop codon sequences. By subcloning the library cassette fragment, the surrounding T.th. SlyD-FKBP sequence was thus restored, so that potential mutations on the amino acid level deriving from the screening process were readjusted to the wild type sequence.

*Thermus thermophilus* SlyD-FKBP sequence in the pQE80_ttSlyD expression vector:

```
                                         (SEQ ID NO: 35)
NH2-MRSKVGQDKVVTIRYTLQVEGEVLDQGELSYLHGHRNLIPGLEEAL

EGREEGEAFQAHVPAEKAYGAGSXXXXXXXXXXXXXXGSSGKDLDFQVEVV

KVREATPEELLHGHGGAAAGLNDIFEAQKIEWHEGSRKHHHHHH

HH-COOH
```

X indicates the variable sequence.

A 96 well deep well block with 1200 µL per well of LB/Amp medium, was inoculated with single *E. coli* colonies picked with a sterile pipette tip from the transformation plate. Sealed with a breathable foil and incubated at 37° C. at 250 rpm plate shaker overnight.

200 µL of each well were used to inoculate 1800 µL LB/Amp in a 96 deep well block incubated at 37° C. and 250 rpm for 2 h before induction of protein expression with 0.5 µM IPTG. After further incubation for 3 h at 37° C. and 250 rpm the blocks were centrifuged for 15 min at 3000×g and the supernatant was discarded.

To each well of the 96 deep well block, 50 µL of the lysis agent BPER II (Pierce) was added and incubated for 5 min at room temperature. The cells were resuspended and lysed by vigorous mixing. Finally, 950 µL KPi buffer pH 7.4/well was added, mixed and the cell debris pelleted by centrifugation for 15 min at 3000×g. The supernatant was investigated for the presence of solubly expressed *Thermus thermophilus* SlyD-FKBP polypeptide by SDS-PAGE.

A sample of 65 µL of the supernatant was mixed with 10 µL 10× reducing agent (Invitrogen) and 25 µL NuPAGE LDS sample buffer (4×) to a total sample volume of 100 µL.

The samples were incubated at 95° C. for 5 min and then centrifuged for additional 10 min at 10000 g. 10 µL of the supernatant per sample was loaded onto a 4-12% BisTris NUPAGE gel (Invitrogen) and electrophoresed at 150 V constant for 1 h. The gel was then stained and unstained according to the manufacturer's protocol. The protein standard was the Bio-Rad Precision Plus Protein Standard Dual Color (5 µL).

Figure 7:
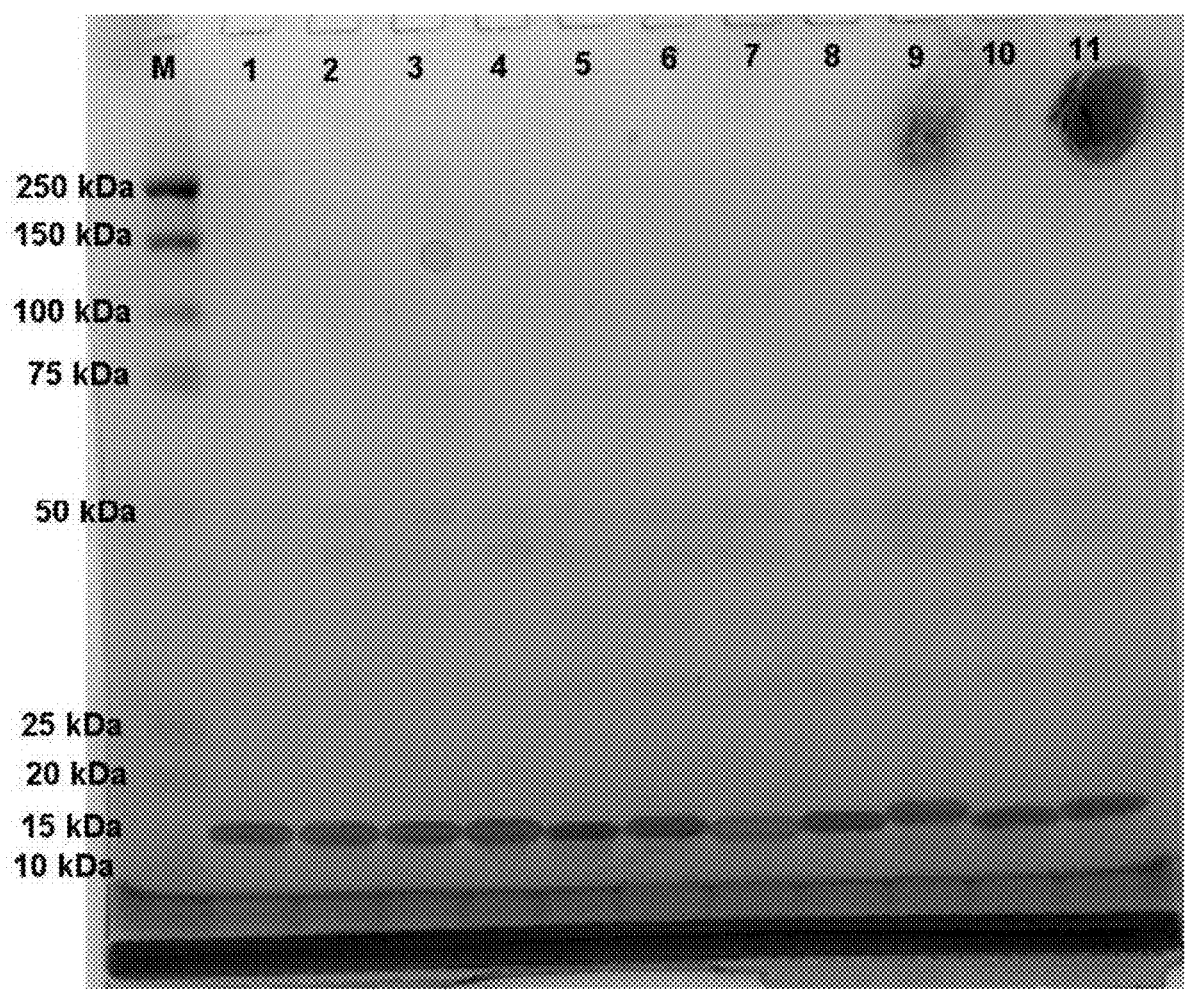
FIG. 7 Color-inverted SDS-PAGE. After recombinant mini-expression in 2 ml medium, E. coli lysate supernatants of arbitrarily picked E. coli colonies from the transformation plate were resolved in a SDS PAGE. M: Molecular weight standard. 1-4: Clones from the third display round versus TNFα. 5-11.

Exampled are also depicted in FIG. 7.

After DNA sequencing and translation into the respective amino acid code, clones from the third display round versus TNFα surprisingly produced an identical amino acid sequences like in the T10F7 mutant:

(SEQ ID NO: 36)
NH2-MRSKVGQDKVVTIRYTLQVEGEVLDQGELSYLHGHRNLIPGLEEAL

EGREEGEAFQAHVPAEKAYGAGSWKPHFNLHLLYLIGSSGKDLDFQVEVV

KVREATPEELLHGHAHGGAAAGLNDIFEAQKIEWHEGSRKHHHHHH

HH-COOH

The library cassette in these 4 clones has the sequence NH2-GAGS-WKPHFNLHLLYLI-GSSG-COOH. (SEQ ID NO:37)

In another sequencing approach, 31 sequences from the third display round versus TNFα were determined. 28 sequences (90%) were identical and showed a library cassette consensus motif identical to the motif above: NH2-GAGS-WKPHFNLHLLYLI-GSSG-COOH (SEQ ID NO:38). The remaining 3 sequences either showed a library cassette consensus motif: NH2-GAGS-TYYKIHVLWLIYV-GSSG-COOH (SEQ ID NO:39). Obviously the selection process was driven to a complete consensus formation in the third round of display.

EXAMPLE 7

BIACORE™ Binding Study of the TT10F7 T.t.SlyD-FKBP12

A BIACORE™ B3000 instrument (GE Healthcare) was used to kinetically assess the *Thermus thermophilus* SlyD-FKBP T10F7 clone with the consensus library sequence motif NH2-GAGS-WKPHFNLHLLYLI-GSSG-COOH (SEQ ID NO:40) for binding specificity for hrTNFα. A CM5 series sensor was mounted into the system and was normalized in HBS-ET buffer (10 mM HEPES pH 7.4, 150 mM NaCl, 3 mM EDTA, 0.005% w/v Tween 20) according to the manufacturer's instructions. The samples were diluted in the instrument's buffer. In another embodiment the buffer was HBS-E buffer (10 mM HEPES pH 7.4, 150 mM NaCl, 3 mM EDTA) and the samples were diluted in the detergent-free buffer. The system operated at 25° C. 10000 RU GAR-Fcγ (relative units of Fcγ-fragment binding, polyclonal goat anti-Rabbit IgG/Jackson Laboratories) were immobilized according to the manufacturer's instructions using EDC/NHS chemistry on all 4 flow cells. The sensor is finally deactivated using 1M ethanolamine.

The binding activity of the T10F7 *Thermus thermophilus* SlyD-FKBP T10F7 clone versus the target TNFα was kinetically tested. A monoclonal rabbit anti-*Thermus thermophilus* SlyD core protein (0612pS3A8) binding antibody, was captured in all flow cells by a 6 min injection at 5 μl/min. *Thermus thermophilus* SlyD-FKBP TT10F7 from a 2 ml *E. coli* deep well block mini-expression were captured directly from the *E. coli* lysate on the flow cells 2, 3 and 4. Flow cell 1 served as a reference. Another *Thermus thermophilus* SlyD-FKBP clone C10B9 (NH2-GAGS-YYVLITDNLVYFG-GSSG-COOH; (SEQ ID NO:41)), which was formerly evolved with a binding specificity for a different target than TNFα served as a non-binding control. The *Thermus thermophilus* SlyD-FKBP clones were specifically captured on the sensor by a 2 min injection at 30 μl/min directly from a 1:25 diluted 10000 g-centrifuged *E. coli* lysate supernatant.

The flow rate was set to 100 μl/min. Fully intact trimeric TNFα (P/11102/661/177, Scil Proteins) was injected at different concentration steps diluted in the sample buffers described above at 0 nM, 333 nM and 1 μM for 2 min. Streptavidin (11897000, Roche) was injected as a non-interaction control at 1 μM. The dissociation was monitored for 5 minutes.

Acidic regeneration of the sensor surface was achieved using a single injection of 10 mM glycine pH 1.5 at 20 μl/min for 30 sec, followed by two consecutive injections of 10 mM glycine pH 1.7 at 20 μl/min for 30 sec. Regeneration was complete.

Figure 10:
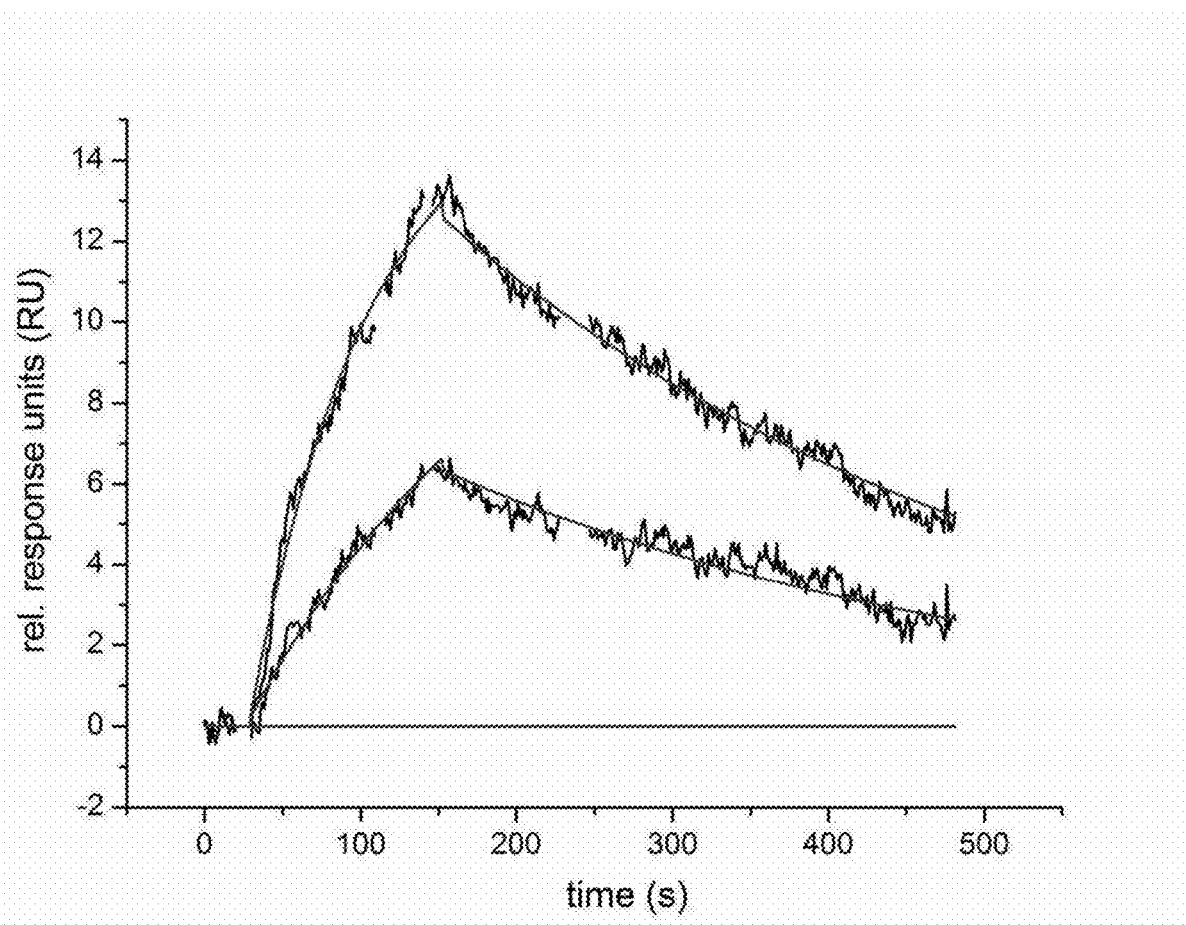

Results are also depicted in FIG. 9, FIG. 10 and FIG. 11.

The BIACORE™ binding assay showed concentration dependent binding of TNFα as analyte in solution versus the surface antibody-displayed TT10F7 mutant in the presence and absence of TWEEN 20. Since TNFα was displayed as chemically biotinylated target protein on streptavidin coated paramagnetic particles, it was necessary to investigate potential streptavidin crossreactive binding. No binding to T10F7 could be detected at 1 μM streptavidin as analyte in solution. Furthermore, it was confirmed, that TNFα did not bind to another, target unrelated *Thermus thermophilus* SlyD-FKBP C10B9 mutant. No binding could be detected versus the C10B9 mutant at 1 μM TNFα analyte concentration. Therefore, the binding of the first generation *Thermus thermophilus* SlyD-FKBP T10F7 to TNFα is specific. The concentration-dependent TNFα binding signals were fitted according to a Langmuir model to calculate the kinetic affinity.

The display for the selection of the mutant TT10F7 was performed in a buffer system containing the detergent TWEEN 20. It is well known, that TWEEN 20 can induce structural changes or the fast dissociation of TNFα (Steiner, D., et al. J Mol Biol 382 (2008) 1211-1227; Hoffmann, A., et al. PLoS One 7 (2012) e31298) into its monomers. The BIACORE™ assay was driven in the presence and absence of TWEEN 20 in order to investigate whether the binder has a preference versus a trimeric or monomeric form of TNFα. The freshly prepared trimeric form was bound with 258 nM avidity in a 3:1 stoichiometry. In the presence of the detergent TWEEN 20 the avidity was the same. Therefore, it is assumed, that trimeric and intact TNFα is being recognized by the TT10F7 mutant.

For a TNFα monomeric binding polypeptide, based on a binding domain region of only 13 amino acids in length, an affinity in the micromolar range is reasonable.

Here also larger loops are conceivable as well as library architectures, which combine more loops, e.g. by secondary structure motifs, which can enforce the formation of two or more loops.

EXAMPLE 8

Storage Stability of Mutants in *E. coli* Lysate

A question is whether the *Thermus thermophilus* SlyD-FKBP mutant polypeptides are stable and robust enough for their use as artificial binders. In another experiment, mutants from the third rounds of different display approaches were expressed in *E. coli*. The cells were lysed as described and the supernatants of the crude cell extracts were stored for four weeks at 4° C. and were subsequently incubated at 37° C. for 48h. No protease inhibitors were had been supplemented.

Results are also depicted in FIG. 12.

EXAMPLE 9

Ribosome Display Versus TNFα without Tween

Another ribosome display experiment was driven for three cycles versus TNFα in the same way as already described, but with the only exception, that TWEEN 20 was omitted in all ribosome display relevant buffer systems.

Results are also depicted in FIG. 13 and FIG. 14.

To identify binders versus potentially intact TNFα the display was also done by omitting TWEEN 20. The agarose gels show, that omitting TWEEN 20 was possible and gave distinct DNA bands at 612 bp. From the third round of display, after subcloning, 16 clones were arbitrarily picked from the transformation plate. The plasmid DNA was propagated and sequenced, as done by a person skilled in the art. The outcome differs from the selection in the presence of TWEEN 20. The sequence diversity was higher than in the experiment using TWEEN 20.

To identify binders versus potentially intact TNFα the display was also done by omitting TWEEN 20. The agarose gels show, that omitting TWEEN 20 was possible and gave distinct DNA bands at 612 bp. From the third round of display, after subcloning, 16 clones were arbitrarily picked from the transformation plate. The plasmid DNA was propagated and sequenced, as done by a person skilled in the art. The outcome differs from the selection in the presence of TWEEN 20. The sequence diversity was higher than in the experiment using TWEEN 20.

The selection pressure in the presence of detergent was more stringent and a consensus developed already in the third cycle. The selection pressure in the absence of detergent was not so stringent but showed 2 replicate sequences in the sequenced pool.

As depicted in FIG. 14, EFAJG and EVI0J, as well as ELU74 and D4TTN are identical. The remaining sequences were unique. It can be assumed, that more display cycles would be necessary to develop a consensus formation like in the experiment using the detergent TWEEN 20.

The mutant TT10F7, didn't occur in the sequenced pool omitting the detergent. This reflects the different selection conditions in the detergent-free display.

EXAMPLE 10

Ribosome Display Specificity Control Experiment

An important feature of a functionally working ribosome display process is to show, that the target selection can be competed with a surplus of its free target in solution.

This proofs the presence of specific target binders in the mixture. Usually, this can be shown in a more advanced display cycle, e.g. in the third display round. When doing so, the DNA yield after the RT-PCS step should be considerably less, when compared with the non-competed selection cycle.

In the following example a ribosome display selection was done for three rounds versus a human monoclonal antibody. The display was done like described. 120 nM human IgG were incubated in solution in the stopped translation mixture for 30 min at 4°. Protein A coated paramagnetic particles were used to capture the IgG, and thus the bound ternary complexes sticking to it, to the bead surface.

In that way two cycles were performed. In the third display cycle another experimental setup was conducted. A prepanning step was done with 1 µM human IgG. The beads were again focused and the supernatant was reused in a second panning experiment as described above using the same human IgG presented at 120 nM. The agarose gel above clearly shows a reduction in the DNA-band intensity when the prepanning step has been applied thus is indicating the IgG-specificity of the already enriched binders in the third display round.

Summary of Display Experiments

For the first time, it could be shown, that *Thermus thermophilus* S/yD-FKBP is a robust display scaffold for the presentation of a large and diverse peptide-loop presenting library.

The loop motif is grafted at a site, where the N-terminus and the C-terminus of the rigid FKBP—IF interdomain connection is approximately 4.5 angstrom apart from each other, which is in the range of the atomic distance of a disulfide bond. Thus, the FKBP domain clamps the loop-peptide in a pseudo-restrained conformation. The FKBP domain is in such way a surrogate for a disulfide bond constrainment. Since the scaffold is free of cysteines the presentation and difficulties in the display of cyclic constrained peptides is solved.

The system was successfully tested in an experiment, in which a Her-3 hairpin-domain motif was grafted into the *Thermus thermophilus* SlyD-FKBP domain. The construct was ribosomally displayed versus a Her-3 hairpin-binding monoclonal antibody, whereby binding specificity and general suitability for the ribosome display process were proven.

A display library was designed according to the knowledge about the amino acid composition in protein-peptide interaction hotspots. Additionally, typical lengths of human CDR-H3 sequences and their amino acid composition was considered. The library was adapted to the specific requirements of display technologies, e.g Cys residues were completely omitted.

All these considerations led to the design of a 13-mer loop-library. The 13-mer DNA library cassette was produced using trinucleotide chemistry. Using a deep sequencing approach the final *Thermus thermophilus* SlyD-FKBP library members were calculated to be in the range of $1.0 \times 10^{12}$ functional members.

The library was used in ribosome display panning procedures versus different targets, whereas the mutant T710F7, coming from a third ribosome display cycle versus human recombinant TNFα, showed concentration-dependent and target specific binding.

All of the isolated mutants were expressed in high amount soluble in *E. coli*. They were all thermodynamic stable.

The display system produces *Thermus thermophilus* SlyD-FKBP mutants with predetermined binding specificities versus different targets in the range of the expected affinities for such a library approach.

EXAMPLE 11

SlyD/FKB12-Antigen Scaffold Assisted Production of Antd-ERCC1 Antibodies

Immunization 8-12 weeks old SJL mice, were subjected to intraperitoneal immunization with 100 µg of a KHL-coupled ERCC1 derived peptide covering the amino acids 219-245 of human ERCC1 (Excision Repair Cross Complementing). ERCC1 derivatives were produced synthetically by peptide synthesis.

The mice were immunized 3 times (initial and 6 weeks and 10 weeks after the initial boost). The first immunization was performed using complete Freud's adjuvant, the second and third immunization was done using incomplete Freud's adjuvant. The final boost was done i.v. using 100 µg of KLH-coupled peptide antigen three days before the hybridoma fusion took place. The production of hybridoma primary cultures was done according to Kohler and Milstein (Kohler, G. and Milstein, C., Nature 256 (1975) 495-497). The hybridomas were isolated into 96-well MTPs by limiting dilution and screened for antigen binding by means of ELISA. ELISA was driven by a Tecan Sunrise running under Firmware: V 3.15 19/03/01; XREAD PLUS Version: V 4.20. Primary hybridoma cell cultures, which showed a positive color formation upon binding versus a biotinylated ERCC1 derived peptide covering the amino acids 219-245 in ELISA, were transferred into the kinetic screening process as described herein.

In order to avoid the selection of IHC unsuitable, just linear peptide binding antibodies, further screening efforts were performed using a scaffold-based approach. The scaffold approach further deselected antibodies, which bound the immunogenic peptide at its termini.

Production of SlyD/FKBP12-ERCC1

A Synthetic gene encoding SlyD/FKBP12-ERCC1 and SlyD/FKBP12-ctrl was purchased from Sloning Biotechnology GmbH (Germany) and was cloned into a pQE80L expression vector. The polypeptides were produced as *E. coli* codon optimized gene constructs in *E. coli* BL21 CodonPlus-RP (see FIGS. 16 and 17).

For the purification of the crude chimeric polypeptides an affinity chromatography step was used under denaturing conditions in the presence of chaotropic agents. For chimeric polypeptide comprising the SlyD part purification in the presence of chaotropic agents is especially used as the total amount of chimeric polypeptide could be isolated from the *E. coli* cells. Additionally the entire chimeric polypeptide was obtained in a random coil conformation. The chimeric polypeptide still bound to the affinity chromatography material was transferred into native conditions by washing the column with a physiological salt solution. Due to the spontaneous folding of the SlyD and FKBP12 parts of the chimeric polypeptide also the inserted amino acid sequence can be transferred to its native conformation. The refolded chimeric polypeptide was recovered with an imidazole gradient in a physiological buffer from the affinity chromatography column. An SDS gel and Western blot of the SlyD/FKBP12-ERCC1 chimeric polypeptide is shown in FIG. 16. The <His6>-Western blot shows the C-terminal integrity of the chimeric polypeptide. No other polypeptide bands are detectable.

Fluorescence Measurements

The affinity purified chimeric polypeptide was dialyzed versus 75 mM HEPES buffer (pH 7.5, 150 mM NaCl, 6.5% (w/v) sucrose, 10 mM cysteine) and filtrated. SlyD/FKBP12-ERCC1 was UV/Vis spectroscopically quantified at 7.4 mg/ml using the calculated extinction coefficient for the 35380.301 Da polypeptide (FIG. 18). In the wavelength screen from 220 nm to 340 nm a 280 nm absorption peak deriving from the single FKBP12 Trp was obtained. No 340 nm absorption could be detected.

Protein fluorescence measurements were used to test the conformational nature of SlyD/FKBP12-ERCC1. FKBP12 C22A as a carrier for polypeptide insertions is especially useful, because the single FKBP12 Trp moiety can be used to diagnose the structural integrity of the FKBP12 moiety (Scholz, C., et al., J. Biol. Chem. 271 (1996) 12703-12707; Russo, A. T., et al., J. Mol. Biol. 330 (2003) 851-866). FKBP12 C22A in its native structure shows a single fluorescence emission peak at 320 nm (Zoldak, G., et al., J. Mol. Biol. 386 (2009) 1138-1152).

250 µl of 2.5 mg/ml SlyD/FKBP12-ERCC1 in HBS-E-buffer (pH 7.4) were analyzed at different temperatures. A Cary Eclipse instrument under the Scan Software Version: 1.1(132) was used at 5 nm band width for excitation and emission. A wavelength scan from 300 nm-600 nm was driven at 600 nm/min. The excitation of the intrinsic tryptophan fluorescence was set to 294 nm. A broad peak at 350 nm was obtained (FIG. 18). According to theory the intrinsic Trp solvatochromic fluorescence emission at 350 nm would be strongly quenched in a folded FKBP12 protein environment, whereas it increases with the unfolding of FKBP12. A temperature screen from 25° C. to 85° C. didn't show any further fluorescence emission peaks, but a temperature-dependent fluorescence quenching of the 350 nm emission. The 320 nm emission, an indicator for structural integrity of FKBP12, could not be detected.

Therefore, the single Trp residue in the SlyD/FKBP12-ERCC1 chimeric polypeptide is exposed to the solvent already at 25° C., indicating that the chimeric FKBP12 in the SlyD-FKBP12 context is partially or completely unfolded.

Therefore, the scaffold is an ideal platform for mimicking and presenting a structural plurality of non-stable peptide conformations as they typically occur in paraffin-embedded, formalin-fixed tissue during immune histochemical experiments. (Abe, M., et al., Anal. Biochem. 318 (2003) 118-123).

FK506 BIACORE™ Binding Assay

A BIACORE™ 3000 instrument under control of the software version V4.1 was mounted with a sensor SAchip according to the manufacturer's instruction. As running buffer a HBS-EP buffer was used (10 mM HEPES, pH 7.4, 150 mM NaCl, 1 mM EDTA, 0.05% (w/v) P20 (10% aqueous solution of the non-ionic surfactant Polysorbate 20 (Tween 20)). 1213 RU of bi-linker-FK506 conjugate (Roche Diagnostics Mannheim, Germany) were captured on flow cell 4.

300 nM purified SlyD/FKBP12-ERCC1 chimeric polypeptide and 300 nM SlyD/FKBP12 control polypeptide were injected into the system at 30 µl/min for 3 min. association time and 3 min. dissociation time The sensor was regenerated by injecting a 10 mM glycine-HCl solution (pH 1.7) for 2 min. at a flow rate of 30 µl/min.

The BIACORE™ binding assay with 300 nM chimeric polypeptide SlyD/FKBP12-ERCC1 as analyte in solution vs. the sensor surface presented ligand bi-FK506 (FIG. 19) showed no binding activity (FIG. 20), indicating a structure-functional loss of the FKBP12 moiety in the chimeric polypeptide. The control polypeptide FKBP12 (C22A) showed binding activity.

The inability of the SlyD/FKBP12-ERCC1 chimeric polypeptide to bind FK-506 provides another evidence for a SlyD/FKBP12-ERCC1 structure, which deviates from that of the FKBP12 (C22A) conformation. This is accompanied by a loss of binding activity of the chimeric FKBP12 domain.

Analytical HPLC Chromatographic Analyses

Analytical HPLC chromatographic analyses were performed with chimeric polypeptides in order to analyze the oligomeric status of the chimeric polypeptide A Chromeleon Dionex HPLC device was used as recommended by the manufacturer at 25° C. with a TSK3000SWXL column equilibrated in HBS-E-buffer (pH 7.4). The buffer flow was 0.7 ml/min. 100 µl of a SlyD/

FKBP12-ERCC1 comprising solution (7.4 mg/ml) was injected into the system (see FIG. 17). In another workflow a SlyD/FKBP12 control containing solution (9.5 mg/ml) was injected into the system (see FIG. 21). In another workflow a *Thermus thermophilus* SlyD-IGF-1(74-90) containing solution (3 mg/ml) was injected into the system (see FIG. 22). In another workflow a SlyD/FKBP12-IGF-1(74-90) containing solution (5.4 mg/ml) was injected into the system (see FIG. 23). The UV/VIS Detector was set to 280 nm. The data was evaluated according to the manufacturer's instructions using the Dionex software version 6.80 SP2 Build 2284. The system was calibrated with the molecular standard Oriental Yeast, Cat 46804000.

FIG. 17 shows the column elution profile of Ni-NTA affinity purified SlyD/FKBP12-ERCC1. 91.5% of the area integration of the complete elution profile can be found localized in peak No. 5 (1310.319 mAU) eluting at 12.37 min retention time. The profile indicates a monomeric SlyD/FKBP12-ERCC1 chimeric polypeptide. Monomeric chimeric polypeptide was already obtained after just an initial Ni-NTA purification step.

Kinetic Screening Using

The SlyD/FKBP12-ERCC1 chimeric polypeptide was used in SPR binding analyses. It is helpful to use monomeric and monovalent analytes in solution to determine the antibody binding kinetics according to a Langmuir model. Furthermore, it is helpful for SPR measurements to use an analyte with increased, i.e. high, molecular weight to increase the mass sensitivity of the measurements. At the same time the epitope accessibility must be given.

A scheme of the BIACORE™ screening assay is depicted in FIG. 24.

The kinetic screening was performed on a BIACORE™ A100 instrument under control of the software version V1.1. A BIACORE™ CM5 chip was loaded to the machine and according to the manufacturer's instruction addressed hydrodynamically. Thereafter the chip was conditioned. As running buffer a HBS-EP buffer is used (10 mM HEPES, pH 7.4, 150 mM NaCl, 1 mM EDTA, 0.05% (w/v) P20). A polyclonal composition of anti-IgG Fc capture antibodies of a concentration of 30 µg/ml in 10 mM sodium acetate buffer (pH 4.5) is pre-concentrated to spots 1, 2, 4 and 5 in flow cells 1, 2, 3 and 4. The antibody was covalently immobilized at 10,000 RU via NHS/EDC chemistry. The sensor was deactivated thereafter with a 1 M ethanolamine solution. Spots 1 and 2 were used for the determination and spots 2 and 4 were used as reference. Prior to application to the sensor chip the hybridoma supernatants were diluted 1:5 in HBS-EP buffer. The diluted solution was applied at a flow rate of 30 µl/min for 1 min. Immediately thereafter the formulated antigen, such as the FKBP12 chimeric polypeptide was injected at a flow rate of 30 µl/min for 2 min. Thereafter the signal is recorded for another 5 min. The sensor was regenerated by injecting a 10 mM glycine-HCl solution (pH 1.7) for 2 min. at a flow rate of 30 µl/min. The recorded signal shortly before the end of the injection of the antigen is denoted as binding late (BL). The recorded signal shortly before the end of the recording of the dissociation is denoted as stability late (SL). Both data points are plotted versus each other. Selected antibodies have a Binding Late value that is equal to the Stability Late value. These antibodies populate the area near the trend line indicating BL=SL in the plot.

FIG. 25 shows the data for selected anti-ERCC1 antibodies. It can be seen that the SlyD/FKBP12-ERCC1 interaction is highly specific. No interaction with the SlyD/FKBP12 control sample can be detected. Overall no unspecific binding can be seen.

FIG. 26 shows the valence analysis of the antibodies. The amount of antigen in response units (Binding Late, RU) saturating the surface presented antibody (Capture Level, RU) is shown. Trend lines and arrows in FIG. 26 indicate the valencies (Molar Ratio) of the surface presented antibodies. All sister clones (clone ID 5.00x.35) populate the valence corridor MR 0.5-MR 1.0, whereas all the other clones populate the corridor below MR 0.5 indicating less functionality. No functional binding versus SlyD/FKBP12 control could be detected.

FIG. 27 shows the quantification of this kinetic screening approach. All six sister clones (5.001.35 to 5.006.35) show suitable Binding Late and Stability Late values. The dissociation rate kd (1/s) show high antigen complex stabilities fulfilling the requirements for an IHC suited antibody. The calculated $t_{1/2diss}$ antigen complex stability halftimes are 204 min for all six sister clones.

FIG. 28 exemplarily shows the kinetic screening signature of clone 5.003.35 versus the analytes SlyD/FKBP12-ERCC1 and SlyD/FKBP12 control. Since SlyD/FKBP12-ERCC1 is a stable, soluble and monomeric analyte it perfectly fits to the 1:1 Langmuir dissociation model (black line on the dissociation raw data in red). No unspecific binding could be detected. No interaction versus SlyD/FKBP12 control was detected.

Western Blotting

FIG. 29 shows a Western blot experiment using clone 5.001.35. Western Blotting can be used as an indicator for the latter IHC suitability of the antibody.

For western blotting, 5 µg OVCAR-3 and 5 µg HEK-293 cell lysate were loaded into the gel lanes on 4-12% NuPAGE SDS gels (Invitrogen). Both cell lines were not pretreated e.g. by radiation or Cisplatin.

Western blotting was performed according to standard protocols with NuPAGE buffers and reagents (Invitrogen). The antibody 5.001.35 was used at a concentration of 50 ng/ml. Primary antibody incubation was performed for 30 min. at room temperature (RT). The membrane was developed using the LumiImager together with the LumiLight reagent according to the manufacturer's instructions (Roche Applied Science, Mannheim, Germany). The endogenous basal ERCC1 level was specifically detected as a single 37 kDa band in the Western blot.

IHC Experiments

FIG. 30 shows the IHC detection of ERCC1 in FFPE human cancer tissue. For immunohistochemical detection 2 µm sections of SCLC cancer samples were prepared. All staining procedures were performed on the Ventana Benchmark XT automated IHC stainer using Ventana buffers and reagents according to the manufacturers standard operating instructions. The primary antibody (clone <ERCC1>M-5.1.35) was used at a concentration of 5 µg/ml. The primary antibody was incubated on the sections for 32 min at 37° C. The primary antibody was detected using the Ventana iView™ detection kit as recommended by the manufacturer. The white arrows indicate cells with elevated ERCC1 level, appearing in darker color.

Summary

In contrast to the small molecular weight ERCC1 peptide (2 kDa) the scaffold as used herein is a high molecular weight analyte (36 kDa), which amplifies the signals in a SPR-based kinetic screening approach.

A peptide based screening reagent bears the risk of selecting antibodies recognizing the peptide's termini, which is completely avoided by using the scaffold approach as reported herein, in which the peptide is embedded in an N-terminal and C-terminal polypeptide context. Despite offering a plurality of meta-stable peptide insertions the scaffold chimeric polypeptide as a whole is stable, soluble and monomeric. 1:1 Langmuir kinetics can be easily measured by means of biosensorics.

Using the chimeric polypeptide in this set up, it is well suited to simulate the FFPE IHC situation and therefore is a well suited screening reagent for the development of IHC suited antibodies.

Without being bound by theory the chimeric polypeptide comprises a folded SlyD derived part and an unfolded or partially unfolded human FKBP12 derived part, which offers at least its single core Trp residue for solvent contact, like it is shown for SlyD/FKBP12-ERCC1. SlyD folds reversible and shows thermal stability sufficient for technical applications.

The SlyD/FKBP-12 scaffold is a suitable platform for mimicking a plurality of peptidic secondary structure motives like those present in a paraffin-embedded, formalin-fixed tissue in immune histochemical experiments (see Abe, et al. (2003) supra).

The chimeric polypeptide is especially suited as immunogen compared to the full length polypeptide from which the inserted (immunogenic) amino acid sequence is derived, e.g. with respect to solubility, reversible folding (naturation/denaturation), and the absence of disulfide bonds to be correctly formed. The chimeric polypeptide as reported herein provides the scaffold into which the immunogenic amino acid sequence is inserted. It stabilizes the structure of the inserted immunogenic amino acid sequence (without being bound by theory by reducing the conformational entropy). Without being bound by theory it is assumed that the N-terminal SlyD chimeric polypeptide keeps the complete chimeric chimeric polypeptide in a soluble and thermodynamically stable but partly unfolded form.

Rebuzzini, G. (PhD work at the University of Milano-Bicocca (Italy) (2009)) reports a study of the hepatitis C virus NS3 helicase domain for application in a chemiluminescent immunoassay. In his work Rebuzzini reports that chimeric FKBP12 used as an immunogen for the presentation of the NS3 helicase domain with the insertion sequences according to Knappe, T. A., et al. (J. Mol. Biol. 368 (2007) 1458-1468) is thermodynamically instable. This correlates to our findings, that the chimeric FKBP12 moiety in the SlyD-FKBP12-antigen chimeric polypeptide is partially or completely unfolded. In contrast to Rebuzzini's findings the SlyD/FKBP12-antigen chimeric polypeptide has been found herein to be monomeric and stable.

EXAMPLE 12

Production of IGF-1(74-90) Specific Antibodies

Antigen specific antibodies were obtained by immunization of mice with chimeric *Thermus Thermophilus*-SlyD-antigen chimeric polypeptide. A plurality of epitopes can be targeted on the scaffold's surface, from which the antibodies binding to the target antigen can be identified by differential screening versus the wild-type *Thermus Thermophilus*-SlyD as a negative control, or versus the native recombinant antigen (IGF-1) as a positive control. In the following an example demonstrates the properties of archaic SlyD derivatives compared to the potentially metastable human FKBP12. *Thermus Thermophilus*-SlyD allows the presentation of enthalpic, rigid and stable structures and therefore is suitable for the development of monoclonal antibodies versus native protein structures.

Production of *Thermus thermophilus* SlyD Chimeric Polypeptides

Guanidinium hydrochloride (GdmCl) (A-grade) was purchased from NIGU (Waldkraiburg, Germany). Complete® EDTA-free protease inhibitor tablets, imidazole and EDTA were from Roche Diagnostics GmbH (Mannheim, Germany), all other chemicals were analytical grade from Merck (Darmstadt, Germany). Ultrafiltration membranes (YM10, YM30) were purchased from Amicon (Danvers, MA, USA), microdialysis membranes (VS/0.025 μm) and ultrafiltration units (Biomax ultrafree filter devices) were from Millipore (Bedford, MA, USA). Cellulose nitrate and cellulose acetate membranes (1.2 μm, 0.45 μm and 0.2 μm pore size) for the filtration of crude lysates were from Sartorius (Goettingen, Germany).

Cloning of Expression Cassettes

The sequence of the SlyD polypeptide from *Thermus thermophilus* was retrieved from the SwissProt database (acc. no. Q72H58). The sequence of the SlyD polypeptide from *Thermococcus gammatolerans* was retrieved from the Prosite database (acc. no. C5A738). Synthetic genes encoding *Thermus thermophilus* SlyD, *Thermus thermophilus* SlyD-IGF-1(74-90), and *Thermus thermophilus* SlyD-ΔIF were purchased from Sloning Biotechnology GmbH (Germany) and were cloned into a pQE80L expression vector. The codon usage was optimized for expression in *E. coli* host cells. Synthetic genes encoding *Thermococcus gammatolerans* SlyD, *Thermococcus gammatolerans* SlyD-IGF-2 (53-65), *Thermus thermophilus* SlyD-antigen and *Thermococcus gammatolerans* SlyD-antigen were purchased from Geneart (Germany) and were cloned into pET24 expression vectors (Novagen, Madison, Wisconsin, USA). The codon usage was optimized for expression in *E. coli* host cells.

Additionally, a GS-linker (GGGS, SEQ ID NO:42) and a His-tag were fused to the carboxy terminal end in order to allow an affinity purification of the chimeric polypeptides by an immobilized metal ion exchange chromatography.

In order to generate monoclonal antibodies specifically binding to the IGF-1-fragment 74-90 (amino acid sequence NKPTGYGSSSRRAPQTG, SEQ ID NO:43) the respective peptide amino acid sequences was fused into the molecular chaperone SlyD derived from *Thermus thermophilus* by deleting amino acids 68-120 of the original protein. Due to an angle adaption of the IGF-1 insert, the Asp at position 70 and the Leu at position 88 were substituted by a Gly (D70G and L88G). Thus the chimeric polypeptide has the amino acid sequence:

(SEQ ID NO: 44)
MRGSKVGQDKVVTIRYTLQVEGEVLDQGELSYLHGHRNLIPGLEEALEGR

EEGEAFQAHVPAEKAYGPHGNKPTGYGSSSRRAPQTGGAGKDLDFQVEVV

KVREATPEELLHGHAHGGGSRKHHHHHHHH.

As a control, the native wild-type SlyD from *Thermus thermophilus* was used:

(SEQ ID NO: 45)
MKVGQDKVVTIRYTLQVEGEVLDQGELSYLHGHRNLIPGLEEALEGREEG

EAFQAHVPAEKAYGPHDPEGVQVVPLSAFPEDAEVVPGAQFYAQDMEGNP

-continued
MPLTVVAVEGEEVTVDFNHPLAGKDLDFQVEVVKVREATPEELLHGHAHG

GGSRKHHHHHH.

For Screening and specificity testing a *Thermus thermophilus* SlyD-ΔIF chimeric polypeptide was produced. *Thermus thermophilus* SlyD-ΔIF chimeric polypeptide lacks the IF domain, which was replaced by the amino acid sequence motif AGSGSS, and comprises a C-terminal amino acid sequence tag:

(SEQ ID NO: 46)
MRGSKVGQDKVVTIRYTLQVEGEVLDQGELSYLHGHRNLIPGLEEALEGR

EEGEAFQAHVPAEKAYGPHGAGSGSSGAGKDLDFQVEVVKVREATPEELL

HGHAHGGSRKHHHHHHHH.

As a control the native SlyD from *Thermococcus gammatolerans* comprising a C-terminal amino acid sequence tag was used:

(SEQ ID NO: 47)
MKVERGDFVLFNYVGRYENGEVFDTSYESVAREQGIFVEEREYSPIGVTV

GAGEIIPGIEEALLGMELGEKKEVVVPPEKGYGMPREDLIVPVPIEQFTS

AGLEPVEGMYVMTDAGIAKILKVEEKTVRLDFNHPLAGKTAIFEIEVVEI

KKAGEAGGGSRKHHHHHH.

As a control for cross reactivity the structurally homologous hairpin sequence from human IGF-2(53-65) was inserted into *Thermococcus gammatolerans* SlyD, which was fused with a GS-linker and a hexahistidine-tag at the C-terminus:

(SEQ ID NO: 48)
MKVERGDFVLFNYVGRYENGEVFDTSYESVAREQGIFVEEREYSPIGVTV

GAGEIIPGIEEALLGMELGEKKEVVVPPEKGYGMP-G-SRVSRRSRG-G-

AGKTAIFEIEVVEIKKAGEAGGGSRKHHHHHH.

Expression, Purification and Refolding of Chimeric Polypeptides

All SlyD polypeptides can be purified and refolded by using almost identical protocols. *E. coli* BL21 (DE3) cells harboring the particular expression plasmid were grown at 37° C. in LB medium containing the respective antibiotic for selective growth (Kanamycin 30 μg/ml, or Ampicillin (100 μg/ml)) to an OD600 of 1.5, and cytosolic overexpression was induced by adding 1 mM isopropyl-B-D-thiogalactoside (IPTG). Three hours after induction, cells were harvested by centrifugation (20 min at 5,000 g), frozen and stored at −20° C. For cell lysis, the frozen pellet was resuspended in chilled 50 mM sodium phosphate buffer (pH 8.0) supplemented with 7 M GdmCl and 5 mM imidazole. Thereafter the suspension was stirred for 2-10 hours on ice to complete cell lysis. After centrifugation (25,000 g, 1 h) and filtration (cellulose nitrate membrane, 8.0 μm, 1.2 μm, 0.2 μm), the lysate was applied onto a Ni-NTA column equilibrated with the lysis buffer. In the subsequent washing step the imidazole concentration was raised to 10 mM (in 50 mM sodium phosphate buffer (pH 8.0) comprising 7 M GdmCl, 5.0 mM TCEP) and 5 mM TCEP was added in order to keep the thiol moieties in a reduced form and to prevent premature disulfide bridging. At least 15 to 20 volumes of the reducing washing buffer were applied. Thereafter, the GdmCl solution was replaced by 50 mM sodium phosphate buffer (pH 8.0) comprising 100 mM NaCl, 10 mM imidazole, and 5 mM TCEP to induce conformational refolding of the matrix-bound SlyD chimeric polypeptide. In order to avoid reactivation of co-purifying proteases, a protease inhibitor cocktail (Complete® EDTA-free, Roche) was added to the refolding buffer. A total of 15 to 20 column volumes of refolding buffer were applied in an overnight procedure. Thereafter, both TCEP and the Complete@EDTA-free inhibitor cocktail were removed by washing with 10 column volumes 50 mM sodium phosphate buffer (pH 8.0) comprising 100 mM NaCl and 10 mM imidazole. In the last washing step, the imidazole concentration was raised to 30 mM (10 column volumes) in order to remove tenacious contaminants. The native polypeptide was eluted by applying 250 mM imidazole in the same buffer. Protein-containing fractions were assessed for purity by Tricine-SDS-PAGE (Schaegger, H. and von Jagow, G., Anal. Biochem. 166 (1987) 368-379) and pooled. Subsequently, the protein was subjected to size-exclusion-chromatography (Superdex™ HiLoad, Amersham Pharmacia) using potassium phosphate as the buffer system (50 mM potassium phosphate buffer (pH 7.0), 100 mM KCl, 0.5 mM EDTA). Finally, the protein-containing fractions were pooled and concentrated in an Amicon cell (YM10) to a concentration of ~5 mg/ml.

UV Spectroscopic Measurements

Protein concentration measurements were performed with an UVIKON XL double-beam spectrophotometer. The molar extinction coefficients (ε280) for the SlyD variants were calculated according to Pace (Pace, C. N., et al., Protein Sci. 4 (1995) 2411-2423).

CD Spectroscopic Measurements

To examine whether the chimeric fusion proteins according to the invention adopt a folded conformation CD spectra in the near-UV region were measured. CD spectra were recorded and evaluated using A JASCO J-720 instrument and JASCO software according to the manufacturer's recommendations. A quartz cuvette with 0.2 cm pathlength was used. The instrument was set to 1° C. resolution, 1 nm band width, 5 mdeg sensitivity and accumulation mode 1. The sample buffer was 50 mM potassium phosphate pH 7.5, 100 mM NaCl, 1 mM EDTA. The protein analyte concentration for each analysis was 36 μM *Thermus thermophilus* SlyD wild-type, 23 μM *Thermus thermophilus* SlyD-ΔIF, 16 μM *Thermus thermophilus* SlyD-antigen, 19 μM *Thermococcus gammatolerans* SlyD wild-type, and 16 μM *Thermococcus gammatolerans* SlyD-antigen. CD signals between 250 nm and 330 nm with 0.5 nm resolution and 20 nm scan per minute were recorded at 20° C. In a subsequent experimental embodiment the CD signals were determined in temperature gradients (20° C.-100° C.) and (100° C.-20° C.) for *Thermococcus gammatolerans* SlyD derivatives, respectively (20° C.-85° C.) and (85° C.-20° C.) for *Thermus thermophilus* SlyD derivatives at 277 nm constant wavelength. The temperature gradient was driven at 1° C. per minute.

FIG. 31 shows an overlay plot of three CD spectra of the chimeric polypeptides *Thermus thermophilus* SlyD wild-type, *Thermus thermophilus* SlyD-ΔIF and *Thermus thermophilus* SlyD-antigen. The CD signatures show that at 20° C. all chimeric polypeptides are folded in their native structure, even when the IF Domain is missing or is being replaced by an amino acid graft.

FIG. 32 shows a temperature-dependent near UV CD spectra of the chimeric polypeptide *Thermus thermophilus*

SlyD-antigen in the temperature gradient 20° C. to 85° C. *Thermus thermophilus* SlyD-antigen reversibly unfolds and refolds.

Under the given physical conditions no complete unfolding of *Thermococcus gammatolerans* SlyD-antigen could be achieved even at 100° C. (see FIG. 33). The extraordinary stability of archaic FKBP domains enables the grafting of polypeptides by replacement of their IF domains where at the same time the overall stability of the newly generated chimeric scaffold protein is kept up.

Immunization of Mice with *Thermus thermophilus* SlyD-IGF-1(74-90) and Development of Monoclonal Antibodies Versus IGF-1

8-12 weeks old Balb/c and NMRI mice were subjected to repeated intraperitoneal immunizations with 100 µg of *Thermus Thermophilus* SlyD-IGF-1(74-90). The mice were immunized three times, at the time points of 6 weeks and 10 weeks after the initial immunization. The first immunization can be performed using complete Freud's adjuvant, the second and third immunizations were done using incomplete Freud's adjuvant. The mice serum titers versus native recombinant IGF-1 and *Thermus Thermophilus* SlyD-IGF-1(74-90) were tested after 12 weeks by ELISA methods as described in the following. After 12 weeks serum titers were analyzed using ELISA. The ELISA was driven by a Tecan Sunrise running under Firmware: V 3.15 19/03/01; XREAD PLUS Version: V 4.20. Nunc Maxisorb F multi well plates were coated with *Thermus Thermophilus* SlyD-IGF-1(74-90) by applying a solution comprising 0.5 µg polypeptide per ml. The isolated antigen IGF-1 was immobilized in the wells of StreptaWell High Bind SA multi well plates by applying a solution comprising 90 ng/ml biotinylated IGF-1. Thereafter free binding sites were blocked by applying a solution comprising 1% RPLA in PBS for one hour at room temperature. The wells were washed three times with a solution comprising 0.9% (w/v) sodium chloride and 0.05% (w/v) Tween. As samples the mouse serum diluted 1:50 with PBS was used. Optional further dilution was performed in 1:4 steps until a final dilution of 1:819,200. The incubation time was one hour at room temperature. The wells were washed three times with a solution comprising 0.9% (w/v) sodium chloride and 0.05% (w/v) Tween. As detection antibody a polyclonal antibody against the constant domain of the target antibodies conjugated to a peroxidase was used (PAK<M-Fcγ>S—F(ab')$_2$-POD). The detection antibody was applied at a concentration of 80 ng/ml in PBS comprising 1% (w/v) RSA. The incubation time was one hour at room temperature. The wells were washed three times with a solution comprising 0.9% (w/v) sodium chloride and 0.05% (w/v) Tween. Afterwards the wells were incubated with an ABTS solution for 15 minutes at room temperature. The intensity of the developed color was determined photometrically. FIG. 34 shows mice serum titers obtained.

Three days before preparation of spleen cells and fusion with a myeloma cell line, the final booster immunization was performed by i.v. injection of 100 µg of *Thermus Thermophilus* SlyD-IGF-1(74-90) chimeric polypeptide. The production of hybridoma primary cultures can be done according to the procedure of Koehler and Milstein (Koehler, G. and Milstein, C., Nature. 256 (1975) 495-497).

ELISA Screening

Primary culture supernatants were tested by ELISA for reactivity against the immunogen *Thermus Thermophilus* SlyD-IGF-1(74-90), biotinylated native IGF-1 and wild-type *Thermus Thermophilus* SlyD respective a blank plate. Elisa was driven with a Tecan SUNRISE, Firmware: V 3.15 19/03/01; XREAD PLUS Version: V 4.20. Nunc Maxisorb F multi well ELISA plates were coated with 5 µg/ml SlyD-chimeric polypeptides. StreptaWell High Bind SA multi well plates were coated with 125 ng/ml recombinant biotinylated IGF-1 antigen. Thereafter free binding sites were blocked by 1% RPLA in PBS for one hour at room temperature. The wells were washed three times with a solution comprising 0.9% (w/v) sodium chloride and 0.05% (w/v) Tween. Undiluted hybridoma supernatants in RPMI 1640 medium were used as samples. The incubation time was one hour at room temperature. The wells were washed three times with a solution comprising 0.9% (w/v) sodium chloride and 0.05% (w/v) Tween. As detection antibody a polyclonal antibody against the constant domain of the target antibodies conjugated to a peroxidase was used (PAK<M-Fcγ>S—F(ab')$_2$-POD). The detection antibody was applied at a concentration of 80 ng/ml in PBS comprising 1% (w/v) RSA. The incubation time was one hour at room temperature. The wells were washed three times with a solution comprising 0.9% (w/v) sodium chloride and 0.05% (w/v) Tween. Afterwards the wells were incubated with an ABTS solution for 15 minutes at room temperature. The intensity of the developed color was determined photometrically at t 405 nm. The reference wavelength was 492 nm. Primary hybridoma supernatants, showing fast and strong color formation in ELISA upon binding to recombinant IGF-1, *Thermus Thermophilus* SlyD-IGF-1(74-90) and less binding to *Thermus Thermophilus* SlyD were transferred into the kinetic screening process as described in the following.

SPR-Based Kinetic Screening

*Thermus Thermophilus* SlyD-IGF-1(74-90), native recombinant IGF-1, native recombinant IGF-2, wild-type *Thermus Thermophilus* SlyD, and *Thermus Thermophilus*-SlyD-IGF-1(74-90) were used in an SPR-based kinetic screening analysis. For SPR analyses it is generally accepted to use monomeric and monovalent analytes in solution to determine the antibody binding kinetics according to a Langmuir model. Furthermore, it is rather advantageous for SPR measurements to use an analyte with higher molecular weight to increase the sensitivity of the measurements, since SPR is a mass sensitive analysis.

The kinetic screening was performed on a BIACORE™ A100 instrument under control of the software version V1.1. A BIACORE™ CM5 chip was mounted into the instrument and was hydrodynamically addressed conditioned according to the manufacturer's instructions. As a running buffer an HBS-EP buffer was used (10 mM HEPES (pH 7.4), 150 mM NaCl, 1 mM EDTA, 0.05% (w/v) P20). A polyclonal rabbit anti-mouse IgG Fc capture antibody is immobilized at 30 µg/ml in 10 mM sodium acetate buffer (pH 4.5) to spots 1, 2, 4 and 5 in flow cells 1, 2, 3 and 4 at 10,000 RU (FIG. 35). The antibody is covalently immobilized via NHS/EDC chemistry. The sensor was deactivated thereafter with a 1 M ethanolamine solution. Spots 1 and 5 were used for the determination and spots 2 and 4 were used as reference. Prior to application to the sensor chip the hybridoma supernatants were diluted 1:2 in HBS-EP buffer. The diluted solution was applied at a flow rate of 30 µl/min for 1 min. Immediately thereafter the analyte, such as the *Thermus Thermophilus* SlyD-IGF-1(74-90), chimeric polypeptide, is injected at a flow rate of 30 µl/min for 2 min. Thereafter the signal is recorded for 5 min. dissociation time. The sensor is regenerated by injecting a 10 mM glycine-HCl solution (pH 1.7) for 2 min. at a flow rate of 30 µl/min. Two report points, the recorded signal shortly before the end of the analyte injection, denoted as binding late (BL) and the recorded signal shortly before the end of the dissociation time, stability late (SL), were used to characterize the Kinetic Screening performance.

Furthermore, the dissociation rate constant kd (1/s) was calculated according to a Langmuir model and the antibody/antigen complex half-life can be calculated in minutes according to the formula ln(2)/(60*kd).

Antibodies were obtained by immunization with the antigen *Thermus Thermophilus* SlyD-IGF-1(74-90), and screening with *Thermus Thermophilus* SlyD-IGF-1(74-90), *Thermus Thermophilus* SlyD wild-type, native IGF-1 and native IGF-2. The scaffold-based screening approach allows to specifically develop antibodies binding to the predefined IGF-1 hairpin epitope.

The primary culture supernatants were further developed by limited dilution into clone culture supernatants by methods known. The clone culture supernatants were tested in a functional assay for affinity and specificity.

BIACORE™ Characterization of Antibody Producing Clone Culture Supernatants

A BIACORE™ T200 instrument (GE Healthcare) was used with a BIACORE™ CM5 sensor mounted into the system. The sensor was preconditioned by a 1 min. injection at 100 µl/min of 0.1% SDS, 50 mM NaOH, 10 mM HCl and 100 mM $H_3PO_4$.

The system buffer was PBS-DT (10 mM $Na_2HPO_4$, 0.1 mM $KH_2PO_4$, 2.7 mM KCl, 137 mM NaCl, 0.05% Tween® 20,5% DMSO). The sample buffer was the system buffer.

The BIACORE™ T200 System was driven under the control software V1.1.1. Polyclonal rabbit IgG antibody <IgGFCγM>R (Jackson ImmunoResearch Laboratories Inc.) was immobilized at 30 µg/ml in 10 mM sodium acetate buffer (pH 4.5) at 6500 RU on the flow cells 1, 2, 3, and 4, respectively, via EDC/NHS chemistry according to the manufacturer's instructions. Finally, the sensor surface was blocked with a 1 M ethanolamine solution. The complete experiment was performed at 25° C.

The clone culture supernatants containing the respective antibodies at approx. 40 nM were captured for 2 min. at a flow rate of 5 µl/min on the <IgGFCγM>R surface. As analytes in solution the recombinant native IGF-1, recombinant native IGF-2, *Thermus thermophilus* SlyD-IGF-1(74-90), recombinant wild-type *Thermus thermophilus* SlyD, recombinant *Thermus thermophilus* SlyD-ΔIF, recombinant wild-type *Thermococcus gammatolerans* SlyD, recombinant *Thermococcus gammatolerans* SlyD-IGF-2 (53-65) chimeric polypeptides were used. *Thermus thermophilus* SlyD-ΔIF is solely the FKBP domain of *Thermus thermophilus* SlyD lacking the IF domain. *Thermococcus gammatolerans* SlyD-IGF-2(53-65) was used to counterscreen and investigate the specificity for the IGF-1 hairpin in contrast to the IGF-2 hairpin insertion. The respective analytes were injected at different concentration steps from 90 nM, 30 nM, 10 nM, 3.3 nM, 1.1 nM and 0 nM. The association phase was monitored for 3 min. at a flow rate of 100 µl/min. The dissociation was monitored for 10 min. at a flow rate of 100 µl/min. The system was regenerated using a 10 mM glycine buffer (pH 1.7). Kinetics were evaluated using the BIACORE™ Evaluation Software.

The following terms are used herein: mAb: monoclonal antibody; RU: Relative response unit of monoclonal antibody captured on the sensor; Antigen: antigen in solution; kDa: molecular weight of the antigens injected as analytes in solution; ka: association rate constant; kd: dissociation rate constant; t1/2 diss: antibody-antigen complex half-life calculated according to the formula t1/2 diss=ln(2)/60*kd; KD: dissociation constant; $R_{MAX}$: Binding signal at the end of the association phase of the 90 nM analyte injection; MR: Molar Ratio; $Chi^2$: failure of the measurement; n.d.: not detectable.

FIG. 36 shows, that the scaffold-derived monoclonal antibodies M-11.11.17 and M-10.7.9 have been developed with picomolar affinity versus IGF-1. No cross-reactivity versus IGF-2, nor versus wild-type *Thermus thermophilus* SlyD, nor versus wild-type *Thermococcus gammatolerans* SlyD, nor versus *Thermus thermophilus* SlyD-ΔIF chimeric polypeptide, nor versus *Thermococcus gammatolerans* SlyD-IGF-2(53-65) chimeric polypeptide was detectable.

M-2.28.44 is a monoclonal antibody obtained by conventional immunization of mice with recombinant human IGF-1. Despite the fact that the antibody shows a 30 pM affinity versus IGF-1, a 500 pM cross reactivity can be detected versus IGF-2. Using *Thermus thermophilus* SlyD-IGF-1(74-90) and *Thermococcus gammatolerans* SlyD-IGF-2 (53-65) as analyte it can be seen that the cross-reacting IGF-2 epitope is not the IGF hairpin region.

FURTHER REMARKS

For the development of native IGF-1 binding antibodies it has been found that a scaffold has to be used, which presents the polypeptide insertion in its native conformation. The presenting chimeric polypeptide therefore needs to be a stably folded polypeptide. It has been found that this can be achieved by using an FKPB domain from an extremophile (i.e. thermophile) organism, like *Thermus thermophilus* SlyD, or *Thermococcus gammatolerans* SlyD.

To examine whether the chimeric polypeptides as reported herein adopt a folded conformation CD spectra in the near-UV region were determined. Near-UV-CD determines the asymmetric environment of aromatic residues in a polypeptide and is therefore a sensitive test for ordered tertiary structure. Native SlyD has a typical CD signature in the near-UV region. Thus, structural distortions or steric clashes due to an insertion in the IF domain should be visible in the near-UV CD spectrum. In FIG. 37 an overlay of the spectra of wild-type *Thermus thermophilus* SlyD, the FKBP domain of wild-type *Thermus thermophilus* SlyD lacking the IF domain (*Thermus thermophilus* SlyD-ΔIF chimeric polypeptide) and *Thermus thermophilus* SlyD-antigen chimeric polypeptide, wherein a 22 amino acid insertion from a human extracellular receptor fragment was inserted, is shown. It has been found that the replacement of the *Thermus thermophilus* IF domain does not result in a change of the overall structure of the remaining IF domain. It can be seen that the signature of the spectra is similar. Since unfolding would abolish any near-UV CD signal, this result provides evidence that a native-like fold is retained in the chimeric polypeptide.

The *Thermus thermophilus* SlyD-antigen chimeric polypeptide is a chimeric polypeptide comprising a 22 amino acid beta hairpin secondary structure insertion from a human growth factor receptor extracellular domain (ECD). The CD signatures demonstrate that at 20° C. all polypeptides are well folded in their native structure.

FIG. 38 shows the temperature-dependent CD spectra of the *Thermus thermophilus* SlyD-ΔIF chimeric polypeptide. After temperature-induced unfolding, the *Thermus thermophilus* SlyD FKBP domain can refold when being cooled down again. Due to this the chimeric polypeptides can be affinity purified by on column refolding and, furthermore, in contrast to the findings with the SlyD-FKBP12-IGF-1 chimeric polypeptide, the *Thermus thermophilus* SlyD-IGF-1 (74-90) chimeric polypeptide possesses structural stability to present the IGF-1 secondary structure motive on the FKBP domain in a stable conformation. The temperature-dependent near-UV CD spectra of the *Thermococcus gammatolerans* SlyD-antigen chimeric polypeptide shows an even higher stability when compared to *Thermus thermophilus*-antigen chimeric polypeptide (see FIG. 39). Both scaffolds carry the same 22 amino acids beta hairpin secondary structure insertion from a human growth factor receptor ECD. *Thermococcus gammatolerans* SlyD-antigen reversibly folds and unfolds. It has been found that under the given physical conditions no complete unfolding of the *Thermococcus gammatolerans* SlyD-antigen chimeric polypeptide could be achieved even at a temperature of 100° C.

It has been found that the stability of archaic FKBP domains enables the grafting of immunogenic polypeptides by replacement of their IF domains whereby at the same time the overall stability of the newly generated chimeric scaffold protein is maintained.

The *Thermus thermophilus* SlyD-IGF-1(74-90) chimeric polypeptide was purified as a stable and monomeric polypeptide (see FIG. 22).

The monomer fraction of the *Thermococcus gammatolerans* SlyD-antigen chimeric polypeptide was rechromatographed after repeated freezing and thawing cycles and a temperature stress test (see FIG. 40).

Mice have been immunized with the polypeptide of MKVGQDKVVTIRYTLQVEGEVLDQGELSYLHGH-RNLIPGLEEALEGREEG EAFQAHVPAEKAYGPHG-NKPTGYGSSSRRAPQTGGAGKDLDFQVEVVKV REATPEELLHGHAHPSGHHHHHH (SEQ ID NO:49). The obtained B-cells were analyzed using an ELISA. *Thermus Thermophilus*-SlyD-IGF-1(74-90) chimeric polypeptide, *Thermus Thermophilus*-SlyD-wild-type polypeptide, IGF-1 and IGF-2 were used as a control.

The *Thermus Thermophilus*-SlyD wild-type polypeptide comprising a C-terminal amino acid sequence tag of GSRKHHHHHHHH (SEQ ID NO:51) (see FIG. 41 for SDS and Western blot) has the following amino acid sequence:

(SEQ ID NO: 50)
MRGSKVGQDKVVTIRYTLQVEGEVLDQGELSYLHGHRNLIPGLEEALEGR

EEGEAFQAHVPAEKAYGPHDPEGVQVVPLSAFPEDAEVVPGAQFYAQDME

GNPMPLTVVAVEGEEVTVDFNHPLAGKDLDFQVEVVKVREATPEELLHGH

AHGGGSRKHHHHHHHH.

All clone culture supernatants (CCS) form stable complexes with IGF-1 and the Thermo *Thermophilus* SlyD-IGF-1 chimeric polypeptide at 37° C. No cross-reaction with the Thermo *Thermophilus* SlyD-wild-type polypeptide was detectable with any of the CCS. No cross-reactivity with IGF-2 was detectable, except for one clone (see FIG. 42). From FIG. 43 it can be seen that the first 8 clone culture supernatants have a t/2-diss of 2 minutes, whereas the analyte IGF-1 associates faster to the last 4 clone culture supernatants and dissociates slower. It stays in complex longer than 40 minutes. In FIG. 44 exemplary sensorgrams for one clone are shown. It can be seen that the antibody binds to IGF-1 and the *Thermus thermophilus*-IGF-1 chimeric polypeptide whereas binding to IGF-1 and the *Thermus thermophilus*-wild-type polypeptide cannot be detected.

Thus, *Thermus thermophilus* SlyD-antigen chimeric polypeptides and *Thermococcus gammatolerans* SlyD-antigen chimeric polypeptides can be used as combined immunogen and/or as screening tools, e.g. for the development of epitope-specific monoclonal antibodies targeting the immunogen that is contained in the polypeptide. Library screening in order to detect specific interaction such a binding of a chimeric polypeptide to a target molecule is a further application.

EXAMPLE 13

Scaffold-Based Counter-Screening Approach for the Selection of Antigen Binding Antibodies Six week old NMRI mice were subjected 3-times to intraperitoneal immunization with 100 µg recombinant chimeric chimeric polypeptide comprising the element *Thermococcus gammadurans* SlyD-antigen (TgSlyD-antigen). After 10 weeks the mice were boosted two times with 25 µg TgSlyD-antigen. Hybridoma cells were produced according to known methods. The primary hybridomas were isolated by limiting dilution and screened for antigen binding by ELISA.

50 ng/ml of TgSlyD-antigen chimeric polypeptide, 50 ng/ml of TgSlyDΔIF and 1 µg/ml isolated antigen were each coated in 30×384 well (Nunc) plates overnight at 4° C. Coating buffer was freshly prepared with 1 carbonate-bicarbonate tablet (Sigma, C3041-100CAP99) resolved in 100 ml doubly distilled $H_2O$ (dd$H_2O$). 100 µl Washing buffer (150 mM NaCl, 10 ml Tween 20 (Sigma), 40 ml Bromidox L (Roche) in 1 d$H_2O$). The wells were washed three times with 100 µl washing buffer (150 mM NaCl, 10 ml Tween20 (Sigma), 40 ml Bromidox L (Roche) in 1 l d$H_2O$) using a BioTek washer. The wells were blocked with 30 µl blocking buffer (10 g BSA, 10×PBS pellets (Gibco) in 1 L dd$H_2O$) for one hour at RT, followed by 3 times washing with 100 µl washing buffer. 30 µl of 1:1000 diluted hybridoma supernatants were transferred into the wells using a Liquidator and were incubated for one hour at RT. As a positive control an antigen-positive serum was used. The wells were washed three times with 100 µl washing buffer. Peroxidase conjugated F(ab')$_2$ fragment Goat anti-Mouse IgG antibody (Dianova) was diluted 1:30000 in blocking buffer and 30 µl were transferred into each well. Incubation for one hour at RT was followed by three times washing with 100 µl washing buffer. 30 µl ready to use ABTS substrate was incubated for 30 min at RT in each well. The absorption signals were monitored as reference signals at 405 nm/492 nm using a PowerWave XS Reader (BioTek). 15 hybridoma cultures, which showed positive ELISA signals versus the TgSlyD-antigen comprising chimeric polypeptide and the isolated antigen and no signal versus the TgSlyDΔIF comprising chimeric polypeptide were selected and further cultivated.

The primary hybridoma supernatants were isolated and screened for antigen binding by a second ELISA counter-screening, performed in the same way as described above. In the second screening additional screening reagents were used to precise the specificity of the antibody containing culture supernatants.

50 ng/ml of TgSlyD-antigen chimeric polypeptide, 50 ng/ml TgSlyDΔIF, 500 ng of ttSlyD-antigen chimeric polypeptide and 1 µg/ml isolated antigen were coated in 384 well (Nunc) plates for one hour at room temperature (RT). The ELISA was performed as described above. Due to their different species origin T.th.SlyD and T.g.SlyD show little sequence homology. Only 36% of the amino acids are identical and according to a blossom 62 calculation there is only 48% sequence similarity. TgSlyDΔIF is lacking the insertion anyway. Therefore, the polypeptides are very well suited to be used in an ELISA counter-screening.

Therefore, by immunization with the scaffold surrogate polypeptide a specific epitope in the native antigen domain could be pre-targeted.

EXAMPLE 14

Epitope Mapping

SlyD-FKBP chimeric polypeptides can also carry complex amino acid insertion motifs, like for example secondary structures containing disulfide bonds. Since the chimeric polypeptides are free of cysteines, on-column refolding under appropriate conditions facilitates the correct formation of disulfides within the insertion, additionally assisted by the chaperone functionality of SlyD itself. The SlyD-FKBP chimeric polypeptides were expressed in *E. coli* and on-column refolded as described above. SlyD-FKBP12ctrl was dialyzed in 75 mM HEPES buffer (pH 7.5) comprising 150 mM NaCl, 6.5% (w/v) Saccharose, 10 mM cysteine at a concentration of 9.5 mg/ml. A 1 mg/ml portion of the SlyD-FKBP12-CD81 chimeric polypeptide was dialyzed in 50 mM potassium phosphate buffer pH 7.0, comprising 100 mM NaCl, 1 mM EDTA in order to avoid disulfide shuffling in the CD81 insertion, which contains 4 cysteines forming two disulfide bonds with structure functional relevance. The chimeric polypeptides SlyD-FKBP12-CD81 and SlyD-FKBP12ctrl were used for the purpose of epitope mapping.

Human CD81 is a receptor for the hepatitis C virus envelope E2 glycoprotein. CD81 is a transmembrane protein belonging to the tetraspanin family. CD81 is a 90 amino acid in length homodimeric protein, which displays a so called mushroom-like structure (PDB 1IV5). Residues known to be involved in virus binding can be mapped onto the so called 35 amino acid in length "head subdomain", providing a basis for the design of antiviral drugs and vaccines. Since the head subdomain sequence of the virus binding site is just 35 amino acids in length it is difficult to map antibody epitopes on the 10 kDa CD81 protein using conventional cross-blocking experiments. It is difficult to discriminate antibodies, which specifically bind directly on the relevant mushroom-like head domain, from antibodies binding nearby or elsewhere in the CD81LEL structure. All antibodies would show independently of their binding site an HCV E2 envelope protein competing effect, but without specifically binding to the target structure, i.e. the head domain. The grafting of the relevant head domain structure into FKBP and a consecutive epitope mapping is therefore a useful method for various reasons. First, some biochemical issues with the CD81LEL protein are circumvented, because the protein itself tends to oligomerize. Second, it is rather suitable to identify antibody epitopes from a vast number of antibodies all binding to the full length CD81 protein.

In FIG. 45 an SDS page (left) and Western Blot (right) of Ni-NTA chromatographically purified SlyD-FKBP12-CD81 is shown.

A BIACORE™ 2000 instrument (GE Healthcare) was used at 25° C. with a BIACORE™ CM5 sensor mounted into the system. The sensor was preconditioned by a 1 min. injection at 100 μl/min of 0.1% SDS, 50 mM NaOH, 10 mM HCl and 100 mM $H_3PO_4$. As a running buffer an HBS-EP buffer was used (10 mM HEPES (pH 7.4), 150 mM NaCl, 1 mM EDTA, 0.05% (w/v) P20). The sample buffer was the system buffer. Each protein ligand was immobilized by EDC/NHS chemistry at 30 μg/ml in 10 mM sodium acetate buffer (pH 4.0) into the flow cells 2, 3 and 4. Flow cell 1 was used as reference. The sensor was deactivated with a 1 M ethanolamine pH 8.0 solution. The following masses in response units (RU) were immobilized on the sensor: flow cell 2: 1800 RU SlyD-FKBP12ctrl (32.8 kDa), flow cell 3: SlyD-FKBP12-CD81 (35.8 kDa), flow cell 4: 900 RU CD81LEL (10 kDa). 31 antibody analytes were injected at 30 p/min at 50 nM each for 3 min. association and 3 min. dissociation phase. 30 antibodies were derived from an immunization campaign with the 10 kDa CD81LEL protein. The sensor surface was regenerated using 100 mM HCl at 20 p/min for 3 consecutive 30 sec. injections at 20 μl/min. The sensorgrams were monitored as reference signals 2-1 (flow cell 2 minus flow cell 1), 3-1 and 4-1 and were evaluated by using the BIACORE™ Evaluation software 4.1. At the end of the analyte injection a report point was set to quantify the maximum analyte binding signal. The highest analyte binding signal was set 100% to normalize the data.

In the following table the normalized antibody binding responses are shown. From 30 tested <CD81-LEL>M-antibodies only 6 (bold) show a precise epitope on the CD81 head domain. The negative control polypeptide SlyD-FKBP12ctrl was not bound. The positive control polypeptide CD81-LEL, which was the immunogen at the same time, was recognized by all antibodies. Slyd-FKBP12-CD81 was only bound, when the antibody epitope precisely locates in the mushroom domain.

TABLE

| Ligands / Analytes | Slyd-FKBP12-ctrl | Slyd-FKBP12-CD81 | CD81-LEL |
|---|---|---|---|
| | normalized ref. binding signal (%) | | |
| HBS-ET | 0 | 0 | 0 |
| K01 | 0 | 0 | 63 |
| K02_1 | 0 | 0 | 62 |
| K02_2 | 0 | 0 | 61 |
| K03 | 0 | 47 | 93 |
| K04 | 0 | 0 | 80 |
| K05 | 0 | 26 | 100 |
| K06 | 0 | 32 | 74 |
| K07 | 0 | 0 | 62 |
| K08 | 0 | 0 | 56 |
| K10 | 0 | 0 | 46 |
| K21 | 0 | 0 | 77 |
| K22 | 0 | 29 | 80 |
| K23 | 0 | 0 | 37 |
| K24 | 0 | 17 | 86 |
| K25 | 0 | 0 | 38 |
| K27 | 0 | 29 | 81 |
| K28 | 0 | 0 | 41 |
| K30 | 0 | 0 | 52 |
| K31 | 0 | 0 | 66 |
| K32 | 0 | 0 | 53 |
| K34 | 0 | 0 | 66 |
| K35 | 0 | 0 | 44 |
| K36 | 0 | 0 | 54 |
| K37 | 0 | 0 | 52 |
| K38 | 0 | 0 | 65 |
| K39 | 0 | 0 | 66 |
| K40 | 0 | 0 | 51 |
| K41 | 0 | 0 | 67 |
| K42 | 0 | 0 | 60 |
| K43 | 0 | 0 | 58 |

Confirmation of the Epitope Mapping Results by X-Ray Crystallographic Analysis

Fab fragments of the antibodies K05 and K04 were co-crystallized with the CD81-LEL protein and were analyzed by x-ray diffraction analysis (Seth Harris, Palo Alto). The resolution obtained was 2.15 Å. Whereas antibody K05 binds in the mushroom domain, antibody K04 binds to an epitope off site of the mushroom sequence.

The invention claimed is:

1. A composition comprising nucleic acid molecules encoding a population comprising more than five non-identical chimeric polypeptide species, wherein each nucleic acid molecule encodes a chimeric polypeptide species that comprises a polypeptide according to formula I $$NH_2—S_2—X—S_1—COOH \quad \text{(formula I),}$$

wherein

X is an amino acid sequence comprising a variable sequence, wherein X is inserted in place of the insert-in-flap-domain (IF-domain) of the polypeptide, S2 comprises an amino acid sequence selected from the list consisting of amino acids 1-63 of SEQ ID NO:4, amino acids 1-63 of SEQ ID NO:5, amino acids 1-68 of SEQ ID NO:6, amino acids 1-82 of SEQ ID NO:8, amino acids 1-65 of SEQ ID NO:12, amino acids 1-85 of SEQ ID NO:13, amino acids 1-84 of SEQ ID NO:9, amino acids 1-100 of SEQ ID NO:10, amino acids 1-86 of SEQ ID NO:11, amino acids 1-9 of SEQ ID NO:14, amino acids 1-108 of SEQ ID NO:15, amino acids 1-63 of SEQ ID NO:16, amino acids 1-63 of SEQ ID NO:17, and amino acid sequences at least 50% identical to any of the aforesaid amino acid sequences, S1 comprises an amino acid sequence selected from the list consisting of amino acids 65-90 of SEQ ID NO:4, amino acids 65-152 of SEQ ID NO:5, amino acids 127-152 of SEQ ID NO:6, amino acids 138-156 of SEQ ID NO:8, amino acids 67-93 of SEQ ID NO:12, amino acids 87-106 of SEQ ID NO:13, amino acids 97-108 of SEQ ID NO:9, amino acids 118-129 of SEQ ID NO:10, amino acids 88-99 of SEQ ID NO:11, amino acids 11-45 of SEQ ID NO:14, amino acids 110-128 of SEQ ID NO:15, amino acids 65-90 of SEQ ID NO:16, amino acids 65-128 of SEQ ID NO:17, and amino acid sequences at least 50% identical to any of the aforesaid amino acid sequences, S1 and S2 are non-variable for said more than five non-identical chimeric polypeptide species, and — between two amino acids denotes a peptide bond.

2. The composition according to claim 1, wherein X comprises an amino acid sequence of 5 to 500 residues.

3. The composition according to claim 1, wherein X comprises an amino acid sequence of 5 to 75 residues.

4. The composition according to claim 1, wherein X is composed according to formula II $$U—O—Z \quad \text{(formula II)},$$

wherein

O is an amino acid sequence comprising a variable sequence,

U and Z are selected independently of each other, wherein either is present or absent and, if present, each of U and/or Z is a non-variable amino acid sequence comprising 1 to 10 residues, wherein both U and Z cannot be absent in the same formula IL, and U, if present, is linked with a peptide bond to $S_2$, and Z, if present, is linked with a peptide bond to $S_1$.

5. The composition according to claim 4, wherein each of U and/or Z is an amino acid sequence of 1 to 5 residues.

6. The composition according to claim 4, wherein the amino acid sequence of O is composed of a subset of the naturally occurring amino acid residues.

7. The composition according to claim 6, wherein each residue of the amino acid sequence of O is independently selected from the list of amino acid residues consisting of Y, F, L, P, D, V, R, Q, S, I, E, G, W, A, H, T, N, K, and M.

8. The composition according to claim 7, wherein in the population of encoded chimeric polypeptide species the average relative frequency of occurrence of a particular amino acid residue in the amino acid sequence of O is 8.5% to 11.5% for Y, 8.5% to 11.5% for F, 8.5% to 11.5% for L, 5% to 8% for P, 4.5% to 7.5% for D, 4.5% to 7.5% for V, 4.5% to 7.5% for R, 4% to 7% for Q, 4% to 7% for S, 3.5% to 6.5% for I, 3% to 6% for E, 3% to 6% for G, 3% to 6% for W, 3% to 6% for A, 2.5% to 5.5% for H, 2% to 5% for T, 1% to 4% for N, 0.5% to 3.5% for K, and 0.5% to 2.5% for M.

9. The composition according to claim 1, wherein the chimeric polypeptide species comprises the sequence of SEQ ID NO:4 or SEQ ID NO:5.

10. The composition according to claim 1, wherein $S_2$ comprises an amino acid sequence selected from the list consisting of amino acids 1-63 of SEQ ID NO:4, amino acids 1-63 of SEQ ID NO:5, amino acids 1-68 of SEQ ID NO:6, amino acids 1-82 of SEQ ID NO:8, amino acids 1-65 of SEQ ID NO:12, amino acids 1-85 of SEQ ID NO:13, amino acids 1-84 of SEQ ID NO:9, amino acids 1-100 of SEQ ID NO:10, amino acids 1-86 of SEQ ID NO:11, amino acids 1-9 of SEQ ID NO:14, amino acids 1-108 of SEQ ID NO:15, amino acids 1-63 of SEQ ID NO:16, amino acids 1-63 of SEQ ID NO:17, and amino acid sequences at least 70% identical to any of the aforesaid amino acid sequences; and wherein $S_1$ comprises an amino acid sequence selected from the list consisting of amino acids 65-90 of SEQ ID NO:4, amino acids 65-152 of SEQ ID NO:5, amino acids 127-152 of SEQ ID NO:6, amino acids 138-156 of SEQ ID NO:8, amino acids 67-93 of SEQ ID NO:12, amino acids 87-106 of SEQ ID NO:13, amino acids 97-108 of SEQ ID NO:9, amino acids 118-129 of SEQ ID NO:10, amino acids 88-99 of SEQ ID NO:11, amino acids 11-45 of SEQ ID NO:14, amino acids 110-128 of SEQ ID NO:15, amino acids 65-90 of SEQ ID NO:16, amino acids 65-128 of SEQ ID NO:17, and amino acid sequences at least 70% identical to any of the aforesaid amino acid sequences.

11. The composition according to claim 1, wherein $S_2$ comprises an amino acid sequence selected from the list consisting of amino acids 1-63 of SEQ ID NO:4, amino acids 1-63 of SEQ ID NO:5, amino acids 1-68 of SEQ ID NO:6, amino acids 1-82 of SEQ ID NO:8, amino acids 1-65 of SEQ ID NO:12, amino acids 1-85 of SEQ ID NO:13, amino acids 1-84 of SEQ ID NO:9, amino acids 1-100 of SEQ ID NO:10, amino acids 1-86 of SEQ ID NO:11, amino acids 1-9 of SEQ ID NO:14, amino acids 1-108 of SEQ ID NO:15, amino acids 1-63 of SEQ ID NO:16, amino acids 1-63 of SEQ ID NO:17, and amino acid sequences at least 80% identical to any of the aforesaid amino acid sequences; and wherein $S_1$ comprises an amino acid sequence selected from the list consisting of amino acids 65-90 of SEQ ID NO:4, amino acids 65-152 of SEQ ID NO:5, amino acids 127-152 of SEQ ID NO:6, amino acids 138-156 of SEQ ID NO:8, amino acids 67-93 of SEQ ID NO:12, amino acids 87-106 of SEQ ID NO:13, amino acids 97-108 of SEQ ID NO:9, amino acids 118-129 of SEQ ID NO:10, amino acids 88-99 of SEQ ID NO:11, amino acids 11-45 of SEQ ID NO:14, amino acids 110-128 of SEQ ID NO:15, amino acids 65-90 of SEQ ID NO:16, amino acids 65-128 of SEQ ID NO:17, and amino acid sequences at least 80% identical to any of the aforesaid amino acid sequences.

12. The composition according to claim 1, wherein $S_2$ comprises an amino acid sequence selected from the list consisting of amino acids 1-63 of SEQ ID NO:4, amino acids 1-63 of SEQ ID NO:5, amino acids 1-68 of SEQ ID NO:6, amino acids 1-82 of SEQ ID NO:8, amino acids 1-65 of SEQ ID NO:12, amino acids 1-85 of SEQ ID NO:13, amino acids 1-84 of SEQ ID NO:9, amino acids 1-100 of SEQ ID NO:10, amino acids 1-86 of SEQ ID NO:11, amino acids 1-9 of SEQ ID NO:14, amino acids 1-108 of SEQ ID NO:15, amino acids 1-63 of SEQ ID NO:16, amino acids 1-63 of SEQ ID NO:17, and amino acid sequences at least 90% identical to any of the aforesaid amino acid sequences; and wherein $S_1$ comprises an amino acid sequence selected from the list consisting of amino acids 65-90 of SEQ ID NO:4, amino acids 65-152 of SEQ ID NO:5, amino acids 127-152 of SEQ ID NO:6, amino acids 138-156 of SEQ ID NO:8, amino acids 67-93 of SEQ ID NO:12, amino acids 87-106 of SEQ ID NO:13, amino acids 97-108 of SEQ ID NO:9, amino acids 118-129 of SEQ ID NO:10, amino acids 88-99 of SEQ ID NO:11, amino acids 11-45 of SEQ ID NO:14, amino acids 110-128 of SEQ ID NO:15, amino acids 65-90 of SEQ ID NO:16, amino acids 65-128 of SEQ ID NO:17, and amino acid sequences at least 90% identical to any of the aforesaid amino acid sequences.

13. The composition according to claim 1, wherein S2 is an amino acid sequence selected from the list consisting of amino acids 1-63 of SEQ ID NO:4, amino acids 1-63 of SEQ ID NO:5, amino acids 1-68 of SEQ ID NO:6, amino acids 1-82 of SEQ ID NO:8, amino acids 1-65 of SEQ ID NO:12, amino acids 1-85 of SEQ ID NO:13, amino acids 1-84 of SEQ ID NO:9, amino acids 1-100 of SEQ ID NO:10, amino acids 1-86 of SEQ ID NO:11, amino acids 1-9 of SEQ ID NO:14, amino acids 1-108 of SEQ ID NO:15, amino acids 1-63 of SEQ ID NO:16, amino acids 1-63 of SEQ ID NO:17, and amino acid sequences at least 95% identical to any of the aforesaid amino acid sequences; and wherein S1 is an amino acid sequence selected from the list consisting of amino acids 65-90 of SEQ ID NO:4, amino acids 65-152 of SEQ ID NO:5, amino acids 127-152 of SEQ ID NO:6, amino acids 138-156 of SEQ ID NO:8, amino acids 67-93 of SEQ ID NO:12, amino acids 87-106 of SEQ ID NO:13, amino acids 97-108 of SEQ ID NO:9, amino acids 118-129 of SEQ ID NO:10, amino acids 88-99 of SEQ ID NO:11, amino acids 11-45 of SEQ ID NO:14, amino acids 110-128 of SEQ ID NO:15, amino acids 65-90 of SEQ ID NO:16, amino acids 65-128 of SEQ ID NO:17, and amino acid sequences at least 95% identical to any of the aforesaid amino acid sequences.

14. The composition according to claim 4, wherein X is composed according to formula II $$U—O—Z \quad \text{(formula II)},$$

wherein
O a variable sequence according to formula IV $$5'\text{-}(Lib\text{-}Lib1)6\text{-}Lib\text{-}3' \quad \text{(formula IV)}$$

wherein Lib is a mixture of trinucleotides encoding amino acids wherein the average relative frequence of occurrence of a particular amino acid residue is 10% for F, 10% for I, 9% for L, 8% for Y, 8% for W, 5% for S, 5% for D, 5% for G, 5% for P, 5% for R, 5% for E, 4% for V, 4% for A, 4% for H, 3% for N, 3% for K, 3% for T, 3% for Q, and 1% for M; and wherein Lib1 is a mixture of trinucleotides encoding amino acids wherein the average relative frequency of occurrence of a particular amino acid residue is 11% for Y, 11% for L, 10% for F, 6% for S, 6% for D, 6% for G, 6% for R, 6% for E, 5% for V, 5% for A, 5% for H, 5% for K, 5% for P, 4% for N, 4% for T, 4% for Q, and 1% for M.

15. The composition according to claim 1, wherein said IF-domain consists of amino c acids 69 to 126 of SEQ ID NO:6, 83 to 137 of SEQ ID NO:8, 85 to 96 of SEQ ID NO:9, or 101 to 117 of SEQ ID NO:10.

* * * * *